US012579852B2

(12) United States Patent
Weiland et al.

(10) Patent No.: US 12,579,852 B2
(45) Date of Patent: *Mar. 17, 2026

(54) METHOD AND SYSTEM FOR TESTING MATCHED COMPONENTS OF VEHICLE

(71) Applicant: Snap-on Incorporated, Kenosha, WI (US)

(72) Inventors: David B. Weiland, Union City, CA (US); Joshua C. Covington, San Juan Bautista, CA (US); Roy S. Brozovich, Campbell, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,532

(22) Filed: Jun. 13, 2024

(65) Prior Publication Data

US 2024/0331464 A1 Oct. 3, 2024

Related U.S. Application Data

(63) Continuation of application No. 17/557,186, filed on Dec. 21, 2021, now Pat. No. 12,051,285.

(51) Int. Cl.
| | |
|---|---|
| *G07C 5/08* | (2006.01) |
| *B60R 16/023* | (2006.01) |
| *F02D 41/22* | (2006.01) |

(52) U.S. Cl.
CPC ........ G07C 5/0808 (2013.01); B60R 16/0232 (2013.01); F02D 41/22 (2013.01); G07C 5/0825 (2013.01); G07C 2205/02 (2013.01)

(58) Field of Classification Search
CPC ............................ G07C 5/0808; G07C 5/0825; G07C 2205/02; B60R 16/0232; F02D 41/22
See application file for complete search history.

(56) References Cited

U.S. PATENT DOCUMENTS

| | | | | | |
|---|---|---|---|---|---|
| 4,679,808 | A | * | 7/1987 | Ito ........................... | B60T 8/172 |
| | | | | | 701/1 |
| 4,831,539 | A | * | 5/1989 | Hagenbuch ............ | G07C 5/085 |
| | | | | | 177/136 |

(Continued)

FOREIGN PATENT DOCUMENTS

| | | |
|---|---|---|
| JP | 4375487 B2 | 12/2009 |
| JP | 2009282804 A | 12/2009 |
| KR | 102001900 B1 | 7/2019 |

OTHER PUBLICATIONS

Australian Government, IP Austrlia; Examination Report No. 1 for standard patent application for Australian application No. 2022420475; Feb. 21, 2025; 3 pages.

(Continued)

*Primary Examiner* — Gertrude Arthur Jeanglaude
(74) *Attorney, Agent, or Firm* — McDonnell Bochnen Hulbert & Berghoff LLP

(57) ABSTRACT

A method comprises determining first and second measurements at different times. The first measurement includes a measurement of a signal output by a first vehicle component and the second measurement includes a measurement of a signal output by a second vehicle component, or the first measurement includes a measurement of a condition of the first vehicle component and the second measurement includes a measurement of a condition of the second vehicle component. A determination is made based at least in part on a difference between the first and second measurements exceeding a measurement threshold. The determination indicates that the first and/or second vehicle components is malfunctioning. The method includes outputting a notification indicating that the first and/or second vehicle components, which are matched with each other based on a common characteristic with respect to the vehicle, is mal- (Continued)

functioning. The first and second times are within a threshold amount of time.

23 Claims, 32 Drawing Sheets

(56) References Cited

U.S. PATENT DOCUMENTS

| | | | |
|---|---|---|---|
| 5,032,821 A * | 7/1991 | Domanico | G01G 19/08 |
| | | | 701/33.9 |
| 5,396,427 A | 3/1995 | Piehl et al. | |
| 5,524,078 A * | 6/1996 | Kolb | B60T 8/885 |
| | | | 701/33.9 |
| 5,764,524 A | 6/1998 | Andersson et al. | |
| 5,852,789 A | 12/1998 | Trsar et al. | |
| 5,935,187 A | 8/1999 | Trsar et al. | |
| 6,092,016 A | 7/2000 | Sarangapani et al. | |
| 6,459,968 B1 | 10/2002 | Kochie | |
| 6,484,080 B2 * | 11/2002 | Breed | B60N 2/2863 |
| | | | 701/30.6 |
| 7,254,469 B2 | 8/2007 | Robb et al. | |
| 7,953,530 B1 | 5/2011 | Pederson et al. | |
| 8,135,508 B1 | 3/2012 | Thompson et al. | |
| 9,008,854 B2 * | 4/2015 | Breed | G01C 21/26 |
| | | | 701/1 |
| 9,043,073 B2 | 5/2015 | Ricci | |
| 9,342,934 B2 | 5/2016 | Chen | |
| 10,163,280 B1 | 12/2018 | Covington | |
| 11,227,452 B2 * | 1/2022 | Rosenbaum | G07C 5/008 |
| 2002/0138185 A1 | 9/2002 | Trsar et al. | |
| 2004/0172177 A1 | 9/2004 | Nagai et al. | |
| 2005/0027403 A1 | 2/2005 | Nagai | |
| 2006/0030981 A1 | 2/2006 | Robb et al. | |
| 2008/0256440 A1 | 10/2008 | Boreham et al. | |
| 2009/0259358 A1 | 10/2009 | Andreasen | |
| 2011/0035094 A1 | 2/2011 | Van Den Berg et al. | |
| 2012/0215491 A1 | 8/2012 | Theriot et al. | |
| 2013/0221973 A1 | 8/2013 | Whisenand et al. | |
| 2014/0075356 A1 | 3/2014 | Gray et al. | |
| 2014/0244213 A1 | 8/2014 | Theriot et al. | |
| 2015/0121275 A1 | 4/2015 | Marshall et al. | |
| 2015/0371457 A1 | 12/2015 | Bakfan et al. | |
| 2016/0055686 A1 | 2/2016 | Ukai et al. | |
| 2016/0124587 A1 | 5/2016 | Covington et al. | |
| 2016/0124605 A1 | 5/2016 | Covington et al. | |
| 2016/0124609 A1 | 5/2016 | Covington et al. | |
| 2016/0124612 A1 | 5/2016 | Covington et al. | |
| 2016/0124635 A1 | 5/2016 | Covington et al. | |
| 2017/0039059 A1 | 2/2017 | Gintz et al. | |
| 2017/0134537 A1 | 5/2017 | O'Mahony et al. | |
| 2017/0372533 A1 | 12/2017 | Merg | |
| 2018/0047222 A1 | 2/2018 | Lewis et al. | |
| 2018/0047223 A1 | 2/2018 | Lewis et al. | |
| 2018/0201236 A1 | 7/2018 | Merg et al. | |
| 2018/0314255 A1 | 11/2018 | Nistler | |
| 2018/0357614 A1 | 12/2018 | Merg et al. | |
| 2019/0050458 A1 | 2/2019 | Merg et al. | |
| 2019/0311556 A1 | 10/2019 | Thron | |
| 2020/0134933 A1 | 4/2020 | Covington et al. | |
| 2020/0134934 A1 | 4/2020 | Covington et al. | |
| 2020/0184743 A1 | 6/2020 | Merg et al. | |
| 2020/0184745 A1 | 6/2020 | Merg et al. | |
| 2020/0242860 A1 | 7/2020 | Merg et al. | |
| 2021/0049836 A1 | 2/2021 | Covington et al. | |
| 2021/0049844 A1 | 2/2021 | Covington | |
| 2021/0173016 A1 | 6/2021 | Whisenand et al. | |
| 2021/0264383 A1 | 8/2021 | Kleinhans et al. | |
| 2021/0279155 A1 | 9/2021 | Theriot et al. | |
| 2022/0027023 A1 | 1/2022 | Merg et al. | |
| 2022/0375274 A1 | 11/2022 | Chen | |
| 2023/0192112 A1 | 6/2023 | Merg et al. | |
| 2023/0196850 A1 | 6/2023 | Weiland et al. | |
| 2023/0252824 A1 | 8/2023 | Merg et al. | |
| 2023/0252830 A1 | 8/2023 | Merg et al. | |

OTHER PUBLICATIONS

Smog-Tech-Training; Testing O2 Sensor 2017 Update Class; downloaded from the world wide web at https://www.smog-tech-training.com/TestingO2Sensor.html on Jul. 7, 2021.

mechanics.stackexchange.com; Motor Vehicle Maintenance & Repair, Difference between banks for AFR & O2 sensor values; downloaded from the World Wide Web at https://mechanics.stackexchange.com/questions/67962/difference-between-banks-for-afr-o2-sensor-values on Jul. 7, 2021.

Snap-On Incorporated; Zeus User Manual, ZEEMS342A, Rev. F; Jun. 26, 2018; copy of document provided via 15 PDF files.

Tektronix; YYZs of Oscilloscopes, Primer; Jan. 2016.

Tektronix; User Manual, TDS1000- and TDS2000-Series Digital Storage Oscilloscope 071-1064-00; Feb. 6, 2002, document provided via 6 PDF files*.

Marinucci, Dan; Shotgun diagnosis often counterproductive; Tire Business; Sep. 29, 2014; downloaded from the world wide web at https://www.tirebusiness.com/article/20140929/ISSUE/309299980/shotgun-diagnosis-often-counterproductive.

International Searching Authority; Notification of transmittal of the international search report and the written opinion of the International Searching Authority, or the declaration regarding international application No. PCT/US2022/081612, and the international search report and the written opinion; dated Jun. 9, 2023.

International Searching Authority; Invitation to pay additional fees, and where applicable protest fee, along With: (i) Annex to Form PCT/ISA/206 with results of the partial international search, and (ii) provisional opinion for corresponding PCT application No. PCT/US2022/081612 dated Apr. 12, 2023.

NAPA Institute of Automotive Technology; OBD II and Generation Scan Tools; 1998; 144 pages.

Snap-On Incorporated; BMW Vehicle Communication Software Manual, EAZ0025B42B Rev. B; Feb. 2013, 132 pages.

Alyssa Walker; JSON Tutorial: Learn with Simple File Format Example; downloaded from world wide web at https://web.archive.org/web/20211122120401/https://www.guru99.com/json-tutorial-example.html; Oct. 8, 2021, 14 pages.

MDN Web Docs; Working with JSON; downloaded from world wide web at https://web.archive.org/web/20220208085926/https://developer.mozilla.org/en-US/docs/Learn/JavaScript/Objects/JSON; Feb. 8, 2022, 11 pages.

W3 Schools; JavaScript if . . . else; downloaded from the world wide web at https://web.archive. org/web/20220204065407/https://www.w3schools.com/jsref/jsref_if.as; Feb. 4, 2022; 9 pages.

JSON ORG; JSON Example; downloaded at world wide web at https://web.archive.org/web/20220121030538/https://json.org/example.html; Jan. 21, 2022; 10 pages.

Stack Overflow Community; If . . . Then . . . Else using XML; downloaded from world wide web at https://web.archive.org/web/20170202104131/http://stackoverflow.com/questions/6061470/if-then-else-using-XML; Feb. 2, 2017; 4 pages.

W3 Schools; JSON Object Literals; downloaded from the world wide web at https://web.archive.org/web/20220101095825/https://www.w3schools.com/js/js_json_objects.asp; Jan. 1, 2022; 8 pages.

International Searching Authority of Word Intellectual Property Office; Invitation to pay additional fees and, where applicable, protest fee on Form PCT/ISA/206 for corresponding PCT application No. PCT/US2023/062201 dated Jul. 6, 2023.

International Searching Authority of Word Intellectual Property Office; Notification of transmittal of the international search report and the written opinion of the international searching authority, or the declaration; the international search report; and written opinion of the international searching authority; all for international application No. PCT/US2023/062201; mailed Aug. 29, 2023.

International Searching Authority; Notification of transmittal of the international search report and the written opinion of the International Searching Authority, or the declaration; the international search report, and the written opinion regarding international patent application No. PCT/US2023/064903; dated Jun. 12, 2023.

* cited by examiner

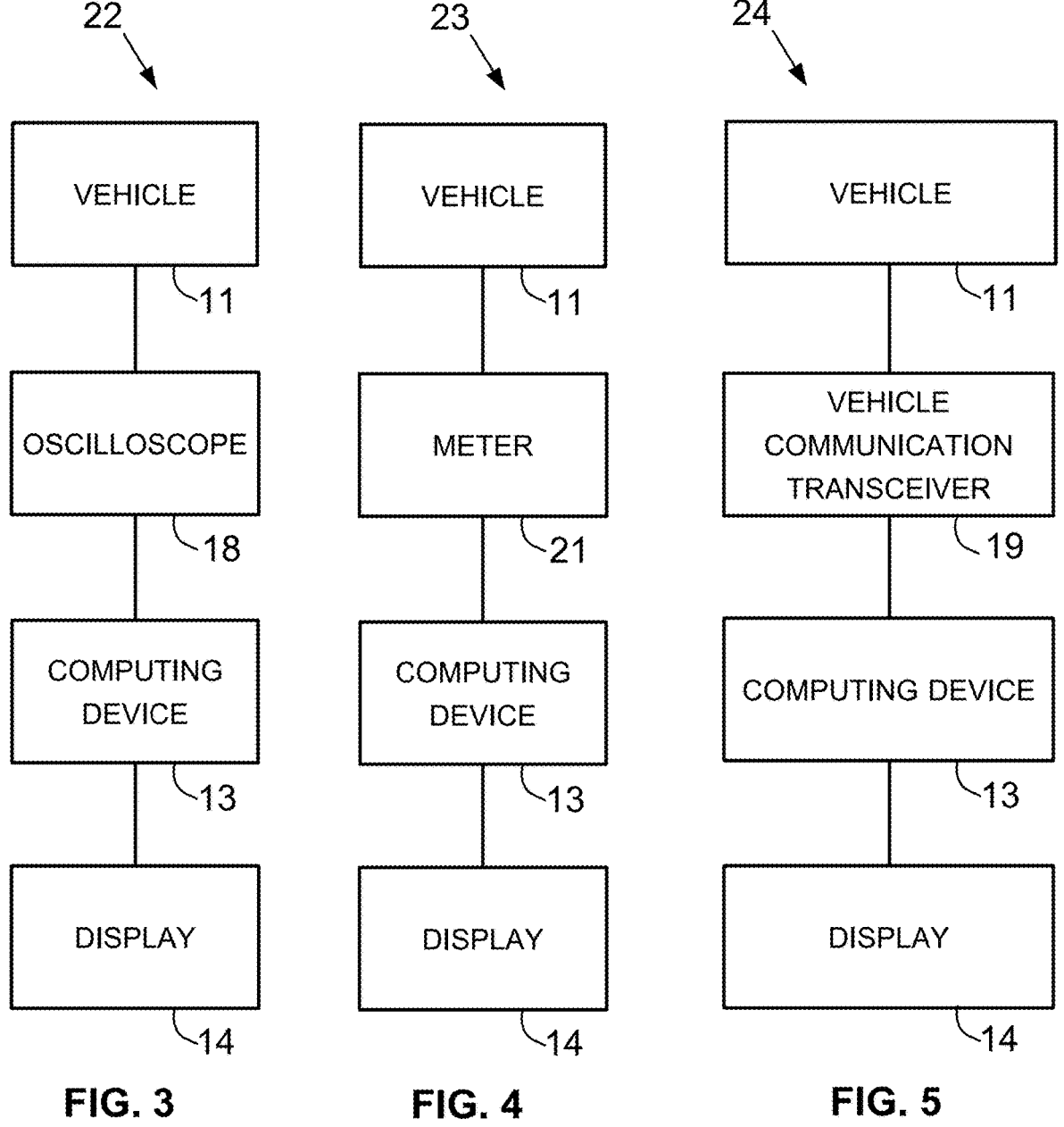
FIG. 3   FIG. 4   FIG. 5

| Pin | Wire color | Function | Circuit ID |
|---|---|---|---|
| A | White | Exhaust CMP sensor - Bank-1 - signal | 100 |
| B | Pink | Exhaust CMP sensor - Bank-1 - voltage feed | 167 |
| C | Black | Exhaust CMP sensor - Bank-1 - ground | 218 |

Figure 12:
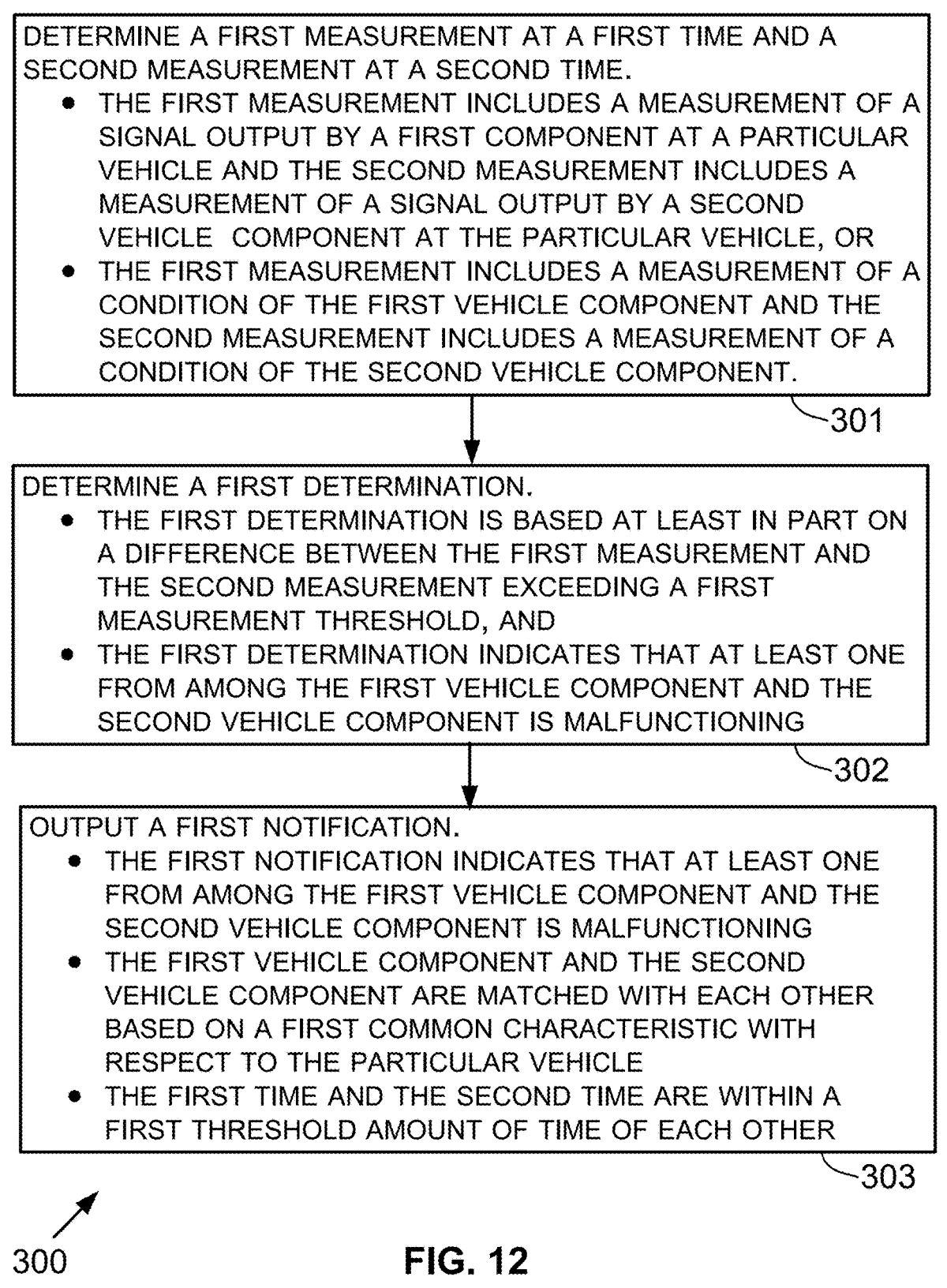

DETERMINE A FIRST MEASUREMENT AT A FIRST TIME AND A SECOND MEASUREMENT AT A SECOND TIME.
- THE FIRST MEASUREMENT INCLUDES A MEASUREMENT OF A SIGNAL OUTPUT BY A FIRST COMPONENT AT A PARTICULAR VEHICLE AND THE SECOND MEASUREMENT INCLUDES A MEASUREMENT OF A SIGNAL OUTPUT BY A SECOND VEHICLE COMPONENT AT THE PARTICULAR VEHICLE, OR
- THE FIRST MEASUREMENT INCLUDES A MEASUREMENT OF A CONDITION OF THE FIRST VEHICLE COMPONENT AND THE SECOND MEASUREMENT INCLUDES A MEASUREMENT OF A CONDITION OF THE SECOND VEHICLE COMPONENT.

⎯301

DETERMINE A FIRST DETERMINATION.
- THE FIRST DETERMINATION IS BASED AT LEAST IN PART ON A DIFFERENCE BETWEEN THE FIRST MEASUREMENT AND THE SECOND MEASUREMENT EXCEEDING A FIRST MEASUREMENT THRESHOLD, AND
- THE FIRST DETERMINATION INDICATES THAT AT LEAST ONE FROM AMONG THE FIRST VEHICLE COMPONENT AND THE SECOND VEHICLE COMPONENT IS MALFUNCTIONING

⎯302

OUTPUT A FIRST NOTIFICATION.
- THE FIRST NOTIFICATION INDICATES THAT AT LEAST ONE FROM AMONG THE FIRST VEHICLE COMPONENT AND THE SECOND VEHICLE COMPONENT IS MALFUNCTIONING
- THE FIRST VEHICLE COMPONENT AND THE SECOND VEHICLE COMPONENT ARE MATCHED WITH EACH OTHER BASED ON A FIRST COMMON CHARACTERISTIC WITH RESPECT TO THE PARTICULAR VEHICLE
- THE FIRST TIME AND THE SECOND TIME ARE WITHIN A FIRST THRESHOLD AMOUNT OF TIME OF EACH OTHER

| Veh. ID | Matched Vehicle Components | Job | CKT ID | ECU | PID | Protocol | Delta Threshold | Instructions |
|---|---|---|---|---|---|---|---|---|
| V1 | A - ECT Sensor 1 | Null | 8 | PCM | $AA | CAN ISO 11898 | 0.35 VDC | ICE cold, start ICE |
| V1 | A - ECT Sensor 2 | Null | 12 | PCM | $AB | CAN ISO 11898 | 0.35 VDC | ICE cold, start ICE |
| V1 | B - MAF Sensor 1 | Null | 47 | PCM | $C3 | CAN ISO 11898 | 0.35 VDC | Idle, snap throttle |
| V1 | B - MAF Sensor 2 | Null | 118 | PCM | $C4 | CAN ISO 11898 | 0.35 VDC | Idle, snap throttle |
| V2 | C - ECT Sensor 1 | Null | 13 | PCM | $44 | SAE J1850 PWM | 14° C | ICE cold, start ICE |
| V2 | C - ECT Sensor 2 | Null | 75 | PCM | $45 | SAE J1850 PWM | 14° C | ICE cold, start ICE |
| V3 | D - LF Wheel Speed Sensor | Null | 15 | ABS | $28 | SAE J1850 PWM | 3.2 kph | Drive vehicle straight |
| V3 | D - RF Wheel Speed Sensor | Null | 25 | ABS | $29 | SAE J1850 PWM | 3.2 kph | Drive vehicle straight |
| V3 | D - LR Wheel Speed Sensor | Null | 35 | ABS | $2A | SAE J1850 PWM | 3.2 kph | Drive vehicle straight |
| V3 | D - RR Wheel Speed Sensor | Null | 45 | ABS | $2B | SAE J1850 PWM | 3.2 kph | Drive vehicle straight |
| V3 | E - Boost Pressure Sensor - Bank-1 | Null | 101 | PCM | $78 | SAE J1850 PWM | 2.5 Hg | Idle, snap throttle |
| V3 | E - Boost Pressure Sensor - Bank-2 | Null | 111 | PCM | $79 | SAE J1850 PWM | 2.5 Hg | Idle, snap throttle |
| V3 | F - Manifold Pressure Sensor - Bank-1 | Null | 121 | PCM | $D4 | SAE J1850 PWM | 2.5 Hg | Idle, snap throttle |
| V3 | F - Manifold Pressure Sensor - Bank-2 | Null | 131 | PCM | $D4 | SAE J1850 PWM | 2.5 Hg | Idle, snap throttle |
| V3 | G - Throttle Angle Sensor-1 | Null | 141 | PCM | $4C | SAE J1850 PWM | 2.5° | Idle, snap throttle |
| V3 | G - Throttle Angle Sensor-2 | Null | 151 | PCM | $4D | SAE J1850 PWM | 2.5° | Idle, snap throttle |
| V4 | H - Heated Seat - Left | Null | 218 | BCM | $15 | SAE J1850 PWM | 4° C | Seats cold, turn seats on simultaneously |
| V4 | H - Heated Seat - Right | Null | 219 | BCM | $16 | SAE J1850 PWM | 4° C | Seats cold, turn seats on simultaneously |

| Vehicle ID | Matched Vehicle Components | Job | Circuit ID | ECU | PID | Protocol | Delta Threshold | Instructions |
|---|---|---|---|---|---|---|---|---|
| VI5 | J - ECT Sensor 1 | J3 | 99 | PCM | $AA | CAN ISO 11898 | 0.35 VDC | ICE cold, start ICE |
| VI5 | J - ECT Sensor 2 | J3 | 100 | PCM | $AB | CAN ISO 11898 | 0.35 VDC | ICE cold, start ICE |
| VI5 | K - MAF Sensor - Bank-1 | Null | 313 | PCM | $C3 | CAN ISO 11898 | 0.35 VDC | Idle, snap throttle |
| VI5 | K - MAF Sensor - Bank-2 | Null | 314 | PCM | $C4 | CAN ISO 11898 | 0.35 VDC | Idle, snap throttle |
| VI5 | L - Rail Pressure Sensor - Bank-1 | Null | 505 | PCM | $44 | CAN ISO 11898 | 0.35 VDC | Idle, snap throttle |
| VI5 | L - Rail Pressure Sensor - Bank-2 | Null | 506 | PCM | $45 | CAN ISO 11898 | 0.35 VDC | Idle, snap throttle |
| VI5 | M - LF Tire Pressure Sensor | J1 | 16 | SCM | $30 | SAE J1850 PWM | 7 kPa | Inflate tire to spec. pr. |
| VI5 | M - RF Tire Pressure Sensor | J1 | 116 | SCM | $31 | SAE J1850 PWM | 7 kPa | Inflate tire to spec. pr. |
| VI5 | M - LR Tire Pressure Sensor | J1 | 216 | SCM | $32 | SAE J1850 PWM | 7 kPa | Inflate tire to spec. pr. |
| VI5 | M - RR Tire Pressure Sensor | J1 | 316 | SCM | $33 | SAE J1850 PWM | 7 kPa | Inflate tire to spec. pr. |
| VI5 | N - LF Ride Height Sensor | J1 | 48 | SCM | $9A | SAE J1850 PWM | 4 cm | Vehicle on level surface |
| VI5 | N - RF Ride Height Sensor | J1 | 49 | SCM | $9B | SAE J1850 PWM | 4 cm | Vehicle on level surface |
| VI5 | N - LR Ride Height Sensor | J1 | 50 | SCM | $9C | SAE J1850 PWM | 4 cm | Vehicle on level surface |
| VI5 | N - RR Ride Height Sensor | J1 | 51 | SCM | $9D | SAE J1850 PWM | 4 cm | Vehicle on level surface |
| VI5 | O - Throttle Angle Sensor - Bank-1 | Null | 141 | PCM | $4C | CAN ISO 11898 | 2.5° | Idle, snap throttle |
| VI5 | O - Throttle Angle Sensor - Bank-2 | Null | 151 | PCM | $4D | CAN ISO 11898 | 2.5° | Idle, snap throttle |
| VI5 | P - LF Wheel Speed Sensor | J7 | 15 | ABS | $28 | SAE J1850 PWM | 3.2 kph | Drive vehicle straight |
| VI5 | P - RF Wheel Speed Sensor | J7 | 25 | ABS | $29 | SAE J1850 PWM | 3.2 kph | Drive vehicle straight |
| VI5 | P - LR Wheel Speed Sensor | J7 | 35 | ABS | $2A | SAE J1850 PWM | 3.2 kph | Drive vehicle straight |
| VI5 | P - RR Wheel Speed Sensor | J7 | 45 | ABS | $2B | SAE J1850 PWM | 3.2 kph | Drive vehicle straight |
| 291 | 292 | 293 | 294 | 295 | 296 | 297 | 298 | 299 |

| Veh. ID | Matched Vehicle Components | Job | CKT ID | ECU | PID | Protocol | Delta Threshold | Instructions |
|---|---|---|---|---|---|---|---|---|
| VI5 | Q - Exhaust CMP Sensor - Bank-1 | Null | 100 | PCM | $E4 | CAN ISO 11898 | 2.5° | Idle, snap throttle |
| VI5 | Q - Exhaust CMP Sensor - Bank-2 | Null | 105 | PCM | $E5 | CAN ISO 11898 | 2.5° | Idle, snap throttle |
| VI5 | R - Intake CMP Sensor - Bank-1 | Null | 110 | PCM | $E6 | CAN ISO 11898 | 2.5° | Idle, snap throttle |
| VI5 | R - Intake CMP Sensor - Bank-2 | Null | 115 | PCM | $E7 | CAN ISO 11898 | 2.5° | Idle, snap throttle |
| VI5 | S - LF Brake Pressure Sensor | Null | 611 | ABS | $2C | SAE J1850 PWM | 6.5 kph | Drive vehicle |
| VI5 | S - RF Brake Pressure Sensor | Null | 612 | ABS | $2D | SAE J1850 PWM | 6.5 kph | Drive vehicle |
| VI5 | S - LR Brake Pressure Sensor | Null | 613 | ABS | $2E | SAE J1850 PWM | 6.5 kph | Drive vehicle |
| VI5 | S - RR Brake Pressure Sensor | Null | 614 | ABS | $2F | SAE J1850 PWM | 6.5 kph | Drive vehicle |
| VI5 | T - Intake Air Temp. Sensor - Bank-1 | Null | 91 | PCM | $F0 | SAE J1850 PWM | 6° C | Null |
| VI5 | T - Intake Air Temp. Sensor - Bank-2 | Null | 92 | PCM | $F1 | SAE J1850 PWM | 6° C | Null |
| VI5 | U - Pre-converter O2 Sensor - Bank-1 | Null | 777 | PCM | $3A | SAE J1850 PWM | 14° C | Null |
| VI5 | U - Pre-converter O2 Sensor - Bank-2 | Null | 778 | PCM | $3B | SAE J1850 PWM | 14° C | Null |
| VI5 | V - Post-converter O2 Sensor - Bank-1 | Null | 779 | PCM | $3C | SAE J1850 PWM | 14° C | Null |
| VI5 | V - Post-converter O2 Sensor - Bank-2 | Null | 780 | PCM | $3D | SAE J1850 PWM | 14° C | Null |
| VI5 | W - Pre-converter O2 Sensor Heater - Bank-1 | Null | 801 | PCM | $80 | SAE J1850 PWM | 1.5 V | Null |
| VI5 | W - Pre-converter O2 Sensor Heater - Bank-2 | Null | 802 | PCM | $81 | SAE J1850 PWM | 1.5 V | Null |

| Veh. ID | Matched Vehicle Components | Job | CKT ID | ECU | PID | Protocol | Delta Threshold | Instructions |
|---|---|---|---|---|---|---|---|---|
| VI6 | X - Battery module 1 (voltage) | Null | 90 | CMU1 | $D1 | CAN ISO 11898 | 2.0 VDC | Null |
| VI6 | X - Battery module 2 (voltage) | Null | 91 | CMU2 | $D2 | CAN ISO 11898 | 2.0 VDC | Null |
| VI6 | X - Battery module 3 (voltage) | Null | 92 | CMU3 | $D3 | CAN ISO 11898 | 2.0 VDC | Null |
| VI6 | X - Battery module 4 (voltage) | Null | 93 | CMU4 | $D4 | CAN ISO 11898 | 2.0 VDC | Null |
| VI6 | X - Battery module 5 (voltage) | Null | 94 | CMU5 | $D5 | CAN ISO 11898 | 2.0 VDC | Null |
| VI6 | X - Battery module 6 (voltage) | Null | 95 | CMU6 | $D6 | CAN ISO 11898 | 2.0 VDC | Null |
| VI6 | X - Battery module 7 (voltage) | Null | 96 | CMU7 | $D7 | CAN ISO 11898 | 2.0 VDC | Null |
| VI6 | X - Battery module 8 (voltage) | Null | 97 | CMU8 | $D8 | CAN ISO 11898 | 2.0 VDC | Null |
| VI6 | X - Battery module 9 (voltage) | Null | 98 | CMU9 | $D9 | CAN ISO 11898 | 2.0 VDC | Null |
| VI6 | Y - Battery module 1 (resistance) | Null | 70 | CMU1 | $DA | CAN ISO 11898 | 0.5 ohms | Null |
| VI6 | Y - Battery module 2 (resistance) | Null | 71 | CMU2 | $DB | CAN ISO 11898 | 0.5 ohms | Null |
| VI6 | Y - Battery module 3 (resistance) | Null | 72 | CMU3 | $DC | CAN ISO 11898 | 0.5 ohms | Null |
| VI6 | Y - Battery module 4 (resistance) | Null | 73 | CMU4 | $DD | CAN ISO 11898 | 0.5 ohms | Null |
| VI6 | Y - Battery module 5 (resistance) | Null | 74 | CMU5 | $DE | CAN ISO 11898 | 0.5 ohms | Null |
| VI6 | Y - Battery module 6 (resistance) | Null | 75 | CMU6 | $DF | CAN ISO 11898 | 0.5 ohms | Null |
| VI6 | Y - Battery module 7 (resistance) | Null | 76 | CMU7 | $E0 | CAN ISO 11898 | 0.5 ohms | Null |
| VI6 | Y - Battery module 8 (resistance) | Null | 77 | CMU8 | $E2 | CAN ISO 11898 | 0.5 ohms | Null |
| VI6 | Y - Battery module 9 (resistance) | Null | 78 | CMU9 | $E3 | CAN ISO 11898 | 0.5 ohms | Null |
| VI6 | Z - Battery module 1 (temperature) | Null | 60 | CMU1 | $E4 | CAN ISO 11898 | 4° F | Null |
| VI6 | Z - Battery module 2 (temperature) | Null | 61 | CMU2 | $E5 | CAN ISO 11898 | 4° F | Null |
| VI6 | Z - Battery module 3 (temperature) | Null | 62 | CMU3 | $E6 | CAN ISO 11898 | 4° F | Null |
| VI6 | Z - Battery module 4 (temperature) | Null | 63 | CMU4 | $E7 | CAN ISO 11898 | 4° F | Null |
| 291 | 292 | 293 | 294 | 295 | 296 | 297 | 298 | 299 |

| Time (left seat) | Left Seat Temp. °C | Time (right seat) | Right Seat Temp. °C | Current Difference Left to Right Temp. °C | Percentage - Current Difference Left to Right Temp. | Change in Left Seat Temp. °C every 4 seconds | Change in Right Seat Temp. °C every 4 seconds |
|---|---|---|---|---|---|---|---|
| 1:12:00.000 | 0 | 1:12:00.001 | 0 | 0 | 0 | Null | Null |
| 1:14:00.000 | 5 | 1:14:00.001 | 4 | 1 | 25 | Null | Null |
| 1:16:00.000 | 10 | 1:16:00.001 | 8 | 2 | 25 | 10 | 8 |
| 1:18:00.000 | 15 | 1:18:00.001 | 11 | 4 | 36 | 10 | 7 |
| 1:20:00.000 | 20 | 1:20:00.001 | 14 | 6 | 42 | 10 | 6 |
| 1:22:00.000 | 25 | 1:22:00.001 | 17 | 8 | 47 | 10 | 6 |
| 1:24:00.000 | 30 | 1:24:00.001 | 21 | 9 | 42 | 10 | 7 |
| 1:26:00.000 | 35 | 1:26:00.001 | 22 | 13 | 59 | 10 | 5 |
| 1:28:00.000 | 40 | 1:28:00.001 | 23 | 17 | 74 | 10 | 2 |
| 1:30:00.000 | 45 | 1:30:00.001 | 23 | 22 | 96 | 10 | 1 |
| 1:32:00.000 | 45 | 1:32:00.001 | 23 | 22 | 96 | 5 | 0 |
| 1:34:00.000 | 45 | 1:34:00.001 | 23 | 22 | 96 | 0 | 0 |
| | 311 | 312 | 313 | 314 | 315 | 316 | 317 | 318 |

| Time | Left Seat Temp. °C | Right Seat Temp. °C | Current Difference Left to Right Temp. °C | Percentage Current Difference versus Right Seat Temp. | Change in Left Seat Temp. °C every 4 seconds | Change in Right Seat Temp. °C every 4 seconds |
|---|---|---|---|---|---|---|
| 1:12:00.000 | 0 | 0 | 0 | 0 | Null | Null |
| 1:14:00.000 | 5 | 4 | 1 | 25 | Null | Null |
| 1:16:00.000 | 10 | 8 | 2 | 25 | 10 | 8 |
| 1:18:00.000 | 15 | 11 | 4 | 36 | 10 | 7 |
| 1:20:00.000 | 20 | 14 | 6 | 42 | 10 | 6 |
| 1:22:00.000 | 25 | 17 | 8 | 47 | 10 | 6 |
| 1:24:00.000 | 30 | 21 | 9 | 42 | 10 | 7 |
| 1:26:00.000 | 35 | 22 | 13 | 59 | 10 | 5 |
| 1:28:00.000 | 40 | 23 | 17 | 74 | 10 | 2 |
| 1:30:00.000 | 45 | 23 | 22 | 96 | 10 | 1 |
| 1:32:00.000 | 45 | 23 | 22 | 96 | 5 | 0 |
| 1:34:00.000 | 45 | 23 | 22 | 96 | 0 | 0 |

321    322    323    324    325    326    327

| Time 331 | PID - PID Description / Channel 332 | Measurement 333 |
|---|---|---|
| 2:18:40.000 | $0A - Temp. Sensor-1 / Ch. 1 | 2.00 VDC, 60°C |
| 2:18:40.001 | $0B - Temp. Sensor-2 / Ch. 2 | 1.98 VDC, 59°C |
| 2:18:40.005 | $D4 - Temp. Sensor-3 / Ch. 3 | 2.04 VDC, 62°C |
| 2:21:40.000 | $0A - Temp. Sensor-1 / Ch. 1 | 2.02 VDC, 61°C |
| 2:21:40.001 | $0B - Temp. Sensor-2 / Ch. 2 | 2.00 VDC, 60°C |
| 2:21:40.005 | $D4 - Temp. Sensor-3 / Ch. 3 | 2.06 VDC, 63°C |
| 2:24:40.000 | $0A - Temp. Sensor-1 / Ch. 1 | 2.04 VDC, 62°C |
| 2:24:40.001 | $0B - Temp. Sensor-2 / Ch. 2 | 2.02 VDC, 61°C |
| 2:24:40.005 | $D4 - Temp. Sensor-3 / Ch. 3 | 2.08 VDC, 64°C |
| 2:27:40.000 | $0A - Temp. Sensor-1 / Ch. 1 | 2.06 VDC, 63°C |
| 2:27:40.001 | $0B - Temp. Sensor-2 / Ch. 2 | 2.04 VDC, 62°C |
| 2:27:40.005 | $D4 - Temp. Sensor-3 / Ch. 3 | 2.10 VDC, 65°C |
| 2:30:40.000 | $0A - Temp. Sensor-1 / Ch. 1 | 2.08 VDC, 64°C |
| 2:30:40.001 | $0B - Temp. Sensor-2 / Ch. 2 | 2.06 VDC, 63°C |
| 2:30:40.005 | $D4 - Temp. Sensor-3 / Ch. 3 | 2.12 VDC, 66°C |
| 2:33:40.000 | $0A - Temp. Sensor-1 / Ch. 1 | 2.10 VDC, 65°C |
| 2:33:40.001 | $0B - Temp. Sensor-2 / Ch. 2 | 2.08 VDC, 64°C |
| 2:33:40.005 | $D4 - Temp. Sensor-3 / Ch. 3 | 2.14 VDC, 67°C |

| Time 341 | PID - PID Description / Channel 342 | Measurement 343 |
|---|---|---|
| 2:18:40.000 | $0A - Temp. Sensor-1 / Ch. 1 | 2.00 VDC, 60°C |
| 2:18:40.001 | $0B - Temp. Sensor-2 / Ch. 2 | 3.98 VDC, 159°C |
| 2:18:40.005 | $D4 - Temp. Sensor-3 / Ch. 3 | 2.04 VDC, 62°C |
| 2:21:40.000 | $0A - Temp. Sensor-1 / Ch. 1 | 2.02 VDC, 61°C |
| 2:21:40.001 | $0B - Temp. Sensor-2 / Ch. 2 | 4.00 VDC, 160°C |
| 2:21:40.005 | $D4 - Temp. Sensor-3 / Ch. 3 | 2.06 VDC, 63°C |
| 2:24:40.000 | $0A - Temp. Sensor-1 / Ch. 1 | 2.04 VDC, 62°C |
| 2:24:40.001 | $0B - Temp. Sensor-2 / Ch. 2 | 4.02 VDC, 161°C |
| 2:24:40.005 | $D4 - Temp. Sensor-3 / Ch. 3 | 2.08 VDC, 64°C |
| 2:27:40.000 | $0A - Temp. Sensor-1 / Ch. 1 | 2.06 VDC, 63°C |
| 2:27:40.001 | $0B - Temp. Sensor-2 / Ch. 2 | 4.04 VDC, 162°C |
| 2:27:40.005 | $D4 - Temp. Sensor-3 / Ch. 3 | 2.10 VDC, 65°C |
| 2:30:40.000 | $0A - Temp. Sensor-1 / Ch. 1 | 2.08 VDC, 64°C |
| 2:30:40.001 | $0B - Temp. Sensor-2 / Ch. 2 | 4.06 VDC, 163°C |
| 2:30:40.005 | $D4 - Temp. Sensor-3 / Ch. 3 | 2.12 VDC, 66°C |
| 2:33:40.000 | $0A - Temp. Sensor-1 / Ch. 1 | 2.10 VDC, 65°C |
| 2:33:40.001 | $0B - Temp. Sensor-2 / Ch. 2 | 4.08 VDC, 164°C |
| 2:33:40.005 | $D4 - Temp. Sensor-3 / Ch. 3 | 2.14 VDC, 67°C |

METHOD AND SYSTEM FOR TESTING MATCHED COMPONENTS OF VEHICLE

REFERENCE TO RELATED APPLICATION

This application is a continuation application of U.S. patent application Ser. No. 17/557,186, which was filed on Dec. 21, 2021 and was published as United States Patent Application Publication No. 2023/0196850 A1 on Jun. 22, 2023. U.S. patent application Ser. No. 17/557,186 and United States Patent Application Publication No. 2023/0196850 A1 are incorporated herein by reference.

BACKGROUND

A vehicle, such as an automobile, periodically requires maintenance or some other type of service to keep the vehicle operational. The vehicle can include many different vehicle components. Some vehicle components of some vehicles are electronic vehicle components. Servicing or maintaining electronic vehicle components can include measuring one or more characteristics of an electrical signal within the electronic vehicle component or within an electrical circuit connected to the electronic vehicle component. In some cases, a vehicle includes electronic vehicle components that perform similar functions for different portions of the vehicle. For example, some vehicles include electronic vehicle components for heating and/or cooling a first seat for a first vehicle passenger and a second seat for a second vehicle passenger. An improved way of testing such vehicle components is desirable.

Overview

In a first implementation, a method is provided. The method includes determining, by a processor, a first measurement at a first time and a second measurement at a second time. The first measurement includes a measurement of a signal output by a first vehicle component at a particular vehicle and the second measurement includes a measurement of a signal output by a second vehicle component at the particular vehicle, or the first measurement includes a measurement of a condition of the first vehicle component and the second measurement includes a measurement of a condition of the second vehicle component. The method also includes determining, by the processor, a first determination. The first determination is based at least in part on a difference between the first measurement and the second measurement exceeding a first measurement threshold. The first determination indicates that at least one from among the first vehicle component and the second vehicle component is malfunctioning. The method also includes outputting, by the processor, a first notification. The first notification indicates that at least one from among the first vehicle component and the second vehicle component is malfunctioning. The first vehicle component and the second vehicle component are matched with each other based on a first common characteristic with respect to the particular vehicle. The first time and the second time are within a first threshold amount of time of each other.

In a second implementation, a computing system is provided. The computing system comprises a processor, a display screen, and a non-transitory computer-readable memory. The non-transitory computer-readable memory contains executable instructions. Execution of the executable instructions by the processor causes the computing system to perform functions comprising determining, by the processor, a first measurement at a first time. The first measurement includes a measurement of a signal output by or a condition of a first vehicle component at a particular vehicle. The functions also include determining, by the processor, a second measurement at a second time. The second measurement includes a measurement of a signal output by or a condition of a second vehicle component at the particular vehicle. The functions further include determining, by the processor, a first determination. The first determination is based at least in part on a difference between the first measurement and the second measurement exceeding a first measurement threshold. The first determination indicates that at least one from among the first vehicle component and the second vehicle component is malfunctioning. The functions further include outputting, by the processor, a first notification. The first notification indicates that at least one from among the first vehicle component and the second vehicle component is malfunctioning. The first vehicle component and the second vehicle component are matched with each other based on a first common characteristic with respect to the particular vehicle. The first time and the second time are within a first threshold amount of time of each other.

In a third implementation, a computer-readable medium is provided. The computer readable medium has stored therein instructions executable by one or more processors to cause a computing system to perform functions comprising determining, by the processor, a first measurement at a first time. The first measurement includes a measurement of a signal output by or a condition of a first vehicle component at a particular vehicle. The functions also include determining, by the processor, a second measurement at a second time. The second measurement includes a measurement of a signal output by or a condition of a second vehicle component at the particular vehicle. The functions further include determining, by the processor, a first determination. The first determination is based at least in part on a difference between the first measurement and the second measurement exceeding a first measurement threshold. The first determination indicates that at least one from among the first vehicle component and the second vehicle component is malfunctioning. The functions further include outputting, by the processor, a first notification. The first notification indicates that at least one from among the first vehicle component and the second vehicle component is malfunctioning. The first vehicle component and the second vehicle component are matched with each other based on a first common characteristic with respect to the particular vehicle. The first time and the second time are within a first threshold amount of time of each other.

In a fourth implementation, a computing system is provided. The computing system includes means for determining a first measurement at a first time. The first measurement includes a measurement of a signal output by or a condition of a first vehicle component at a particular vehicle. The computing system includes means for determining a second measurement at a second time. The second measurement includes a measurement of a signal output by or a condition of a second vehicle component at the particular vehicle. The computing system includes means for determining a first determination. The first determination is based at least in part on a difference between the first measurement and the second measurement exceeding a first measurement threshold. The first determination indicates that at least one from among the first vehicle component and the second vehicle component is malfunctioning. The computing system includes means for outputting a first notification. The first notification indicates that at least one from among the first vehicle component and the second vehicle component is malfunctioning. The first vehicle component and the second vehicle component are matched with each other based on a first common characteristic with respect to the particular vehicle. The first time and the second time are within a first threshold amount of time of each other.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

FIG. 1, FIG. 2, FIG. 3, FIG. 4, and FIG. 5 are block diagrams of a system in accordance with the example implementations.

FIG. 12 depicts a flow chart showing an example method in accordance with the example implementations.

FIG. 30, FIG. 31, FIG. 32, FIG. 33, FIG. 34, FIG. 35, FIG. 36, and FIG. 37 show data in accordance with the example implementations.

Figure 1:
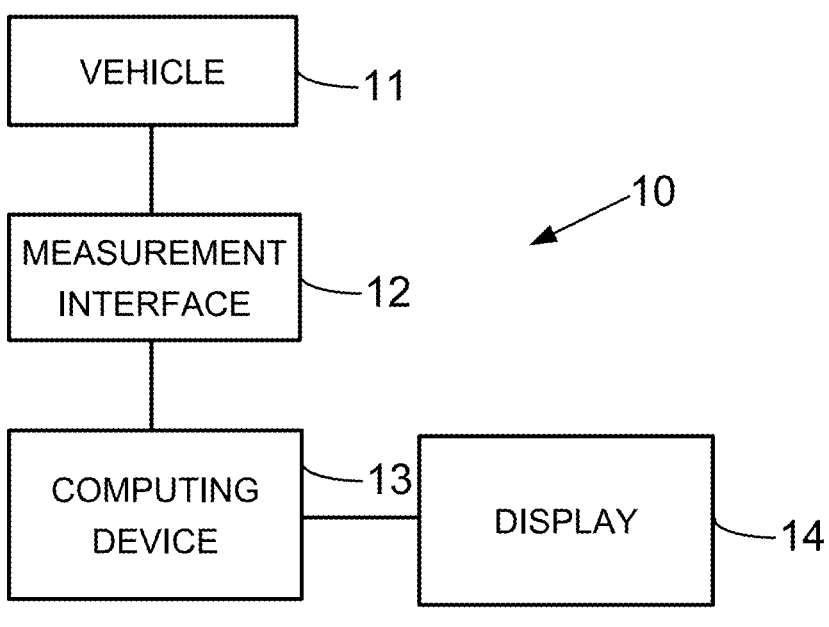

All the figures are schematic, not necessarily to scale, and generally only show parts which are necessary to elucidate example embodiments, wherein other parts may be omitted or merely suggested.

DETAILED DESCRIPTION

I. Introduction

This description describes several example implementations, at least some which pertain to using a computing system and/or component(s) thereof to make measurements of signals output by matched vehicle components or to make measurements of conditions of the matched vehicle components. The computing system and/or component(s) thereof determine a difference between the measurements and whether the difference exceeds a measurement threshold. If the difference exceeds the measurement threshold, a determination made by the computing system and/or component (s) thereof indicates one or more of the matched vehicle components is malfunctioning. The computing system and/or component(s) thereof can output a notification indicating one or more of the matched vehicle components is malfunctioning. The matched vehicle components are matched with each other based on a common characteristic with respect to the vehicle including the vehicle components. The difference can be an absolute value of a difference between two measurements.

In at least some implementations, determining whether a difference exceeds a measurement threshold can also include determining whether the difference does not exceed a measurement threshold (i.e., less than the measurement threshold) and/or whether the difference equals the measurement threshold. A determination that the difference does not exceed the measurement threshold can be used, at least preliminarily, determining that the matched vehicle components are operating similarly or substantially similarly. Additionally, in at least some implementations, a determination that the difference equals the measurement threshold can be treated as a determination that the difference exceeds the measurement threshold, such that the computing system carries out functions described as being performed if the determination is that the difference exceeds the measurement threshold. Alternatively, in at least some implementations, a determination that the difference equals the measurement threshold can be treated as a determination that the difference does not exceed the measurement threshold, such that the computing system carries out functions described as being performed if the determination is that the difference does not exceed the measurement threshold.

As an example, the matched vehicle components can include electronic vehicle components on opposite banks of an internal combustion engine (ICE). The opposite banks could, for example, be left and right banks, front and rear banks, and/or odd numbered cylinder and even numbered cylinder banks. As another example, the matched vehicle components can include electronic vehicle components on opposite sides of a vehicle (e.g., on opposite sides of an imaginary center line that traverses the vehicle longitudinally). In accordance with this example, the matched vehicle components can include left and right side heated seats, left and right side cooled seats, or left and right side front wheel bearings. In an alternative arrangement, the opposite sides of the vehicle can be on opposite sides of an imaginary center line that traverses the vehicle transversely to a length of the vehicle).

In accordance with at least some implementations, the vehicle includes an internal combustion engine (ICE) configured to operate at an idle speed and at an off-idle speed (e.g., any one or multiple off-idle speeds). Some of the measurements can be made while the ICE is operating at idle and other measurements can be made while the ICE is operating at off-idle. A throttle within and/or connected to the ICE can be snapped (e.g., opened and closed quickly) to change the operating speed of the ICE from an idle speed to an off-idle speed and back to the idle speed. Separate measurements of signals output by matched vehicle components or of the conditions of the matched vehicle components can be made at one or more times as the operating speed of the ICE changes. Additionally or alternatively, the measurements pertaining to the matched vehicle components can be made while the vehicle is being driven.

In addition to vehicles having an ICE, this description also describes and pertains to electric vehicles and hybrid vehicles. Each of those types of vehicles can include components (i.e., vehicle components). At least some of those vehicle components can be electrical. The electronic components discussed in this description can include vehicle components that are electrical (e.g., vehicle components that convert electrical energy into other form(s) of energy, such as mechanical, light, sound, or thermal energy) and/or vehicle components configured to control a flow of electrons in order to perform a task.

In many cases, matched vehicle components are connected to an electronic control unit (ECU). The ECU can be programmed to detect when a vehicle component is malfunctioning by detecting that a signal output by the vehicle component breaches a upper or lower threshold corresponding to that vehicle component and/or signal. Upon detecting the breach of that threshold, the ECU can cause a malfunction indicator lamp (MIL) to illuminate, the MIL providing an indication that the vehicle is malfunctioning. The computing system of the example implementations is operable to compare a difference between measurements pertaining to two matched vehicle components to a measurement threshold. Accordingly, the computing system can determine that a vehicle component is malfunctioning even in cases in which the signals output by the matched vehicle components do not breach the thresholds used by the ECU to determine a malfunction.

In accordance with at least still some other implementations, matched vehicle components can be hydraulic vehicle components, pneumatic vehicle components, mechanical vehicle components, or optical vehicle components. At least some of those matched vehicle components can be partially electronic such that the matched vehicle components can include electrical-hydraulic vehicle components, electrical-pneumatic vehicle components, electrical-mechanical vehicle components or electrical-optical vehicle components. The measurements for such vehicle components could include pressure measurements, temperature measurements, vacuum measurements, optical power measurements, or some other type of measurements.

II. Example Systems

FIG. 1 is a block diagram of a system 10 in accordance with example implementations. The system 10 includes a vehicle 11, a measurement interface 12, a computing device 13, and a display 14. In at least some of those implementations, the computing device 13 includes the measurement interface 12 and/or the display 14.

The vehicle 11 can be any one of a number of different vehicles. In other words, the measurement interface 12, the computing device 13, and the display 14 portion of the system 10 can operate with many different vehicles. In at least some implementations, the vehicle 11 is an automobile with an ICE that burns a fuel such as gasoline, diesel fuel, or ethanol. Other examples of the vehicle 11 are described below.

The measurement interface 12 is configured to measure characteristics of the vehicle 11 and/or to provide the computing device 13 with a signal indicative of a measured characteristic of the vehicle. The characteristic can, for example, include an electrical characteristic (e.g., voltage, amperage or resistance), a pressure characteristic (e.g., a positive pressure or a negative pressure (e.g., a vacuum)), a temperature (i.e., thermal) characteristic, or a light level characteristic. In some implementations, the signal is an analog signal or a digital signal.

In some implementations, the measurement interface 12 is operable when the measurement interface 12 contacts a portion of the vehicle 11. For example, the measurement interface 12 can include an oscilloscope, an oscilloscope probe, a measurement meter (e.g., a multi-meter), a meter test lead, a vehicle communication transceiver, a vehicle scan tool, or a dongle. In at least some other implementations, the measurement interface 12 is operable even if not in contact with a portion of the vehicle 11. For example, the measurement interface 12 can include an inductive current probe. As another example, the measurement interface 12 can include a thermal camera operable to detect infrared energy emitted, transmitted or reflected by a vehicle component. As yet another example, the measurement interface 12 can include an antenna operable to receive a radio-frequency signal transmitted by a vehicle component.

The computing device 13 is operatively connectable to the measurement interface 12. In at least some implementations, an operative connection between the measurement interface 12 and the computing device 13 is a wired connection, such as a wired connection that occurs by connecting an oscilloscope probe to an oscilloscope. In at least some other implementations, an operative connection between the measurement interface 12 and the computing device 13 is a wireless connection, such as a wireless connection established by separate radio transceivers within the measurement interface 12 and the computing device 13.

Figure 2:
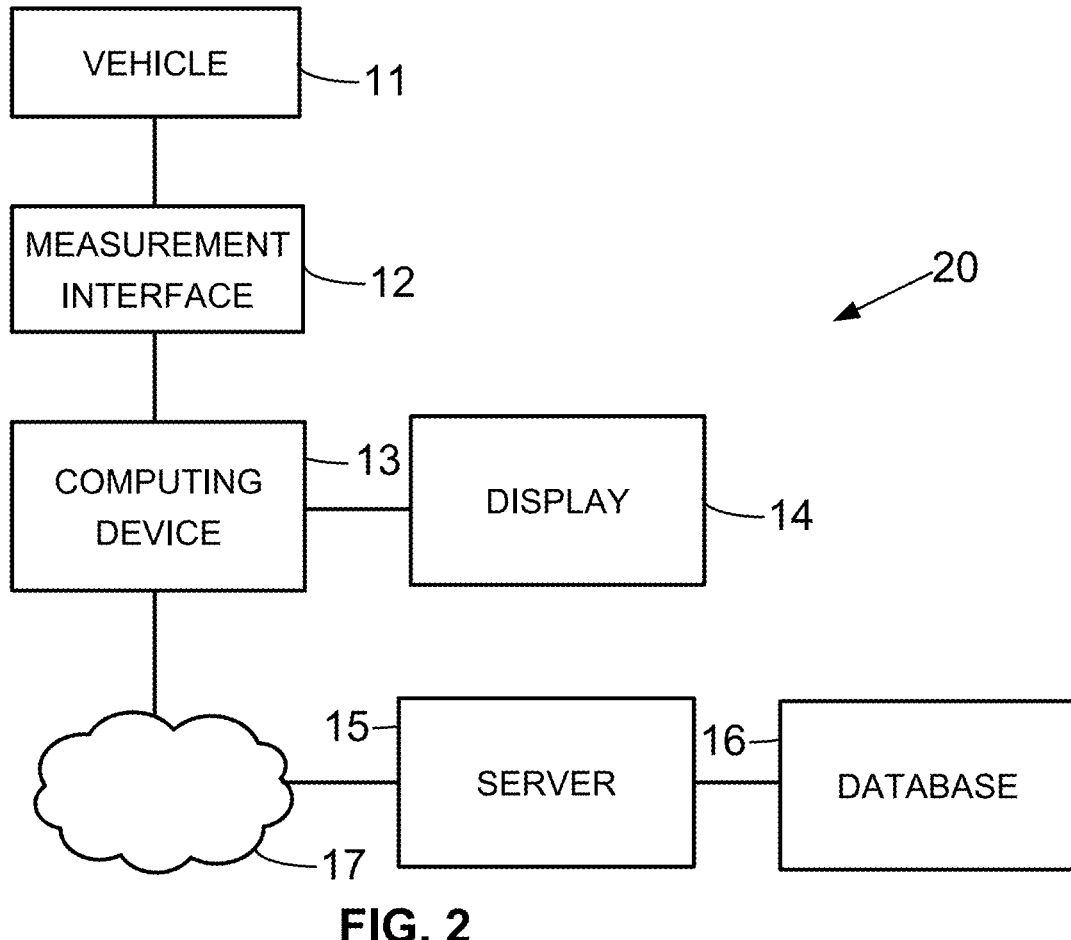

Next, FIG. 2 is a block diagram of a system 20 in accordance with the example implementations. The system 20 includes the vehicle 11, the measurement interface 12, the computing device 13, the display 14, a server 15, and a database 16. In this implementation, the computing device 13 and the server 15 are operatively connected to each other via a communication network 17. As an example, the communication network 17 can include a local area network and/or a wide area network. The wide area network can include the Internet. The computing device 13 can operate as a client to the server 15. The communication network 17 can carry communications between the computing device 13 and the server 15 so that the computing device 13 can access and/or receive data stored in the database 16. The computing device 13 can access and/or receive from the database 16 any or all of the data shown in memory 816 shown in FIG. 29. The server 15 can output a graphical user interface (GUI), such as any or all of the GUI shown in FIG. 13 to FIG. 28.

The server 15 can include a processor, a memory, and a transceiver. The memory of the server 15 can include computer-readable program instructions executable by the processor of the server 15. The program instructions in the memory of the server 15 can include program instructions executable to query the database 16 for data stored in the database 16. As another example, the program instructions in the memory of the server 15 can include program instructions executable to provide data stored in the database 16 to the computing device 13. The memory of the server 15 can also include a GUI, such as any GUI shown in FIG. 13 to FIG. 28.

The memory of the server 15 can also include a parameter-identifier (PID) threshold for comparison of parameter values corresponding to two or more different PIDs requestable from an ECU in a vehicle. The PID threshold can be used to determine whether PID parameter values from matched components are within range of one another. In at least some implementations, the server 15 provides the computing device 13 with a parameter-identifier threshold. In at least some of those implementations, the parameter-identifier threshold is contained within a GUI, and the server 15 provides the parameter-identifier to the computing device 13 by providing GUI to the computing device 13.

Occasionally, an original equipment manufacturer (OEM) changes its calibration data for a particular ECU within a particular vehicle. A change to the calibration data can make it desirable to change a PID threshold corresponding to the particular ECU. Changing a PID threshold at the memory of the server 15 can be done more efficiently than having to change a PID threshold within multiple instances of the computing device 13.

The transceiver of the server 15 can transmit data to and receive data from the communication network 17. The data transmitted by that transceiver can include data the server 15 retrieves from the database 16. In some implementations, the memory of the server 15 includes the database 16. In other implementations, the database 16 is distinct from the memory of the server 15.

Next, FIG. 3 is a block diagram of a system 22. The system 22 is a particular implementation of the system 10 shown in FIG. 1 in which the measurement interface 12 is specifically an oscilloscope 18. In at least some implementations, the oscilloscope 18 is separate from the computing device 13 and the display 14, but communicates measurements to the computing device 13 via a radio network, such as a radio frequency network configured according to a BLUETOOTH® standard. In at least some other implementations, the oscilloscope 18, the computing device 13, and the display 14 are contained in a single housing.

Next, FIG. 4 is a block diagram of a system 23. The system 23 is a particular implementation of the system 10 shown in FIG. 1 in which the measurement interface 12 is specifically a meter 21. In at least some implementations, the meter 21 is separate from the computing device 13 and the display 14, but communicates measurements to the computing device 13 via a radio network, such as a radio frequency network configured according to a BLUETOOTH® standard. In at least some other implementations, the meter 21, the computing device 13, and the display 14 are contained in a single housing. As an example, the meter 21 can include a voltmeter, an ammeter, an ohmmeter, a multi-meter (such as a digital volt-ohmmeter).

Next, FIG. 5 is a block diagram of a system 24. The system 24 is an alternative, particular implementation of the system 10 shown in FIG. 1 in which the measurement interface 12 is specifically a vehicle communication transceiver 19. In at least some implementations, the vehicle communication transceiver 19 is separate from the computing device 13 and the display 14, but communicates vehicle data messages to the computing device 13 via a radio network, such as a radio frequency network configured according to a BLUETOOTH® standard. In these implementations, the vehicle communication transceiver 19 can be referred to as a dongle. In at least some other implementations, the vehicle communication transceiver 19, the computing device 13, and the display 14 are contained in a single housing. In these implementations, the vehicle communication transceiver 19 can include a harness having a connector removably connectable to an on-board diagnostic connector (OBDC) within the vehicle 11.

Figures 6A, 6B:
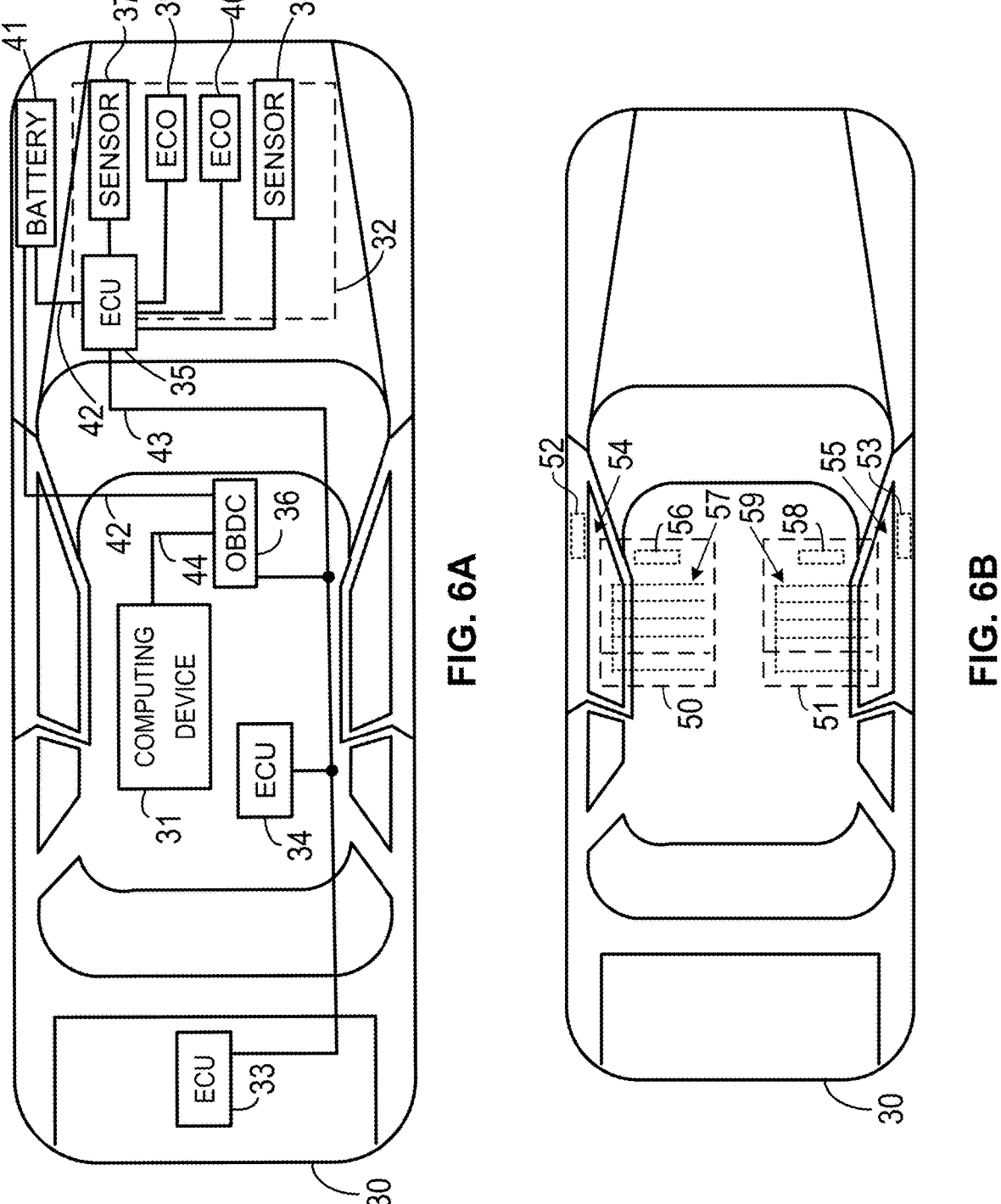
FIG. 6A, FIG. 6B, and FIG. 6C show details of a vehicle in accordance with the example implementations.

Next, FIG. 6A shows a vehicle 30 and example placement of a computing device 31 within the vehicle 30. The vehicle 11 shown in FIG. 1 to FIG. 5 can be arranged like the vehicle 30. The computing device 31 can include and/or be arranged like the computing device 13 shown in FIG. 1 to FIG. 5.

As shown in FIG. 6A, the vehicle 30 includes an ICE 32, an ECU 33, 34, 35 (i.e., an electronic control unit), an OBDC 36 (i.e., an on-board diagnostic connector), a sensor 37, 38, an ECO 39, 40 (i.e., an ECU controlled output), a battery 41, and a battery-connected circuit 42. The ECU 33, 34, 35 is operatively connected to the OBDC 36 via a vehicle network 43 to allow transmission of a vehicle data message (VDM) between the OBDC 36 and the ECU connected to the vehicle network 43. The vehicle network 43 can include a wired and/or wireless network. The ECU 33, 34, 35 can be configured to control a vehicle system, such as an engine system, a powertrain system, a body electronic system, an anti-lock brake system, a supplemental inflatable restraint system, a traction control system, a navigation system, an entertainment system, an advanced driver assistance system, or some other vehicle system.

The OBDC 36 can, for example, be located within a passenger compartment of the vehicle 30, within an engine compartment of the vehicle 30, or within a storage compartment within the vehicle 30 in front of or behind the passenger compartment. The computing device 31 is removably attachable to the OBDC 36. The computing device 31 can connect to the OBDC 36 via a communication link 44. The computing device 31 can include the communication link 44 (e.g., a harness). The computing device 31 is typically removed after the vehicle 30 has been serviced at the repair shop. In that way, the computing device 31 can be used to diagnose other vehicles after those vehicles arrive at the repair shop, or taken to other vehicle(s) at a location remote from the repair shop.

The battery-connected circuit 42 can include one or more electrical circuits. FIG. 6A shows the battery-connected circuit 42 extending between the battery 41 and the ECU 35 and between the battery 41 and the OBDC 36. For clarity of FIG. 6A, other examples of the battery-connected circuit 42 that extend between the battery 41 and some other vehicle component of the vehicle 30, such as the ECU 33, 34, the sensor 37, 38, and the ECO 39, 40 are not shown. The battery-connected circuit 42 between the battery 41 and the OBDC 36 can provide an electrical current to provide operational power for the computing device 31.

The sensor 37, 38 is a device that provides a signal to the ECU 35. The signal represents some characteristic of the vehicle that the ECU 35 is configured to monitor. As an example, the sensor 37, 38 can include one from among: an accelerometer, a camshaft position sensor, a crankshaft position sensor, a current sensor, a fluid level sensor, a fluid pressure sensor, a fluid temperature sensor, a hall effect sensor, an infrared sensor, a knock sensor, a mass air flow sensor, an oil pressure sensor, an oxygen sensor, a photo transistor, a piezoelectric sensor, a position sensor, a pressure sensor, a rain sensor, a refrigerant sensor, a temperature sensor, a thermistor, a throttle position sensor, a tire pressure sensor, a vehicle speed sensor, a voltage sensor, a wheel speed sensor, a yaw rate sensor, or some other type of sensor.

The ECO 39, 40 is a device controlled by the ECU 35. The ECU 35 can control the ECO 39, 40 using an ECU control I/O (input/output). As an example, the ECO 39, 40 can include a fuel injector, a motor, a pump, a relay, solenoid, a transformer, an actuator, a light (e.g., an incandescent lamp or a light emitting diode (LED)), or a valve. Other examples of an ECO are also possible. The ECU control I/O can be configured to output a signal (e.g., output a voltage to the ECO) or to sink a signal (e.g., provide a ground to the ECO). The output signal can be electrical or optical. For some ECO, such as a relay, the ECU control I/O provides a control signal to the ECO and the relay switches electrical power directly from another source (e.g., a vehicle battery) to another ECO. For instance, the output signal can control a relay (the ECO) that sources power to a motor (the other ECO).

In accordance with at least some implementations, an ECU is operable to perform a functional test and/or output a message to the computing device 31 in accordance with an industry standard, such as the SAE J1979_201202 and/or ISO 15031-5 standards for E/E diagnostic test modes. Performing the functional test can occur in response to the ECU receiving a VDM with a request to perform the functional test. Performing the functional test can, for example, include connecting an ECU control I/O to a voltage source, a current source, a light source, or an electrical ground. An ECO can be connected to the ECU control I/O by an electrical or optical circuit.

A vehicle, such as the vehicle 11, 30 can include matched components. Matched components can include components that perform similar functions for different portions of the vehicle. In at least some implementations, matched components correspond to different sides of a vehicle, such as left and right sides, or the front and rear sides. In at least some implementations, matched components correspond to different banks of the ICE 32 of the vehicle.

As an example, the sensor 37, 38 can be matched components (i.e., matched sensors). For instance, the sensor 37 can be a sensor of a first bank of the ICE 32, the sensor 38 can be a sensor of a second bank of the ICE 32, and the sensor 37, 38 both output a signal corresponding to a similar vehicle characteristic, but for a different portion of the vehicle. Examples of matched sensors and other matched vehicle components are listed in Table A below.

TABLE A

| First matched component | Second matched component |
| --- | --- |
| Mass air flow sensor-Bank-1 | Mass air flow sensor-Bank-2 |
| Charge air pressure sensor-Bank-1 | Charge air pressure sensor-Bank-2 |
| Camshaft position sensor-Bank-1 | Camshaft position sensor-Bank-2 |
| Intake air temperature sensor-Bank-1 | Intake air temperature sensor-Bank-2 |
| Engine coolant temperature sensor-Bank-1 | Engine coolant temperature sensor-Bank-2 |
| O2 sensor (pre-converter)-Bank-1 | O2 sensor (pre-converter)-Bank-2 |
| O2 sensor (post-converter)-Bank-1 | O2 sensor (post-converter)-Bank-2 |
| Intake manifold pressure sensor-Bank-1 | Intake manifold pressure sensor-Bank-2 |
| Ambient air temperature sensor-Bank-1 | Ambient air temperature sensor-Bank-2 |
| Fuel rail pressure sensor-Bank-1 | Fuel rail pressure sensor-Bank-2 |
| Variable valve timing sensor-intake, Bank-1 | Variable valve timing sensor-intake, Bank-2 |
| Variable valve timing sensor-exhaust, Bank-1 | Variable valve timing sensor-exhaust, Bank-2 |
| Seat cooling fan-left side | Seat cooling fan-right side |
| Seat heating grid-left side | Seat heating grid-right side |
| Power window motor-left front window | Power window motor-right front window |

Next, FIG. 6B shows additional details of the vehicle 30. In particular, FIG. 6B shows a seat 50, 51, a power window motor 52, 53, and a window 54, 55. The seat 50 includes a seat cooling fan 56 and seat heating grid 57. The seat 51 includes a seat cooling fan 58 and seat heating grid 59. The power window motor 52, 53 are matched components as both power window motors are configured to raise and lower a window (i.e., the window 54 and the window 55, respectively). The seat cooling fan 56, 58 are matched components as both seat cooling fans are configured to cool a front seat in the vehicle (i.e., the seat 50 and the seat 51, respectively). Similarly, the seat heating grid 57, 59 are matched components as both seat heating grids are configured to heat a front seat in the vehicle (i.e., the seat 50 and the seat 51, respectively).

Testing of some matched components can include waiting for both matched components to reach a certain state, such as a state where a temperature of the matched components is a common ambient temperature. This waiting may occur after control switches for the seat heating grid 57, 59 are turned to an off state. As an example, testing of matched components such as the seat heating grid 57, 59 can include measuring amounts of time it takes the seat heating grid 57, 59 to change from the common ambient temperature to a maximum operating temperature after switching the control switches that turn the seat heating grid 57, 59 to common on positions (e.g., low heat position or high heat positions).

Figure 6C:
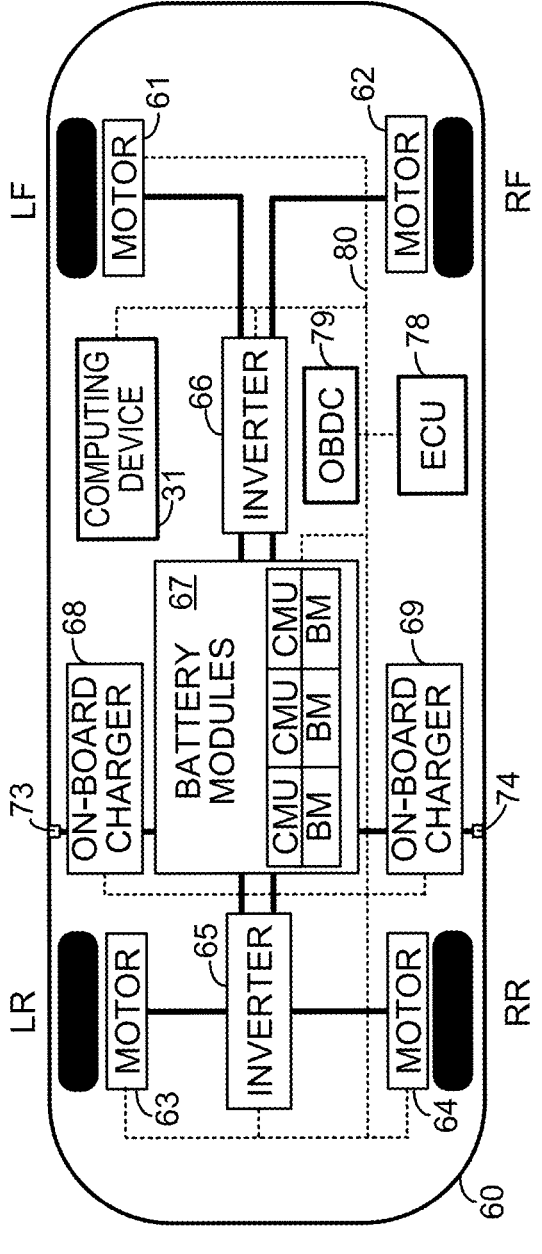

Next, FIG. 6C shows a vehicle 60 and example placement of the computing device 31 within the vehicle 60. The vehicle 11 shown in FIG. 1 to FIG. 5 can be arranged like the vehicle 60. The vehicle 60 is an electrical vehicle. In at least some implementations, the vehicle 60 includes an ICE such that the vehicle 60 is a hybrid vehicle.

As shown in FIG. 6C, the vehicle 60 includes a motor 61 at a left front location of the vehicle 60, a motor 62 at a right front location of the vehicle 60, a motor 63 at a left rear location of the vehicle 60, and a motor 64 at a right rear location of the vehicle 60. The vehicle 60 also includes an inverter 65, 66, an on-board charger 68, 69, a charge port 73, 74, an ECU 78, an on-board diagnostic connector 79, and a vehicle network 80. As an example, the charge port 73 can include an AC voltage charge port and the charge port 74 can include a DC voltage charge port. The vehicle 60 can further include battery modules 67 including multiple battery modules (BM) and multiple cell monitoring units (CMU). The CMU can determine parameters regarding the battery modules, such as a battery voltage, a battery temperature, or a battery internal resistance.

Figure 7:
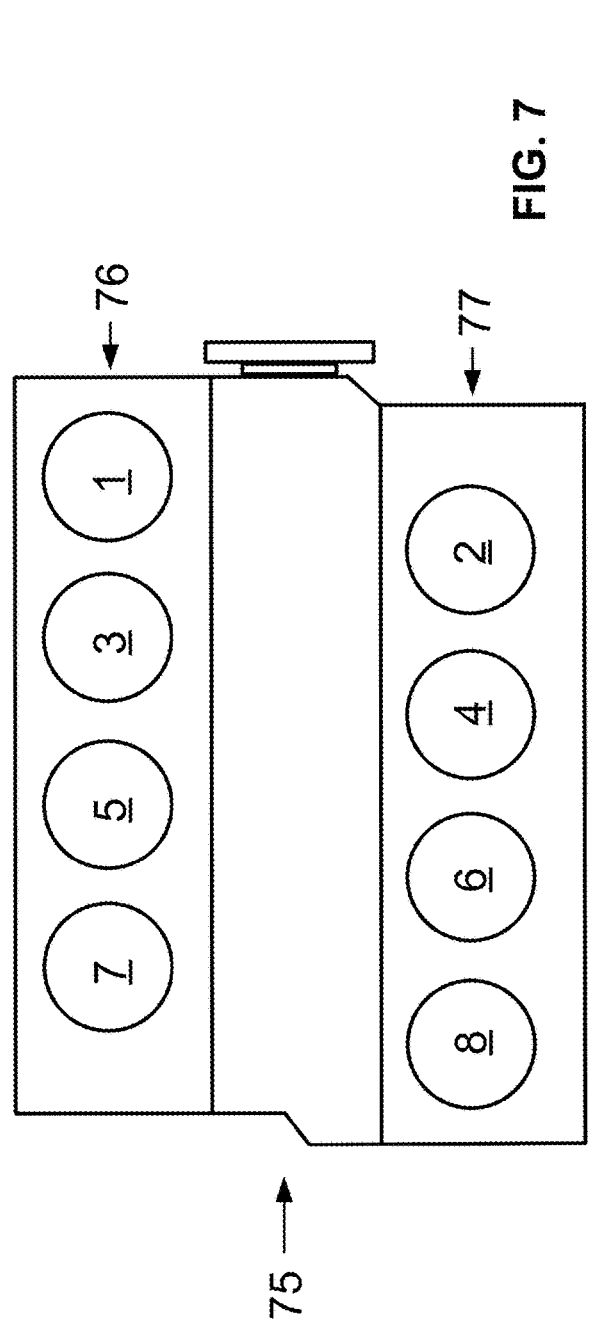
FIG. 7 shows a cylinder block of an internal combustion engine in accordance with the example implementations.

Next, FIG. 7 shows a cylinder block of an ICE 75 having two banks and eight cylinders. For example, the ICE 75 has a cylinder 1, 2, 3, 4, 5, 6, 7, 8, wherein the cylinder 1, 3, 5, 7 are on a bank 76 and the cylinder 2, 4, 6, 8 are on a bank 77. The ICE 75 can have a v-configuration. The ICE 32 in the vehicle 30 can have a v-configuration. In other implementations, however, the ICE 32 in the vehicle 30 can have a different ICE configuration, such as an inline configuration or a w-configuration, and/or a different quantity of cylinders. For example, a six cylinder, inline configuration ICE can have two banks where three cylinders referred to as cylinders one, two, and three are part of a first bank, and three cylinders referred to as cylinders four, five, and six are part of a second bank. As an alternative, cylinders one, three, and five can be part of the first bank, and cylinders two, four, and six can be part of the second bank. Other examples of banks within an ICE are possible.

Figure 8:
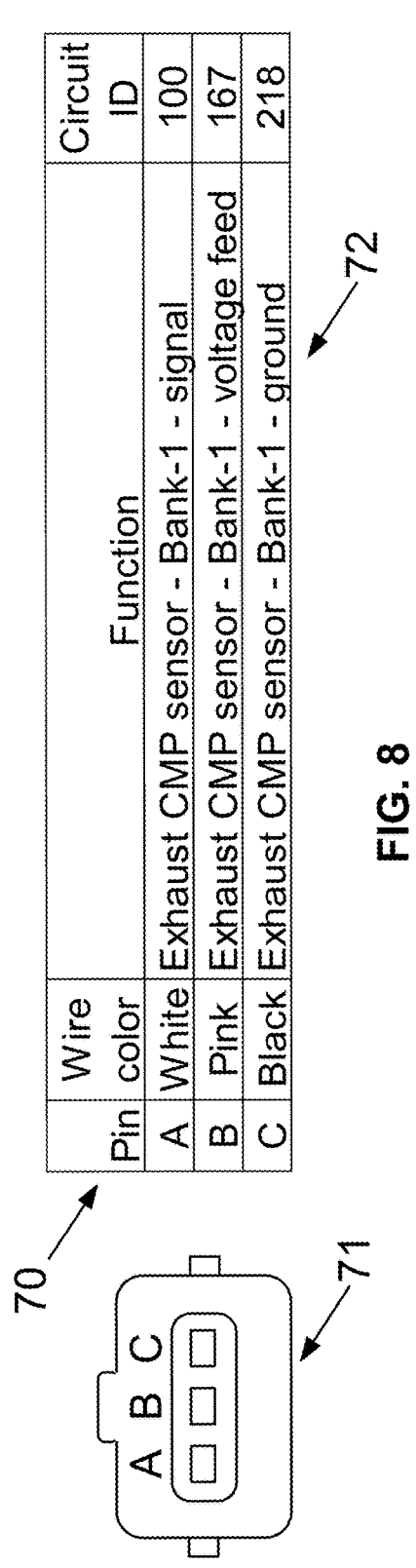
FIG. 8 shows a connector description in accordance with the example implementations.

FIG. 8 shows a connector description in accordance with the example implementations. Further details regarding FIG. 8 are described below.

Figures 9, 10:
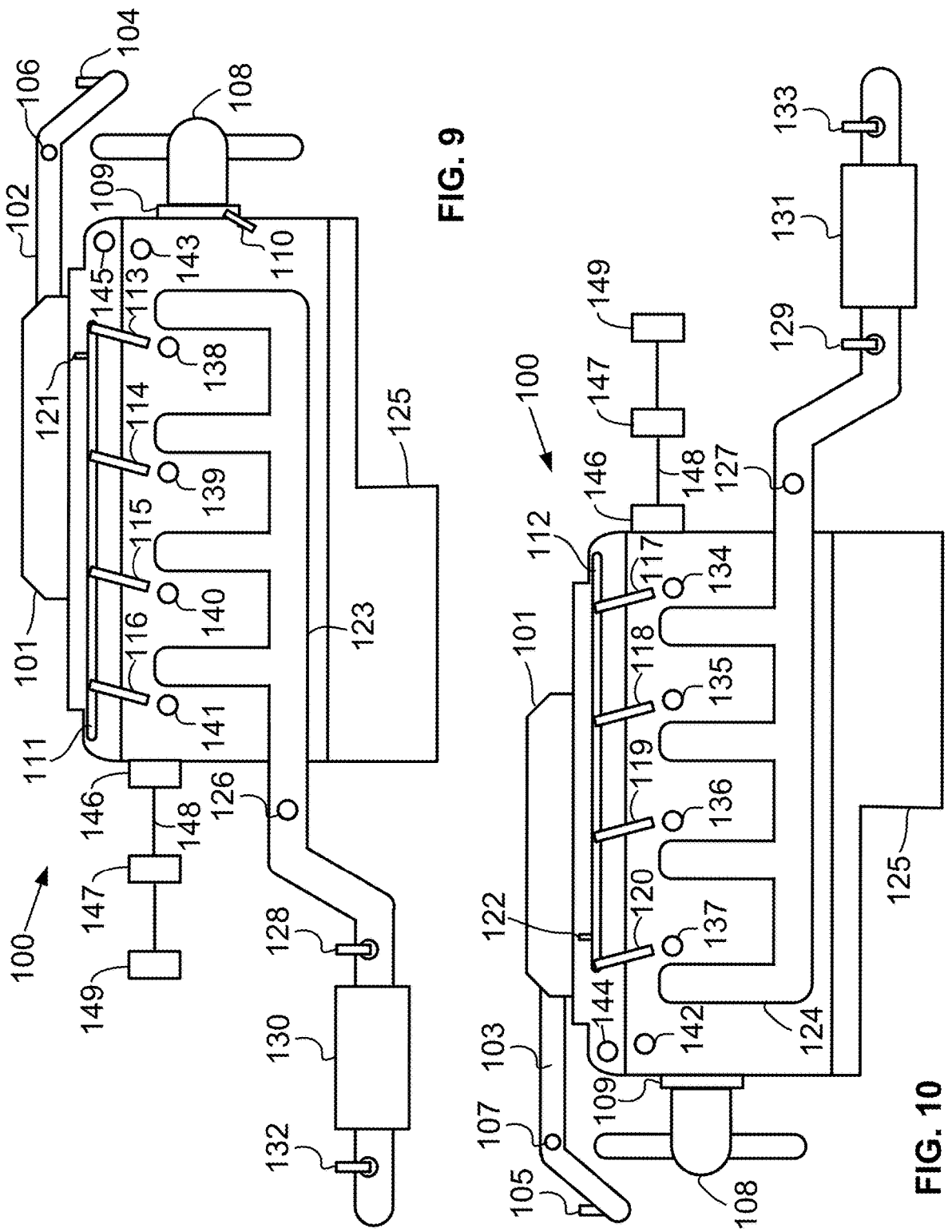
FIG. 9 and FIG. 10 are elevation views of an engine system in accordance with the example implementations.
Figure 11:
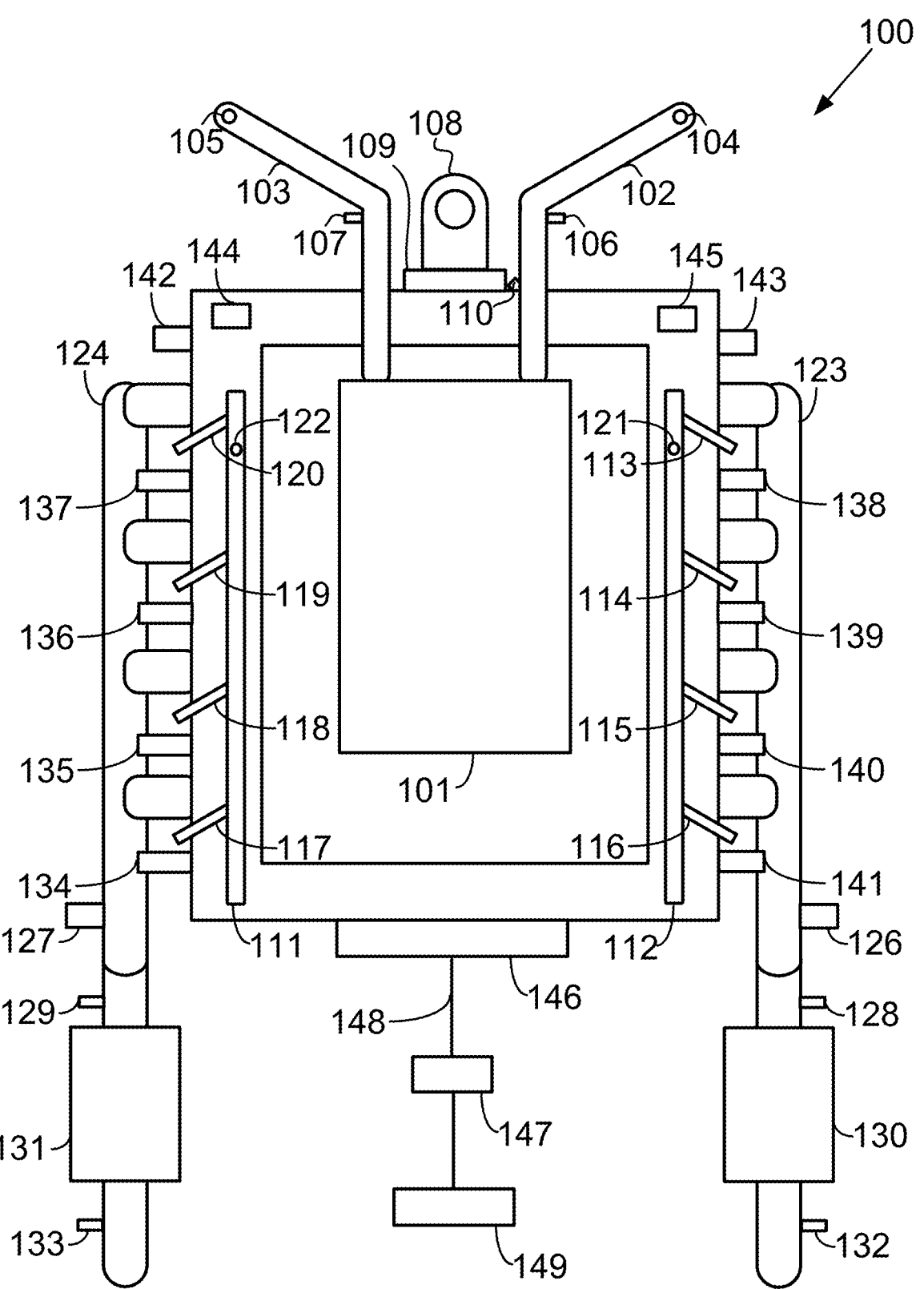
FIG. 11 is a plan view of the engine system shown in FIG. 9 and FIG. 10 in accordance with the example implementations.

FIG. 9 and FIG. 10 are elevation views of an engine system 100. FIG. 11 is a plan view of the engine system 100. As shown in those figures, the engine system 100 includes an intake manifold 101, an air intake hose 102, 103, a mass air flow sensor 104, 105, an intake air temperature sensor 106, 107, a cooling fan 108, a crankshaft pulley 109, a crankshaft position sensor 110, a fuel rail 111, 112, a fuel injector 113, 114, 115, 116, 117, 118, 119, 120, a fuel rail pressure sensor 121, 122, an exhaust manifold 123, 124, an oil pan 125, an exhaust air temperature sensor 126, 127, a pre-converter oxygen sensor 128, 129, a catalytic converter 130, 131, a post-converter oxygen sensor 132, 133, a spark plug 134, 135, 136, 137, 138, 139, 140, 141, an engine coolant temperature sensor 142, 143, a cam shaft position sensor 144, 145, an engine control module 146, an on-board diagnostic connector 147, and a vehicle data bus 148. The engine system 100 is arranged with an ICE. The engine control module 146 is an ECU. FIG. 9, FIG. 10, and FIG. 11 also show a computing device 149. The computing device 149 can be arranged like the computing device 13 shown in FIG. 1 to FIG. 5 and FIG. 29 and/or the computing device 31 shown in FIG. 6A and FIG. 6C. Although only FIG. 9 to FIG. 11 show a single crankshaft position sensor, the engine system 100 can include multiple crankshaft position sensors.

III. Example Operation

Next, FIG. 12 shows a flowchart depicting a set of functions 300 of a method in accordance with one or more of the example implementations. Two or more functions and/or portions of two or more functions of the set of functions 300 may, but need not necessarily, be performed at the same time. The set of functions 300 can be performed by a processor. For example, the set of functions 300 can be performed by a processor 800 shown in FIG. 29.

Block 301 includes determining, by a processor, a first measurement at a first time and a second measurement at a second time. The first measurement includes a measurement of a signal output by a first vehicle component at a particular vehicle and the second measurement includes a measurement of a signal output by a second vehicle component at the particular vehicle. Additionally or alternatively, the first measurement includes a measurement of a condition of the first vehicle component and the second measurement includes a measurement of a condition of the second vehicle component.

As an example, the signals output by the first and second vehicle components can include electrical signals, such as analog or digital electrical signals. In at least some implementations, the measurements of the signals output by the first and second vehicle components are voltage or amperage measurements. In at least some implementations, the measurements of the signals output by the first and second vehicle components are measurements determined from datum contained in vehicle data message(s) transmitted by an ECU that measured the signals.

As another example, the conditions of the first and second vehicle components can include temperatures of the vehicle components, pressures within the vehicle components, speed of the vehicle components, resistance of the vehicle components, positions of the vehicle components, or flows within the vehicle components. The flows within the vehicle components can, for example, include mass air flows at mass air flow sensors. Other examples of the conditions of the first and second vehicle components are also possible.

Next, block 302 includes determining, by the processor, a first determination. The first determination is based at least in part on a difference between the first measurement and the second measurement exceeding a first measurement threshold. The first determination indicates that at least one from among the first vehicle component and the second vehicle component is malfunctioning.

Next, block 303 includes outputting, by the processor, a first notification. The first notification indicates that at least one from among the first vehicle component and the second vehicle component is malfunctioning. The first vehicle component and the second vehicle component are matched with each other based on a first common characteristic with respect to the particular vehicle. The first time and the second time are within a first threshold amount of time of each other.

In at least some implementations arranged as a method that includes performing the set of functions 300, the first and second vehicle components are matched with one or more additional vehicle components. As an example, the first and second vehicle components can include a left-front wheel bearing and a right-front wheel bearing and the one or more additional vehicle components can include a left-rear wheel bearing and/or a right-rear wheel bearing. As another example, the first and second vehicle components can include left-front and right front HVAC vents and the one or more additional vehicle components can include a cabin temperature sensor. Measurements pertaining to the wheel bearings, the HVAC vents and the cabin temperature sensor can include temperature measurements or measurement of a signal representative of a temperature.

In at least some implementations discussed in the preceding paragraph or in another paragraph, the first and second vehicle components and the one or more additional vehicle components include a respective vehicle sensor. Examples of at least some of those vehicle sensors are shown in Table C. As another example, the first vehicle component can include a head temperature sensor for Bank-1 of an ICE, the second vehicle component can include a head temperature sensor for Bank-2 of the ICE, and the one or more additional vehicle components includes an engine coolant temperature sensor and/or an engine oil temperature sensor. Measurements pertaining to those sensors can include measurements of signals representative of temperatures. As yet another example, the first and second vehicle components can include the left-front wheel speed sensor and the right-front wheel speed sensor, and the one or more additional vehicle components can include the left-rear wheel speed sensor and/or the right-rear wheel speed sensor. Measurements pertaining to those wheel speed sensors can include measurements of signals representative of wheel speeds.

In at least some implementations arranged as a method that includes performing the set of functions 300, the first measurement includes the measurement of the condition of the first vehicle component, and the second measurement includes the measurement of the condition of the second vehicle component. Furthermore, the first measurement is based on an output signal of a first transducer disposed in proximity to the first vehicle component, and the second measurement is based on an output signal of a second transducer disposed in proximity to the second vehicle component. Examples of the transducer include a pressure, current, temperature, vacuum, or vibration transducer. In at least some implementations, the transducer can be removably attached in proximity to the first vehicle component using a magnet or held in place by a user of the computing device 13.

Disposing a transducer in proximity to a vehicle component can include placing the transducer within a distance that allows the transducer to measure a condition of a vehicle component. For example, a vibration transducer may have to be mounted to the vehicle component desired to be measured. As another example, a pressure transducer may have to be connected in line where a fluid is expected to flow or attached to a threaded fitting that provides access to pressures within the line. As yet another example, a current transducer may have to surround a conductor whose current is to be measured. As still yet another example, an infrared temperature transducer may have to be disposed within two to six inches of the vehicle component whose temperature is to be measured.

In at least some implementations arranged as a method that includes performing the set of functions 300, determining the first measurement includes receiving a first datum representing a datum contained in a first message, and determining the second measurement includes receiving a second datum representing a datum contained in a second message. Additionally, the first message includes a first parameter identifier corresponding to the first vehicle component and is transmitted by an electronic control unit within the particular vehicle. Furthermore, the second message includes a second parameter identifier corresponding to the second vehicle component and is transmitted by the electronic control unit.

In at least some implementations discussed in the preceding paragraph or in another paragraph, receiving the first datum and receiving the second datum includes receiving the first datum and the second datum within one or more messages transmitted by a dongle removably connected to the particular vehicle. A dongle is discussed above with respect to FIG. 2, FIG. 5, and FIG. 29. The one or more messages can be arranged according a VDM protocol discussed below.

Figure 29:
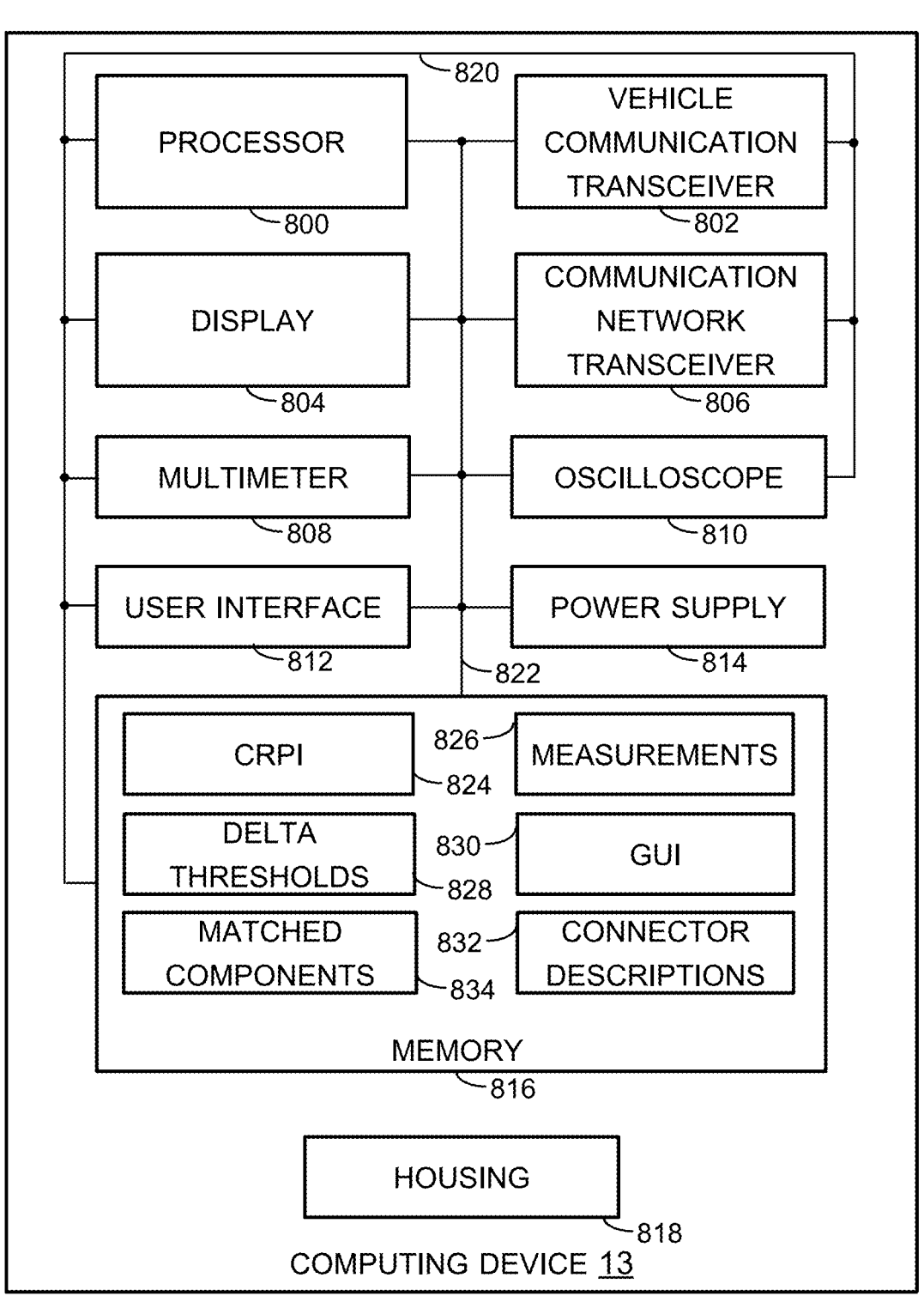
FIG. 29 is a block diagram of a computing device in accordance with the example implementations.

In at least some implementations discussed two paragraphs above or in another paragraph, the method further includes determining, by the processor, service information based on at least one of first or second parameter identifiers, and outputting, by the processor, the service information onto a display, such as the display 14 shown in FIG. 1 to FIG. 5 or the display 804 shown in FIG. 29. As an example, the service information can include graph(s) of data corresponding to the first and/or second parameter identifiers. As another example, the service information can include information indicative of a test method, repair information, and/or vehicle specifications. In at least some implementations, the service information is generic in that the service information pertains to multiple different year/make/model vehicles. Alternatively, in some implementations, the service information is particular to vehicles having a common year/make/model.

In at least some implementations arranged as a method that includes performing the set of functions 300, determining the first measurement includes receiving a digital representation of a first sample of the signal output by the first vehicle component and converting the digital representation of the first sample of the signal output by the first vehicle component based on a resolution of a first analog-to-digital converter and a measurement range. Additionally, determining the second measurement includes receiving a digital representation of a first sample of the signal output by the second vehicle component and converting the digital representation of the first sample of the signal output by the second vehicle component based on a resolution of a second analog-to-digital converter and the measurement range. As an example, the measurement range can be 0-20 volts AC or DC, 0-200 volts AC or DC, 0-400 volts AC or DC, 0-1000 volts AC or DC among others.

In at least some of the implementations discussed in the preceding paragraph, the samples of first and second vehicle components are made by a multimeter 808 (shown in FIG. 29). The multimeter 808 can receive the signal output by the first vehicle component on a first input channel of the multimeter 808 and the signal output by the second vehicle component on a second input channel of the multimeter 808. The multimeter 808 can include two or more input channels. Alternatively, the samples of first and second vehicle components are made by an oscilloscope 810 (shown in FIG. 29). The oscilloscope 810 can receive the signal output by the first vehicle component on a first input channel of the oscilloscope 810 and the signal output by the second vehicle component on a second input channel of the oscilloscope 810. The oscilloscope 810 can include two or more input channels.

In at least some implementations arranged as a method that includes performing the set of functions 300, determining the first measurement at the first time includes the processor receiving a first message transmitted by an ECU within the particular vehicle and decoding a portion of the first message indicative of the first measurement. Additionally, determining the second measurement at the second time includes the processor receiving a second message transmitted by the ECU and decoding a portion of the second message indicative of the second measurement. In at least some of these implementations, the first message and the second message are transmitted by the ECU consecutively without transmitting any other message in between the first message and the second message. In at least some other implementations, the first message and second message are transmitted by the ECU, but that ECU or another ECU transmits one or more other messages between transmission of the first message and the second message.

In at least some implementations arranged as a method that includes performing the set of functions 300 discussed in the preceding paragraph or in another paragraph, the first common characteristic and the additional characteristic include or represent a temperature, a pressure, or a flow. Additionally, the temperature, the pressure, or the flow included or represented by the first common characteristic and the additional characteristic are temperatures, pressures or flows, respectively, of a common or different fluid.

In at least some implementations arranged as a method that includes performing the set of functions 300, the particular vehicle includes a vehicle power plant. Moreover, the vehicle power plant includes a first bank and a second bank. Additionally, the first vehicle component is associated with the first bank, and the second vehicle component is associated with the second bank. Furthermore, the vehicle power plant includes one or more from among: an ICE or an electric motor.

In at least some implementations arranged as a method that includes performing the set of functions 300, the first time and the second time are identical. In at least some of those implementations, the first and second measurements are made at the same time by the multimeter 808 or the oscilloscope 810 (both shown in FIG. 29).

In at least some implementations arranged as a method that includes performing the set of functions 300, the first measurement threshold is selected based at least in part upon the first threshold amount of time. As the first threshold amount of time increases, the amount of time available for the signals or conditions to change increases as well. Accordingly, a difference between the first and second measurements can increase as the first threshold amount of time increases. As an example, as an ICE warms up after a cold-start, the engine fluid temperatures detected by sensors operating normally increase from the cold-start temperature to the maximum operating temperature. If the first and second measurements are temperature measurements made at the same time, the difference between those temperature measurements will be relatively small as compared to a difference in temperature measurements made some number of seconds apart (e.g., 5 or 10 seconds).

In at least some implementations arranged as a method that includes performing the set of functions 300, the first common characteristic includes or represents a temperature, a pressure, a flow, a speed, or a position.

In at least some implementations arranged as a method that includes performing the set of functions 300 discussed in the preceding paragraph or in another paragraph, the method further includes determining, by the processor, an operating status of the vehicle power plant. The method also includes determining, by the processor, the first measurement threshold based on the operating status of the vehicle power plant. As an example, the operating status can include the revolutions per minute (RPM) of an ICE, an altitude at which the vehicle 11 is operating or located, a G-force exhibited on and by the vehicle 11, a temperature, or a pressure.

In at least some implementations arranged as a method that includes performing the set of functions 300, the method further includes determining, by the processor, a third measurement at a third time, the third measurement including a measurement of a signal output by an additional vehicle component at the particular vehicle. Determining the first determination includes the processor determining that the first vehicle component is malfunctioning. Determining the first vehicle component is malfunctioning includes the processor determining that a difference between the first measurement and the third measurement exceeds a second measurement threshold. Moreover, the additional vehicle component is used within the particular vehicle to sense an additional characteristic with respect to the particular vehicle. Furthermore, the additional characteristic is similar or identical to the first common characteristic. Furthermore still, the first time and the third time are within a second threshold amount of time of each other.

Additionally or alternatively, the first common characteristic includes or represents matched component installation locations. For example, an example vehicle can include four oxygen sensors and two catalytic converters. Two of the four oxygen sensors can be matched to each other as a result of those two oxygen sensors being located between the two catalytic converters and an ICE. In other words, these two oxygen sensors are considered pre-converter oxygen sensors. The other two oxygen sensors can be matched to each other as a result of those two oxygen sensors being located between the two catalytic converters and tail pipes of the vehicle. These two oxygen sensors are considered post-converter oxygen sensors.

In at least some implementations arranged as a method that includes performing the set of functions 300, the method further comprises determining, by the processor, a third measurement at a third time, the third measurement including a measurement of a signal output by a first additional vehicle component at the particular vehicle. The method also includes determining, by the processor, a fourth measurement at a fourth time, the fourth measurement including a measurement of a signal output by a second additional vehicle component at the particular vehicle. Furthermore, the method includes determining, by the processor, a second determination. The second determination is based at least in part on a difference between the third measurement and the fourth measurement not exceeding a second measurement threshold. The second determination indicates that the first additional vehicle component and the second additional vehicle component are not malfunctioning. Furthermore still, the method includes outputting, by the processor, a second notification, wherein the second notification indicates that at least one from among the first additional vehicle component and the second additional vehicle component is not malfunctioning. The first additional vehicle component and the second additional vehicle component are matched with each other at least in part to sense a second common characteristic with respect to the particular vehicle. The third time and the fourth time are within a second threshold amount of time of each other. In at least some of these implementations, outputting the first notification and outputting the second notification includes displaying, on a display, the first notification and the second notification simultaneously. Examples of the matched first and second additional vehicle components are shown in Table A and Table C.

In at least some implementations arranged as a method that includes performing the set of functions 300, the method further comprises determining, by the processor, that a vehicle service tool containing the processor is operatively connected to a particular vehicle corresponding to a particular year, make, model, and engine combination. Additionally, the method includes determining, by the processor, that a selection has been made using a user interface of the vehicle service tool. The selection includes a request to diagnose one or more from among the first vehicle component or the second vehicle component. In response to determining that the vehicle service tool is operatively connected to the particular vehicle and that the selection has been made, the method includes determining, by the processor, one or more vehicle data messages to request data indicative of the first measurement and the second measurement. Furthermore, the method includes transmitting, by the processor to the particular vehicle, the one or more vehicle data messages. Furthermore still, the method includes receiving, by the processor in response to transmitting the one or more vehicle data messages, one or more additional vehicle data messages. The one or more additional vehicle data messages include data indicative of the first measurement and data indicative of the second measurement. Determining the first measurement includes the processor determining the first measurement from the data indicative of the first measurement. Determining the second measurement includes the processor determining the second measurement from the data indicative of the second measurement.

In at least some implementations arranged as a method that includes performing the set of functions 300, the first measurement is made on a first channel of an oscilloscope and the second measurement is made on a second channel of the oscilloscope. In accordance with these implementations, the oscilloscope 810 includes a multi-channel oscilloscope.

In at least some implementations discussed in the preceding paragraph or in another paragraph, the method further includes determining, by the processor, component identifiers corresponding to the first and second vehicle components. Additionally, the method in these implementations include determining, by the processor, service information based on at least the component identifiers, and outputting, by the processor, the service information onto a display.

In at least some implementations arranged as a method that includes performing the set of functions 300, the first measurement is made on a first channel of a multimeter and the second measurement is made on a second channel of the multimeter. In accordance with these implementations, the multimeter 308 includes a multi-channel multimeter.

In at least some implementations discussed in the preceding paragraph or in another paragraph, the method further includes determining, by the processor, component identifiers corresponding to the first and second vehicle components. Additionally, the method in these implementations include determining, by the processor, service information based on at least the component identifiers, and outputting, by the processor, the service information onto a display.

In at least some implementations arranged as a method that includes performing the set of functions 300, the first measurement threshold is a percentage of a value within a normal operating range of the first vehicle component and the second vehicle component. As an example, the normal operating range of a sensor can be 0.5 to 4.5 volts DC. In accordance with that example, the first measurement threshold can be 7.7% of the maximum value within that range (i.e., 6.2% of 4.5 volts DC)(i.e., 0.28 volts DC). Table C shows that example first measurement threshold for the matching sensors A1 and B1 when the measurement threshold for those matching components is a voltage. Table C also shows that some matched components, such as matching sensors A1 and B1, can correspond to multiple thresholds, such as degrees C. and DC volts. As another example, the first measurement threshold can be 10.0% of the maximum value within that range (i.e., 10.0% of 4.5 volts DC)(i.e., 0.45 volts DC). Table C shows that measurement threshold can be a number of degrees, a temperature, a voltage, a frequency, a duty cycle, or a pressure. Other examples of units for a measurement threshold are also possible.

In at least some implementations discussed in the preceding paragraph or in another paragraph, the percentage is based on the first threshold amount of time. Moreover, the percentage can be increased as the first threshold amount of time increases or can be decreased as the first threshold amount of time decreases. As an example, the percentage can be 7.7% when the first threshold amount of time is 0.500 seconds or 10.0% when the first threshold amount of time is 1.500 seconds.

In at least some implementations arranged as a method that includes performing the set of functions 300, the method further comprises outputting, by the processor, a user-selectable control onto a display. The user-selectable control corresponds to the first vehicle component and program instructions executable by the processor to initiate or perform a test of the first vehicle component, calibrate the first vehicle component via one or more vehicle data messages, or program the first vehicle component via one or more vehicle data messages. The method also comprises repairing a vehicle, wherein repairing the particular vehicle includes the processor executing the program instructions. As an example, the test of the first vehicle component can include a component test that includes using the multimeter 808 or the oscilloscope 810 to perform a measurement of a vehicle component. As another example, the test of the first vehicle component can include a functional test the processor 800 initiates by transmitting a vehicle data message to the vehicle 30. An ECU in the vehicle 30 can perform the functional test by controlling an ECU controlled output. As yet another example, calibrating the first vehicle component can include initializing the first vehicle component, causing the first vehicle component to relearn one or more operational settings, or setting one or more operational settings within the first vehicle component.

In at least some implementations arranged as a method that includes performing the set of functions 300, the method further comprises outputting, by the processor, a graphical user interface on a display. The graphical user interface includes a user-selectable control. The method further comprises determining, by the processor based at least in part on a measurement selection entered via use of the user-selectable control, an order for performing measurements including the first measurement and the second measurement. The order includes measurements on multiple sets of matched vehicle components in the particular vehicle. The order includes measurements for a single set of matched vehicle components comprising the first vehicle component and the second vehicle component.

In at least some implementations arranged as a method that includes performing the set of functions 300, the measurement of the condition of the first vehicle component includes a first calculated value, and the measurement of the condition of the second vehicle component includes a second calculated value. The first calculated value represents an amount of time taken for a range of data values corresponding to a first parameter identifier to change by a first amount. The second calculated value represents an amount of time taken for a range of data values corresponding to a second parameter identifier to change by a second amount. The first and second calculated values can be referred to as first and second calculated PID datum values. The processor 800 can send vehicle data messages to request the data values corresponding to the first and second parameter identifiers and determine the times when those data values are received by the processor 800.

In at least some implementations arranged as a method that includes performing the set of functions 300, the measurement of the condition of the first vehicle component includes a measurement of time taken for a temperature of the first vehicle component to change from a first temperature to a second temperature. The measurement of the condition of the second vehicle component includes a measurement of time taken for a temperature of the second vehicle component to change from a third temperature to a fourth temperature. As an example, the change from the first temperature to the second temperature and the change from the third temperature to the fourth temperature can include changes from a minimum operating temperature to a maximum operating temperature or from a maximum operating temperature to a minimum operating temperature. As another example, the change from the first temperature to the second temperature and the change from the third temperature to the fourth temperature can include changes from a steady-state temperature with the first and second vehicle components powered off to a selected temperature setting after powering on the first and second vehicle components. In accordance with the implementations described in this paragraph, the first and second vehicle components can, for example, include heated seats, cooling seats, HVAC vents, or exhaust manifolds. Other examples are possible.

In at least some implementations discussed in the preceding paragraph or in another paragraph, the processor 800 is configured to determine the first or second vehicle component is malfunctioning by determining that the first or second vehicle component, respectively, does not reach the minimum operating temperature, the maximum operating temperature, or the steady-state temperature. Alternatively, in at least some implementations discussed in the preceding paragraph or in another paragraph, the processor 800 is configured to determine the first or second vehicle component is malfunctioning by determining that a difference in the time taken for the temperature of the first vehicle component to change from the first temperature to the second temperature and the time taken for the temperature of the second vehicle component to change from the third temperature to the fourth temperature is greater than a threshold amount of time.

In at least some implementations discussed in one or both of the two preceding paragraphs or in another paragraph, the first temperature equals or is within a threshold number of degrees of the third temperature and the second temperature equals or is within the threshold number of degrees of the fourth temperature. As an example, the threshold number of degrees can be a number of degrees within the range of 0-1 degrees, the range of 1-2 degrees, the range of 2-3 degrees, the range of 3-4 degrees, or the range of 4-5 degrees.

IV. Example Graphical User Interfaces

A computing device of the example implementations is operable to output a GUI onto a display. FIG. 13 to FIG. 28 show screenshots of a GUI in accordance with the example implementations. Although those figures include different reference numbers for the GUI, the GUI shown in FIG. 13 to FIG. 28 can be referred to as single GUI. A processor discussed in the description of FIG. 13 to FIG. 28 can, for example, be a processor 800 shown in FIG. 29. The GUI shown in FIG. 13 to FIG. 28 can be displayed on the display 14 or a display 804 shown in FIG. 29.

Figure 13:
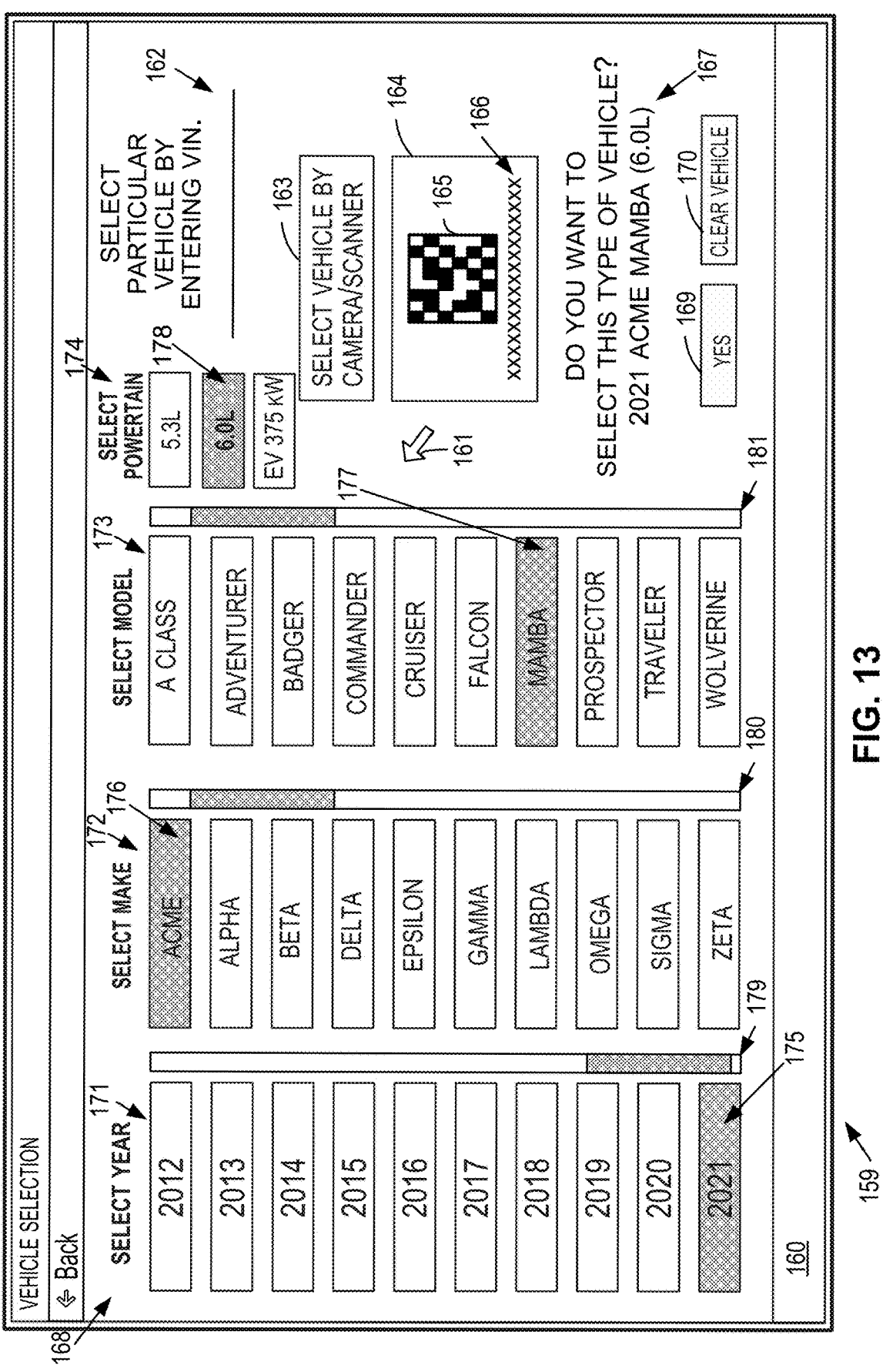
FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, and FIG. 28 show a screenshot of a graphical user interface in accordance with one or more example implementations.

FIG. 13 shows a screen shot 159 of a display as it displays a GUI 160. The GUI 160 includes a vehicle selection menu 168. A vehicle selection menu, such as the vehicle selection menu 168, includes one or more user-selectable controls operable to provide a processor with a signal indicative of a selection of a characteristic of the vehicle. In some implementations, the characteristic of the vehicle is an identifier of the vehicle itself such that no other characteristic needs to be entered to distinguish the vehicle from other vehicles. In other implementations, the characteristic of the vehicle is one of multiple characteristics a processor uses to distinguish the vehicle from other vehicles.

The GUI 160 can include a cursor 161 movable to point to a USC or another item of the GUI 160. The cursor 161 can be moved via a pointing device, such as a computer mouse, a track ball, direction arrow keys on a keyboard, or some other device. A processor can detect that the USC or the other item of the GUI 160 is selected when the cursor 161 is disposed on the USC or the other item of the GUI 160. For implementations in which the display 14, 804 includes a touch screen display, the GUI 160 may not include a cursor.

As shown in FIG. 13, the GUI 160 includes a year selection menu 171 in which a year USC 175 representing the year 2021 has been selected. The GUI 160 includes a make selection menu 172 in which a make USC 176 representing a make Acme has been selected. The GUI 160 includes a model selection menu 173 in which a model USC 177 representing the model Mamba has been selected. The makes and models shown in FIG. 13 are fictitious. In practice, the makes and models would include real vehicle makes and models. The GUI 160 includes a powertrain selection menu 174 in which an engine USC 178 representing a 6.0 L ICE has been selected. Alternatively, a different powertrain can be selected using the powertrain selection menu 174, such as a 5.3 L ICE, or a set of electric vehicle motor(s) rated at 375 kW. The year selection menu 171 includes a scroll bar 179 to cause the year selection menu 171 to display year(s) not currently shown in the year selection menu 171. Similarly, the make selection menu 172 includes a scroll bar 180 to cause the make selection menu 172 to display make(s) not currently shown in the make selection menu 172. Likewise, the model selection menu 173 includes a scroll bar 181 to cause the model selection menu 173 to display model(s) not currently shown in the model selection menu 173. Other examples of a selected year, make, model, and engine are also possible.

In at least some implementations, the make selection menu 172 is populated with vehicle makes after a year is selected from the year selection menu 171. Similarly, in at least some implementations, the model selection menu 173 is populated with vehicle models after a year is selected from the year selection menu 171 and after a make is selected from the make selection menu 172. Similarly, in at least some implementations, the powertrain selection menu 174 is populated with powertrain identifiers after a model is selected from the model selection menu 173 is populated with vehicle models after a year is selected from the year selection menu 171 and after a make is selected from the make selection menu 172. In alternative implementations, each of the year selection menu 171, the make selection menu 172, the model selection menu 173, or the powertrain selection menu 174 is in a separate view of the GUI 160 without the other of the year selection menu 171, the make selection menu 172, the model selection menu 173, and the powertrain selection menu 174.

In at least some implementations, the GUI 160 also includes a VIN USC 162 for entering an identifier of a particular vehicle. As an example, the VIN USC 162 can be used to type or key-in a vehicle identification number (VIN) associated with the particular vehicle. As another example, the VIN USC 162 can be used to cause a communication interface, such as a vehicle communication transceiver 802 (shown in FIG. 29), to request a VIN from an ECU in the particular vehicle. A processor, such as the processor 800, can receive the requested VIN and determine one or more from among a year, a make, a model, an engine or a serial number corresponding to the particular vehicle from the VIN.

The GUI 160 includes a vehicle selector USC 163 for capturing a visual indication of a particular vehicle. As an example, in response to selection of the vehicle selector USC 163, the processor 800 can cause a camera of the user interface 83 to capture an image, such as an image of a code 165 representing a VIN, and to cause the GUI 160 to display a window 164 showing the image of code 165 and to display a representation of the alpha-numeric representation of the VIN 166 as determined by the processor 800 decoding the code 165. As yet another example, in response to selection of the vehicle selector USC 163, the processor 800 can cause a scanner of a user interface (e.g., a user interface 812 shown in FIG. 29) to generate an image, such as an image of the code 165, and to cause the GUI 160 to display the window 164 showing the image of the code 165 and to display a representation of the alpha-numeric representation of the VIN 166 as determined by the processor 800 decoding the code 165.

The GUI 160 also includes a USC 169 to select a vehicle based on YMME criteria entered using the GUI 160 and indicated by a vehicle identifier 167. The GUI 160 further includes a USC 170 to clear the vehicle identifier 167 and the YMME criteria entered using the GUI 160 so that a user can select different YMME criteria for a desired vehicle type.

Figure 14:
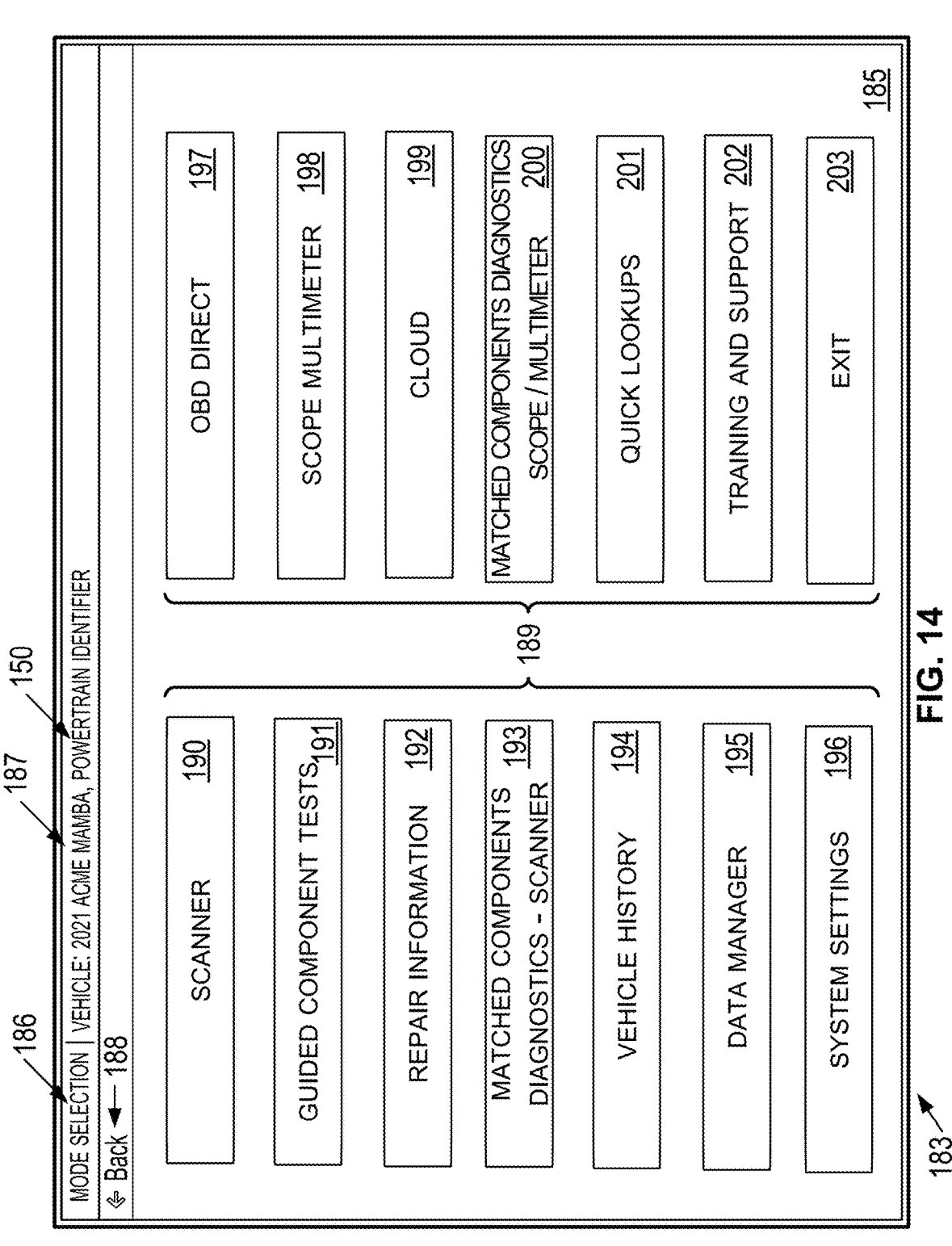

Next, FIG. 14 shows a screenshot 183 of a GUI 185. The GUI 185 includes a mode identifier 186, a vehicle identifier 187, and a back USC 188. The mode identifier 186 indicates the GUI 185 can be used to select an operating mode for the computing device 13. The operating mode can be selected by selection of a USC from a set of USC 189 that includes a USC 190 to a USC 203. The vehicle identifier 187 can indicate a vehicle selected using the GUI 160 shown in FIG. 13 or otherwise. The vehicle identifier 187 includes a powertrain identifier 150. The powertrain identifier 150 can indicate the 5.3 L ICE, the 6.0 L ICE, or the set of motor(s) rated at 375 kW. The back USC 188 is selectable to cause a GUI most-recently displayed (i.e., a GUI displayed just before displaying the GUI containing the back USC 188) to be displayed.

The USC 190 is selectable to cause the processor 800 to configure the computing device 13 to operate as a scan tool. As an example, when operating as a scan tool, the computing device 13 can communicate with electronic control units of the vehicle 11. These communications can include requesting performance of tests, requesting diagnostic trouble codes, and data corresponding to parameter identifiers. In at least some implementations, one or more USC of the set of USC 189 includes an icon, such as an icon representing the function corresponding to the USC.

The USC 193 is selectable to cause the processor 800 to configure the computing device 13 to transition to a mode in which the computing device 13 can perform diagnostics on matched components when the computing device 13 is operating as a scan tool. This configuring can include displaying the GUI 206 shown in FIG. 15. The USC 194 is selectable to cause the processor 800 to organize and manage work in progress and service records with respect to the vehicle identified by the vehicle identifier 187.

The USC 193 is selectable to cause the processor 800 configure the computing device 13 to transition to a mode in which the computing device 13 can perform diagnostics on matched components when the computing device 13 is operating as a scan tool. This configuring can include displaying the GUI 206 shown in FIG. 15. The USC 194 is selectable to cause the processor 800 to organize and manage work in progress and service records with respect to the vehicle identified by the vehicle identifier 187.

The USC 195 is selectable to cause the processor 800 to open an organization system for saved data files. The USC 196 is selectable to cause the processor 800 to establish and manage connections to peripheral devices, such as a scan module or an oscilloscope module. The USC 197 is selectable to cause the processor 800 to display a GUI from which OBD-II or EOBD system tests can be performed without identifying a specific vehicle. With a vehicle already selected, the GUI displayed in response to selecting the USC 197 could allow a user to perform tests not specifically for the vehicle identified by the vehicle identifier 187.

The USC 198 is selectable to cause the processor 800 to configure the computing device 13 to operate as a lab scope (i.e., oscilloscope), graphing multimeter or digital multimeter. The USC 199 is selectable to cause the processor 800 to open a website at which a user of the computing device 13 can store, organize and share information. The USC 200 is selectable to cause the processor 800 to configure the computing device 13 to transition to a mode in which the computing device 13 can perform diagnostics on matched components when the computing device 13 is operating as a lab scope or multimeter.

The USC 201 is selectable to cause the processor 800 to provide original equipment manufacturer (OEM) vehicle information for oil specifications and resets and technical service bulletins. The USC 202 is selectable to cause the processor 800 to open a website for viewing or downloading training videos, a user manual or other product support documentation. The USC 203 is selectable to cause the processor 800 to close the an application that causes the GUI 185 to be displayed.

Figure 15:
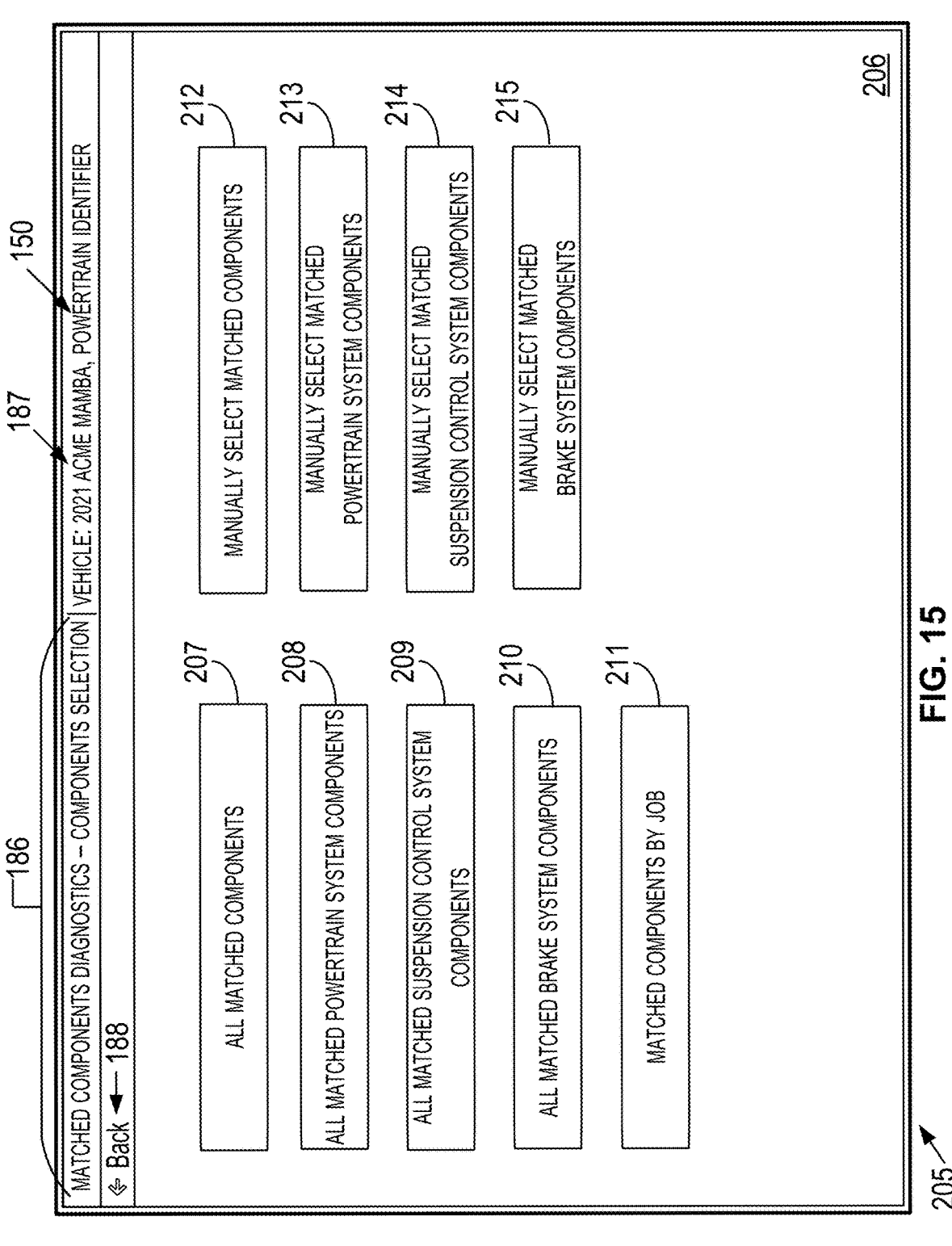

Next, FIG. 15 shows a screenshot 205 of a GUI 206. The mode identifier 186 indicates that the computing device 13 is operating in a mode for selecting components for matched components diagnostics. The GUI 206 includes a USC 207, 208, 209, 210, 211, 212, 213, 214, 215. For purposes of describing FIG. 15, it will be assumed that the vehicle identifier 187 corresponds to the vehicle ID within the data 290 shown in FIG. 31 and FIG. 32 (i.e., vehicle ID VI5) or the vehicle ID VI6 shown in FIG. 33. The data 290 in FIG. 31 and FIG. 32 includes data regarding sets of matched components J, K, L, M, N, O, P, Q, R, S, T, U, V, W. Some or all of the data 290 could be embedded as metadata within the GUI 206 or some other GUI shown in the drawings.

The USC 207 is selectable to select all matched components associated with the vehicle identified by the vehicle identifier 187. Based on the data 290 for vehicle ID VI5 and in response to a selection of the USC 207, the processor 800 would determine the matched components include the components in the sets of matched components J, K, L, M, N, O, P, Q, R, S, T, U, V, W. In response to selecting the USC 207, the processor 800 can output a GUI to show measurements associated with the components in the sets of matched J, K, L, M, N, O, P, Q, R, S, T, U, V, W.

The USC 208 is selectable to display a GUI from which matched powertrain system components associated with the vehicle identified by the vehicle identifier 187 are selected. Based on the data 290 for vehicle ID VI5 and in response to a selection of the USC 208, the processor 800 would determine the matched powertrain system components include the components in the sets of matched components J, K, L, O, Q, R, T, U, V, W. In response to selecting the USC 208, the processor 800 can output a GUI to show measurements associated with the components in the sets of matched components J, K, L, O, Q, R, T, U, V, W.

The USC 209 is selectable to display a GUI from which matched suspension control system components associated with the vehicle identified by the vehicle identifier 187 are selected. Based on the data 290 for vehicle ID VI5 and in response to a selection of the USC 209, the processor 800 would determine the matched suspension control system components include the components in the sets of matched components M, N. In response to selecting the USC 209, the processor 800 can output a GUI to show measurements associated with the components in the sets of matched components M, N.

The USC 210 is selectable to display a GUI from which matched brake system components associated with the vehicle identified by the vehicle identifier 187 are selected. Based on the data 290 for vehicle ID VI5 and in response to a selection of the USC 210, the processor 800 would determine the matched brake system components include the components in the sets of matched components P, S. In response to selecting the USC 210, the processor 800 can output a GUI to show measurements associated with the components in the sets of matched components P, S.

The USC 211 is selectable to display a GUI from which matched components associated with a particular job that can be performed on the vehicle identified by the vehicle identifier 187 can be selected. Based on the data 290 for vehicle ID VI5 and in response to a selection of the USC 211, the processor 800 can output a GUI from which sets of matched components corresponding to jobs identified as job J1, job J3, or J7 can be selected. The job J1 corresponds to the sets of matched components M, N. The job J3 corresponds to the set of matched components J. The job J7 corresponds to the set of matched components P. In response to selecting the job J1, the processor 800 can output a GUI to show measurements associated with the components in the sets of matched components M, N. In response to selecting the job J3, the processor 800 can output a GUI to show measurements associated with the components in the set of matched components J. In response to selecting the job J7, the processor 800 can output a GUI to show measurements associated with the components in the set of matched components P.

The USC 212 is selectable to display a GUI from which matched components associated with the vehicle identified by the vehicle identifier 187 can be manually selected. Based on the data 290 for vehicle ID VI5 and in response to a selection of the USC 212, the processor 800 can output a GUI from which sets of matched components in the sets of matched components J, K, L, M, N, O, P, Q, R, S, T, U, V, W can be selected.

The USC 213 is selectable to display a GUI from which matched powertrain system components associated with the vehicle identified by the vehicle identifier 187 can be manually selected. Based on the data 290 for vehicle ID VI5 and in response to a selection of the USC 213, the processor 800 can output a GUI from which sets of matched powertrain system components in the sets of matched components J, K, L, O, Q, R, T, U, V, W can be selected.

The USC 214 is selectable to display a GUI from which matched suspension control system components associated with the vehicle identified by the vehicle identifier 187 can be manually selected. Based on the data 290 for vehicle ID VI5 and in response to a selection of the USC 214, the processor 800 can output a GUI from which sets of matched suspension control system components in the sets of matched components M, N can be selected.

The USC 215 is selectable to display a GUI from which matched brake system components associated with the vehicle identified by the vehicle identifier 187 can be manually selected. Based on the data 290 for vehicle ID VI5 and in response to a selection of the USC 215, the processor 800 can output a GUI from which sets of matched brake system components in the sets of matched components P, S can be selected.

The vehicle systems listed in the USC 208, 209, 210, 213, 214, 215 are examples only. A GUI to selected matched components could include user-selectable controls configured for selecting matched components of other vehicle systems instead of or in addition to the vehicle systems shown in FIG. 15.

Figure 16:
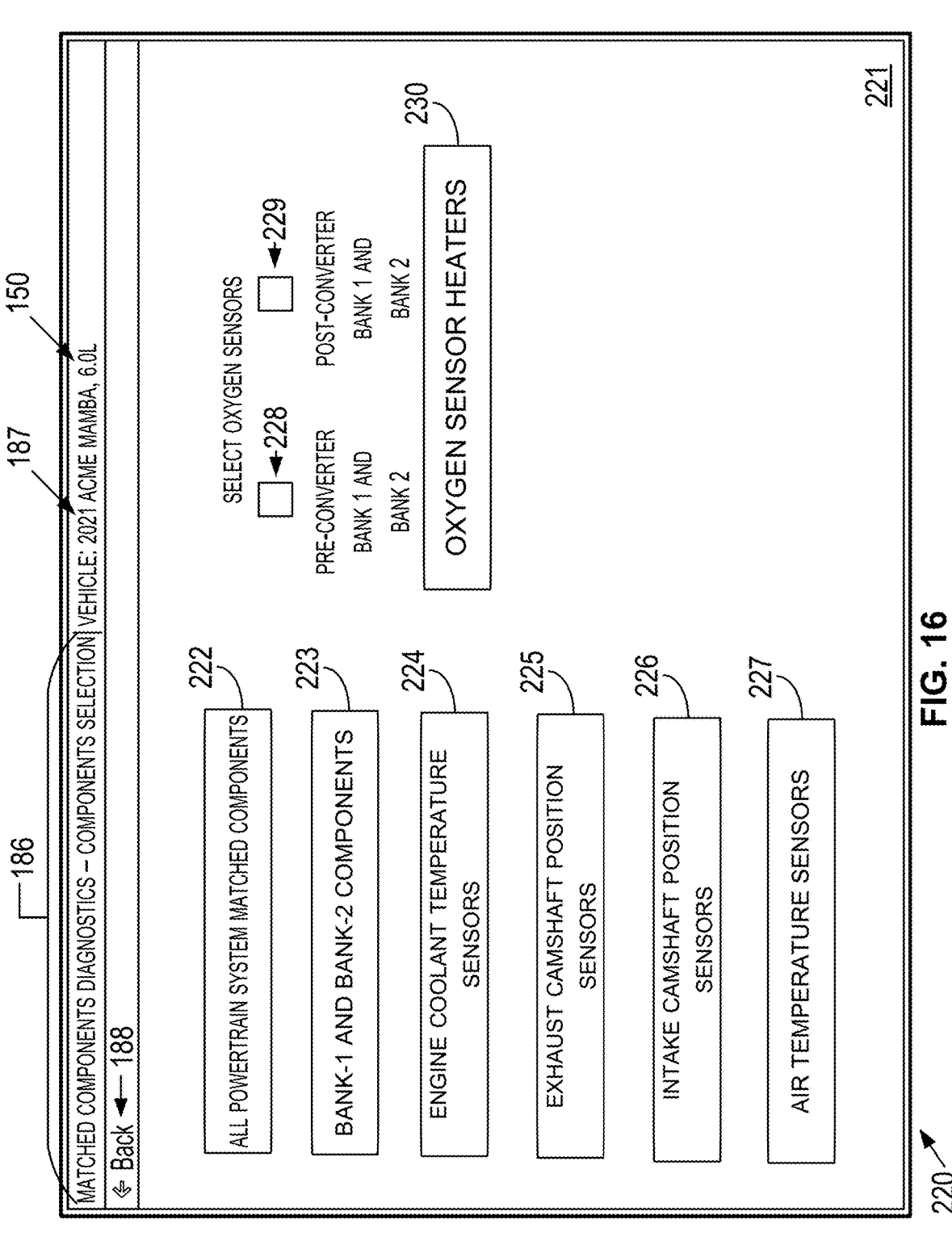

Next, FIG. 16 shows a screenshot 220 of a GUI 221. The mode identifier 186 in the GUI 261 indicates that the computing device 13 is operating in a mode for selecting components for matched components diagnostics. The GUI 221 includes a USC 222, 223, 224, 225, 226, 227, 228, 229, 230. For purposes of describing FIG. 16, it will be assumed that the vehicle identifier 187 corresponds to the vehicle ID within the data 290 shown in FIG. 31 and FIG. 32. As discussed above, the data 290 in FIG. 31 and FIG. 32 includes data regarding sets of matched components J, K, L, M, N, O, P, Q, R, S, T, U, V, W.

The USC 222 is selectable to select all matched powertrain system components associated with the vehicle identified by the vehicle identifier 187. Based on the data 290 and in response to a selection of the USC 222, the processor 800 would determine the matched powertrain system components include the components in the sets of matched components J, K, L, O, Q, R, T, U, V, W. Depending on how many channels the multimeter 808 or the oscilloscope 810 has, determining measurements of signals output by components in those sets of matched components or conditions of those components may include measuring the signals or conditions during different periods of time and/or by determining the measurements from datum in vehicle data messages. Similar circumstances exist based on how many components are associated with the USC 223, 224, 225, 226, 227, 228, 229, 230. In response to selecting the USC 222, the processor 800 can output a GUI to show measurements associated with the components in the sets of matched components J, K, L, O, Q, R, T, U, V, W.

The USC 223 is selectable to select all bank-1 and bank-2 components associated with the vehicle identified by the vehicle identifier 187. Based on the data 290 and in response to a selection of the USC 223, the processor 800 would determine the matched bank-1 and bank-2 components include the components in the sets of matched components K, L, O, Q, R, T, U, V, W. In response to selecting the USC

223, the processor 800 can output a GUI to show measurements associated with the components in the sets of matched components K, L, O, Q, R, T, U, V, W.

The USC 224 is selectable to select all matched engine coolant temperature sensors associated with the vehicle identified by the vehicle identifier 187. Based on the data 290 and in response to a selection of the USC 224, the processor 800 would determine the matched engine coolant temperature sensors include the components in the set of matched components J. In response to selecting the USC 224, the processor 800 can output a GUI to show measurements associated with the components in the set of matched components J.

Figure 17:
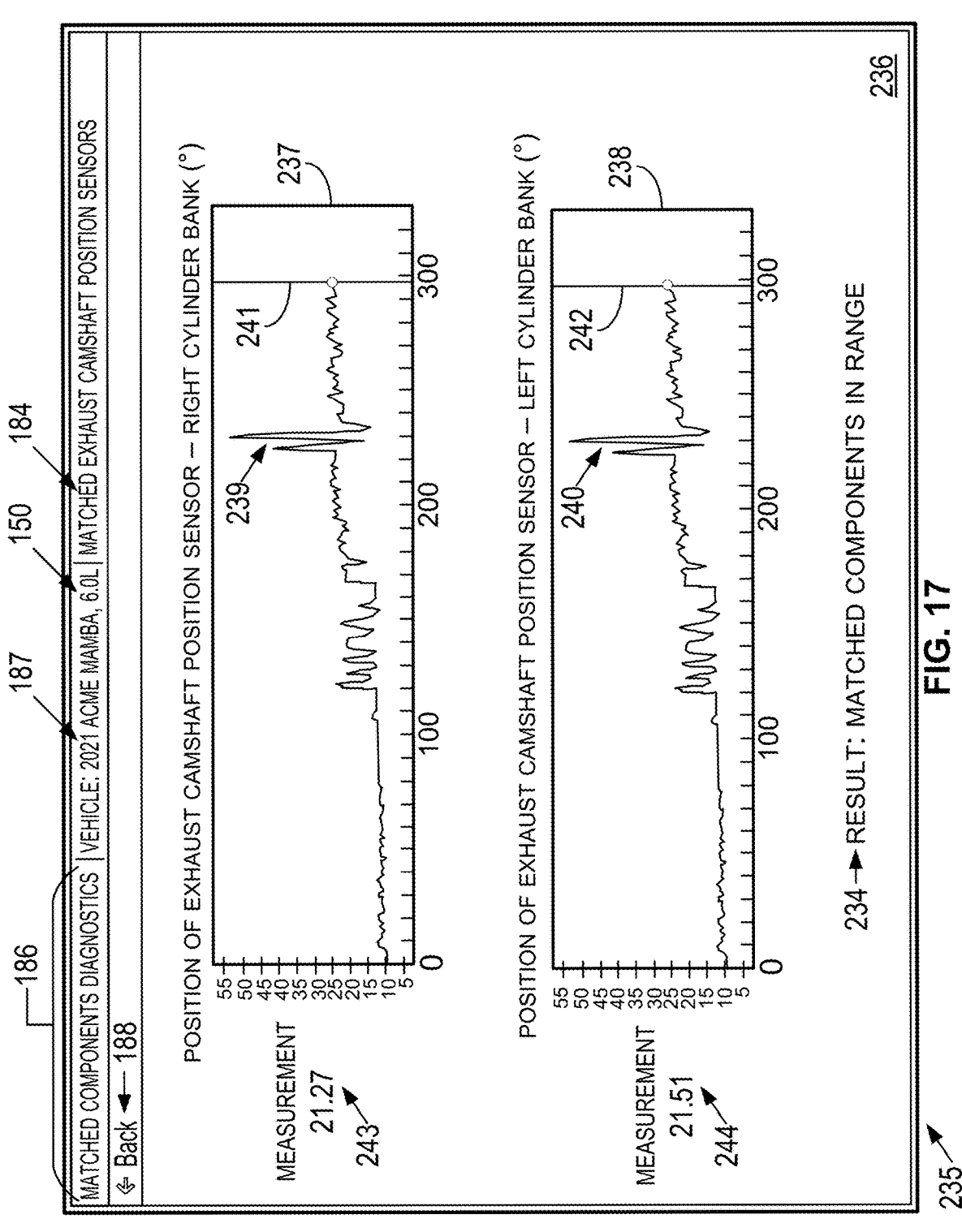

The USC 225 is selectable to select all matched exhaust camshaft position sensors associated with the vehicle identified by the vehicle identifier 187. Based on the data 290 and in response to a selection of the USC 225, the processor 800 would determine the matched exhaust camshaft position sensors include the components in the set of matched components Q. In response to selecting the USC 225, the processor 800 can output a GUI to show measurements associated with the components in the set of matched components Q. An example of such a GUI is shown in FIG. 17.

The USC 226 is selectable to select all matched intake camshaft position sensors associated with the vehicle identified by the vehicle identifier 187. Based on the data 290 and in response to a selection of the USC 226, the processor 800 would determine the matched intake camshaft position sensors include the components in the set of matched components R. In response to selecting the USC 226, the processor 800 can output a GUI to show measurements associated with the components in the set of matched components R, such as the GUI 246 shown in FIG. 18.

The USC 227 is selectable to select all matched air temperature sensors associated with the vehicle identified by the vehicle identifier 187. Based on the data 290 and in response to a selection of the USC 227, the processor 800 would determine the matched air temperature sensors include the components in the set of matched components T. In response to selecting the USC 227, the processor 800 can output a GUI to show measurements associated with the components in the set of matched components T.

The USC 228 is selectable to select all matched oxygen sensors on bank-1 and bank-2 that are prior to a catalytic converter on the vehicle identified by the vehicle identifier 187. Based on the data 290 and in response to a selection of the USC 228, the processor 800 would determine the matched air temperature sensors include the components in the set of matched components U. In response to selecting the USC 228, the processor 800 can output a GUI to show measurements associated with the components in the set of matched components U.

The USC 229 is selectable to select all matched oxygen sensors on bank-1 and bank-2 that are after a catalytic converter on the vehicle identified by the vehicle identifier 187. Based on the data 290 and in response to a selection of the USC 229, the processor 800 would determine the matched air temperature sensors include the components in the set of matched components V. In response to selecting the USC 229, the processor 800 can output a GUI to show measurements associated with the components in the set of matched components V, such as the GUI 486 shown in FIG. 25.

The USC 230 is selectable to select all matched oxygen sensor heaters associated with the vehicle identified by the vehicle identifier 187. Based on the data 290 and in response to a selection of the USC 230, the processor 800 would determine the matched oxygen sensor heaters include the components in the set of matched components W. In response to selecting the USC 230, the processor 800 can output a GUI to show measurements associated with the components in the set of matched components W, such as the GUI 431 shown in FIG. 24.

Next, FIG. 17 shows a screenshot 235 of a GUI 236. The mode identifier 186 in the GUI 236 indicates that the computing device 13 is operating in a matched components diagnostics mode. The GUI 236 includes a component identifier 184 that indicates matched exhaust camshaft position sensors have been selected. The GUI 236 includes a container 237, 238 including a graph 239, 240 respectively and a cursor 241, 242 respectively. The graph 239 is a representation of measurements of a position of an exhaust camshaft position sensor, right cylinder bank in degrees. Similarly, the graph 240 is a representation of measurements of a position of an exhaust camshaft position sensor, left cylinder bank in degrees. The GUI 236 includes a measurement 243, 244 indicative of measurements within the graph 239, 240, respectively, where the cursor 241, 242, respectively, is positioned.

In at least some implementations, the measurement 243, 244 is a measurement determined using a multimeter 808 (shown in FIG. 29) or an oscilloscope 810 (shown in FIG. 29), and the graph 239, 240 is a representation of measurements determined using the multimeter 808 or the oscilloscope 810. In at least some other implementations, the measurement 243, 244 is based on a datum in a vehicle data message including a parameter identifier corresponding to the exhaust camshaft position sensor, left cylinder bank and the exhaust camshaft position sensor, right cylinder bank, respectively, and the graph 239, 240 is a representation of measurements based on datum in vehicle data messages including a parameter identifier corresponding to the exhaust camshaft position sensor, left cylinder bank and the exhaust camshaft position sensor, right cylinder bank, respectively.

The GUI 236 also includes a notification 234 based on a determination the processor 800 makes by comparing a difference of the measurements shown in the graph 239, 240 to a measurement threshold. As shown in FIG. 17, the notification 234 indicates the matched components are in range. In other words, the comparisons of the difference in measurements does not exceed the measurement threshold.

Figure 18:
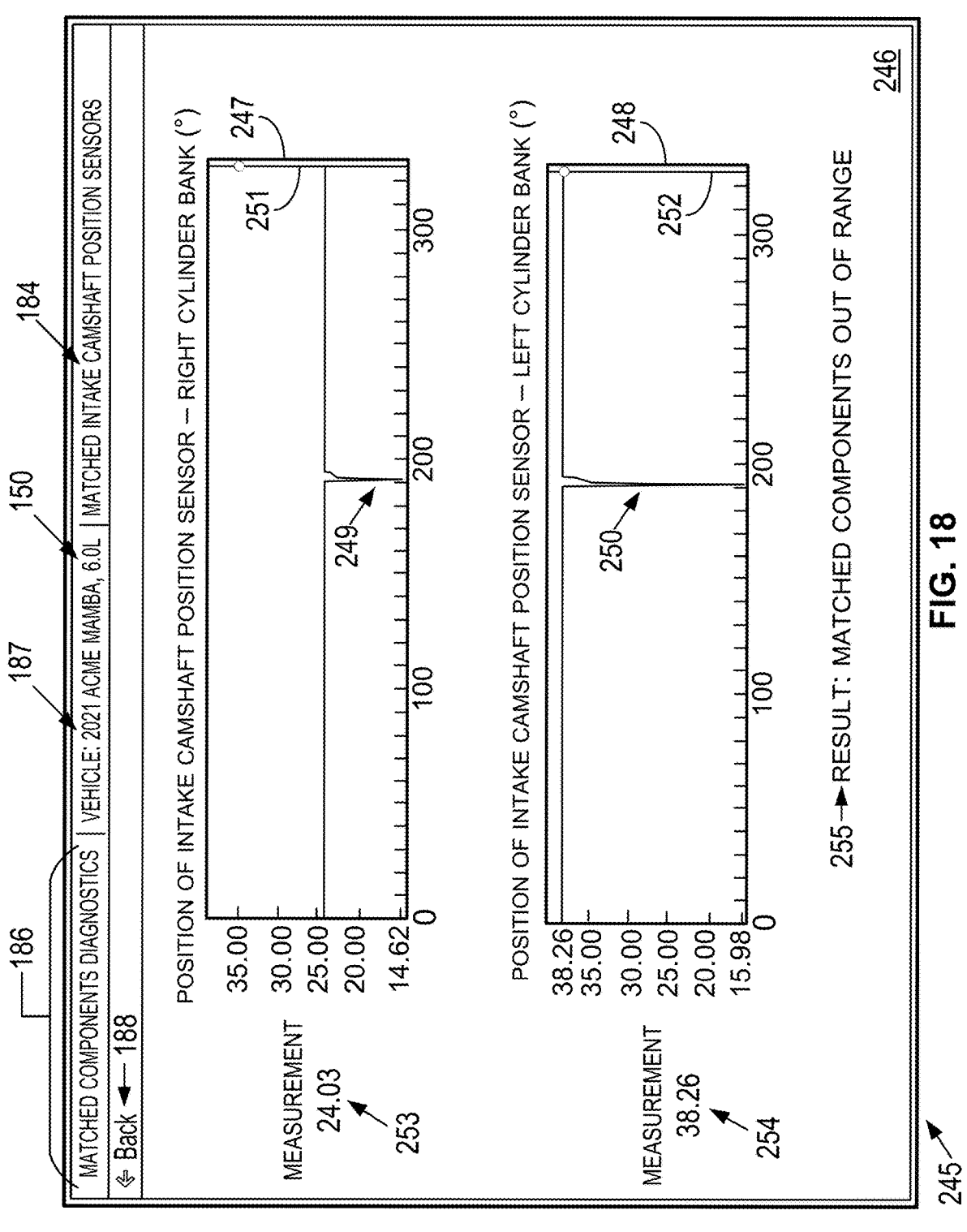

Next, FIG. 18 shows a screenshot 245 of a GUI 246. The mode identifier 186 in the GUI 246 indicates that the computing device 13 is operating in a matched components diagnostics mode. The GUI 246 includes a component identifier 184 that indicates matched intake camshaft position sensors have been selected. The GUI 246 includes a container 247, 248 including a graph 249, 250 respectively and a cursor 251, 252 respectively. The graph 249 is a representation of measurements of a position of an intake camshaft position sensor, right cylinder bank in degrees. Similarly, the graph 250 is a representation of measurements of a position of an intake camshaft position sensor, left cylinder bank in degrees. The GUI 246 includes a measurement 253, 254 indicative of measurements within the graph 249, 250, respectively, where the cursor 251, 252, respectively, is positioned.

In at least some implementations, the measurement 253, 254 is a measurement determined using the multimeter 808 or the oscilloscope 810, and the graph 249, 250 is a representation of measurements determined using the multimeter 808 or the oscilloscope 810. In at least some other implementations, the measurement 253, 254 is based on a datum in a vehicle data message including a parameter identifier corresponding to the intake camshaft position sensor, left cylinder bank and the intake camshaft position sensor, right cylinder bank, respectively, and the graph 249, 250 is a representation of measurements based on datum in vehicle data messages including a parameter identifier corresponding to the intake camshaft position sensor, left cylinder bank and the intake camshaft position sensor, right cylinder bank, respectively.

The GUI 246 also includes a notification 255 based on a determination the processor 800 makes by comparing a difference of the measurements shown in the graph 249, 250 to a measurement threshold. As shown in FIG. 18, the notification 255 indicates the matched components are out of range. In other words, a comparison of a difference in measurements exceeds the measurement threshold.

Figure 19:
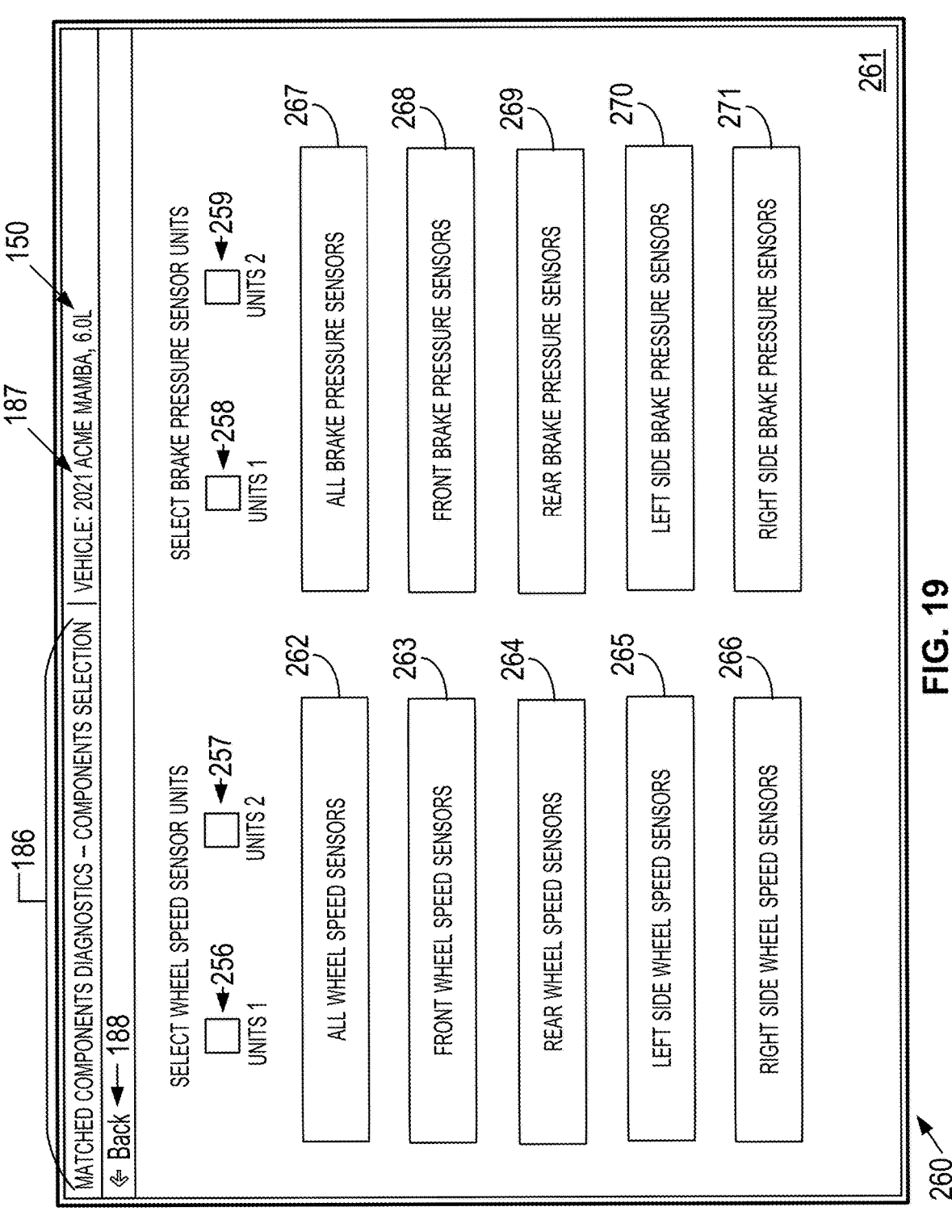

Next, FIG. 19 shows a screenshot 260 of a GUI 261. The mode identifier 186 in the GUI 261 indicates that the computing device 13 is operating in a mode for selecting components for matched components diagnostics. The GUI 261 includes a USC 256, 257, 258, 259, 262, 263, 264, 265, 266, 267, 268, 269, 270, 271. For purposes of describing FIG. 19, it will be assumed that the vehicle identifier 187 corresponds to the vehicle ID within the data 290 shown in FIG. 31 and FIG. 32 (i.e. vehicle ID VI5). As discussed above, the data 290 in FIG. 31 and FIG. 32 includes data regarding sets of matched components J, K, L, M, N, O, P, Q, R, S, T, U, V, W.

The USC 256, 257 is selectable to select a units for PID data corresponding to wheel speed sensors that are to be displayed after selecting one of the USC 262 to the USC 266. As an example, those units can be frequency (e.g., Hz), speed (e.g., miles per hour (i.e., mph)), or voltage (e.g., volts DC). The USC 258, 259 is selectable to select a units for PID data corresponding to brake pressure sensors that are to be displayed after selecting one of the USC 267 to the USC 271. As an example, those units can be pressure (e.g., pounds per square inch (i.e., PSI)), speed, or voltage (e.g., volts DC).

The USC 262 is selectable to select all matched wheel speed sensors associated with the vehicle identified by the vehicle identifier 187. Based on the data 290 and in response to a selection of the USC 262, the processor 800 would determine the matched wheel speed sensors include the wheel speed sensors in the sets of matched components P. In response to selecting the USC 262, the processor 800 can output a GUI to show measurements associated with the wheel speed sensors in the set of matched components P.

Figure 20:
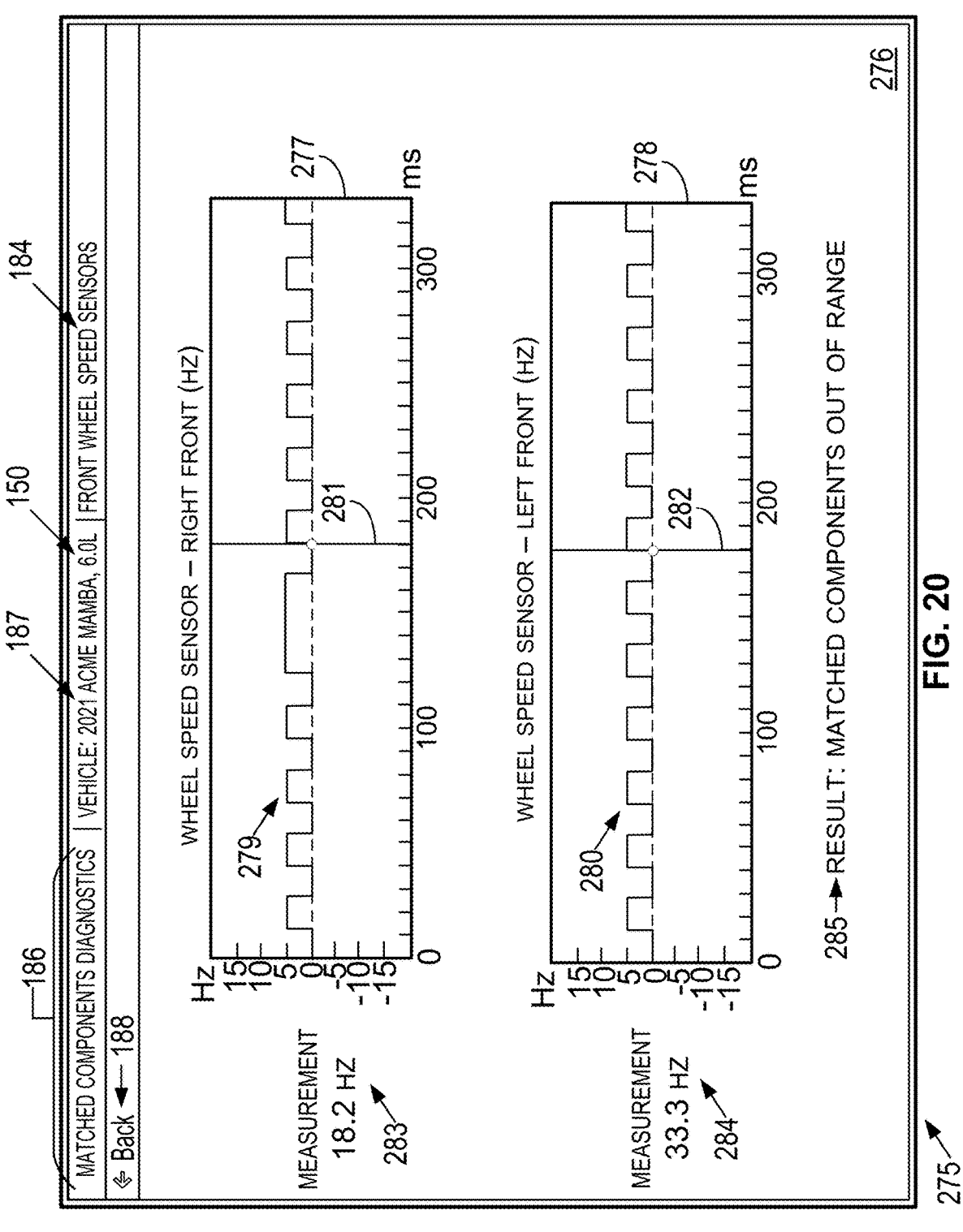

The USC 263 is selectable to select all matched front wheel speed sensors associated with the vehicle identified by the vehicle identifier 187. Based on the data 290 and in response to a selection of the USC 263, the processor 800 would determine the matched front wheel speed sensors include the wheel speed sensors in the set of matched components P that are associated with the parameter identifier $28, $29. In response to selecting the USC 263, the processor 800 can output a GUI to show measurements associated with the wheel speed sensors in the set of matched components P that are associated with the parameter identifier $28, $29. An example of such a GUI is shown in FIG. 20.

The USC 264 is selectable to select all matched rear wheel speed sensors associated with the vehicle identified by the vehicle identifier 187. Based on the data 290 and in response to a selection of the USC 264, the processor 800 would determine the matched rear wheel speed sensors include the wheel speed sensors in the set of matched components P that are associated with the parameter identifier $2A, $2B. In response to selecting the USC 264, the processor 800 can output a GUI to show measurements associated with the wheel speed sensors in the set of matched components P that are associated with the parameter identifier $2A, $2B.

The USC 265 is selectable to select all matched left side wheel speed sensors associated with the vehicle identified by the vehicle identifier 187. Based on the data 290 and in response to a selection of the USC 265, the processor 800 would determine the matched left side wheel speed sensors include the wheel speed sensors in the set of matched components P that are associated with the parameter identifier $28, $2A. In response to selecting the USC 265, the processor 800 can output a GUI to show measurements associated with the wheel speed sensors in the set of matched components P that are associated with the parameter identifier $28, $2A.

The USC 266 is selectable to select all matched right side wheel speed sensors associated with the vehicle identified by the vehicle identifier 187. Based on the data 290 and in response to a selection of the USC 266, the processor 800 would determine the matched right side wheel speed sensors include the wheel speed sensors in the set of matched components P that are associated with the parameter identifier $29, $2B. In response to selecting the USC 266, the processor 800 can output a GUI to show measurements associated with the wheel speed sensors in the set of matched components P that are associated with the parameter identifier $29, $2B.

The USC 267 is selectable to select all matched brake pressure sensors associated with the vehicle identified by the vehicle identifier 187. Based on the data 290 and in response to a selection of the USC 267, the processor 800 would determine the matched brake pressure sensors include the brake pressure sensors in the set of matched components S. In response to selecting the USC 267, the processor 800 can output a GUI to show measurements associated with the brake pressure sensors in the set of matched components S, such as the GUI 381 shown in FIG. 22.

The USC 268 is selectable to select all matched front brake pressure sensors associated with the vehicle identified by the vehicle identifier 187. Based on the data 290 and in response to a selection of the USC 268, the processor 800 would determine the matched front brake pressure sensors include the brake pressure sensors in the set of matched components S that are associated with the parameter identifier $2C, $2D. In response to selecting the USC 268, the processor 800 can output a GUI to show measurements associated with the brake pressure sensors in the set of matched components S that are associated with the parameter identifier $2C, $2D. Such a GUI could be arranged like the GUI 381 shown in FIG. 22, but without a container 384, 385, a graph 388, 389, a cursor 392, 393, and a measurement 396, 397.

The USC 269 is selectable to select all matched rear brake pressure sensors associated with the vehicle identified by the vehicle identifier 187. Based on the data 290 and in response to a selection of the USC 269, the processor 800 would determine the matched rear brake pressure sensors include the brake pressure sensors in the set of matched components S that are associated with the parameter identifier $2E, $2F. In response to selecting the USC 269, the processor 800 can output a GUI to show measurements associated with the brake pressure sensors in the set of matched components S that are associated with the parameter identifier $2E, $2F. Such a GUI could be arranged like the GUI 381 shown in FIG. 22, but without a container 382, 383, a graph 386, 387, a cursor 390, 391, and a measurement 394, 395.

The USC 270 is selectable to select all matched left side brake pressure sensors associated with the vehicle identified by the vehicle identifier 187. Based on the data 290 and in response to a selection of the USC 270, the processor 800 would determine the matched left side brake pressure sensors include the brake pressure sensors in the set of matched components S that are associated with the parameter identifier $2C, $2E. In response to selecting the USC 270, the processor 800 can output a GUI to show measurements associated with the brake pressure sensors in the set of matched components S that are associated with the parameter identifier $2C, $2E. Such a GUI could be arranged like the GUI 381 shown in FIG. 22, but without a container 383, 385, a graph 387, 389, a cursor 391, 393, and a measurement 395, 397.

The USC 271 is selectable to select all matched right side brake pressure sensors associated with the vehicle identified by the vehicle identifier 187. Based on the data 290 and in response to a selection of the USC 271, the processor 800 would determine the matched right side brake pressure sensors include the brake pressure sensors in the set of matched components S that are associated with the parameter identifier $2D, $2F. In response to selecting the USC 271, the processor 800 can output a GUI to show measurements associated with the brake pressure sensors in the set of matched components S that are associated with the parameter identifier $2D, $2F. Such a GUI could be arranged like the GUI 381 shown in FIG. 22, but without a container 382, 384, a graph 386, 388, a cursor 390, 392, and a measurement 394, 396.

Next, FIG. 20 shows a screenshot 275 of a GUI 276. The mode identifier 186 in the GUI 276 indicates that the computing device 13 is operating in a matched components diagnostics mode. The GUI 276 includes a component identifier 184 that indicates matched front wheel speed sensors have been selected. The GUI 276 includes a container 277, 278 including a graph 279, 280 respectively and a cursor 281, 282 respectively. The graph 279 is a representation of measurements of a frequency of a right front wheel speed sensor in hertz. Similarly, the graph 280 is a representation of measurements of a frequency of a left front wheel speed sensor in hertz. The GUI 276 includes a measurement 283, 284 indicative of measurements within the graph 279, 280, respectively, where the cursor 281, 282, respectively, is positioned.

In at least some implementations, the measurement 283, 284 is a measurement determined using the multimeter 808 or the oscilloscope 810, and the graph 279, 280 is a representation of measurements determined using the multimeter 808 or the oscilloscope 810. In at least some other implementations, the measurement 283, 284 is based on a datum in a vehicle data message including a parameter identifier corresponding to the right front wheel speed sensor and the left front wheel speed sensor, respectively, and the graph 279, 280 is a representation of measurements based on datum in vehicle data messages including a parameter identifier corresponding to the right front wheel speed sensor, and the left front wheel speed sensor, respectively.

The GUI 276 also includes a notification 285 based on a determination the processor 800 makes by comparing a difference of the measurements shown in the graph 279, 280 to a measurement threshold. As shown in FIG. 20, the notification 285 indicates the matched components are out of range. In other words, a comparison of a difference in measurements exceeds the measurement threshold.

Figure 21:
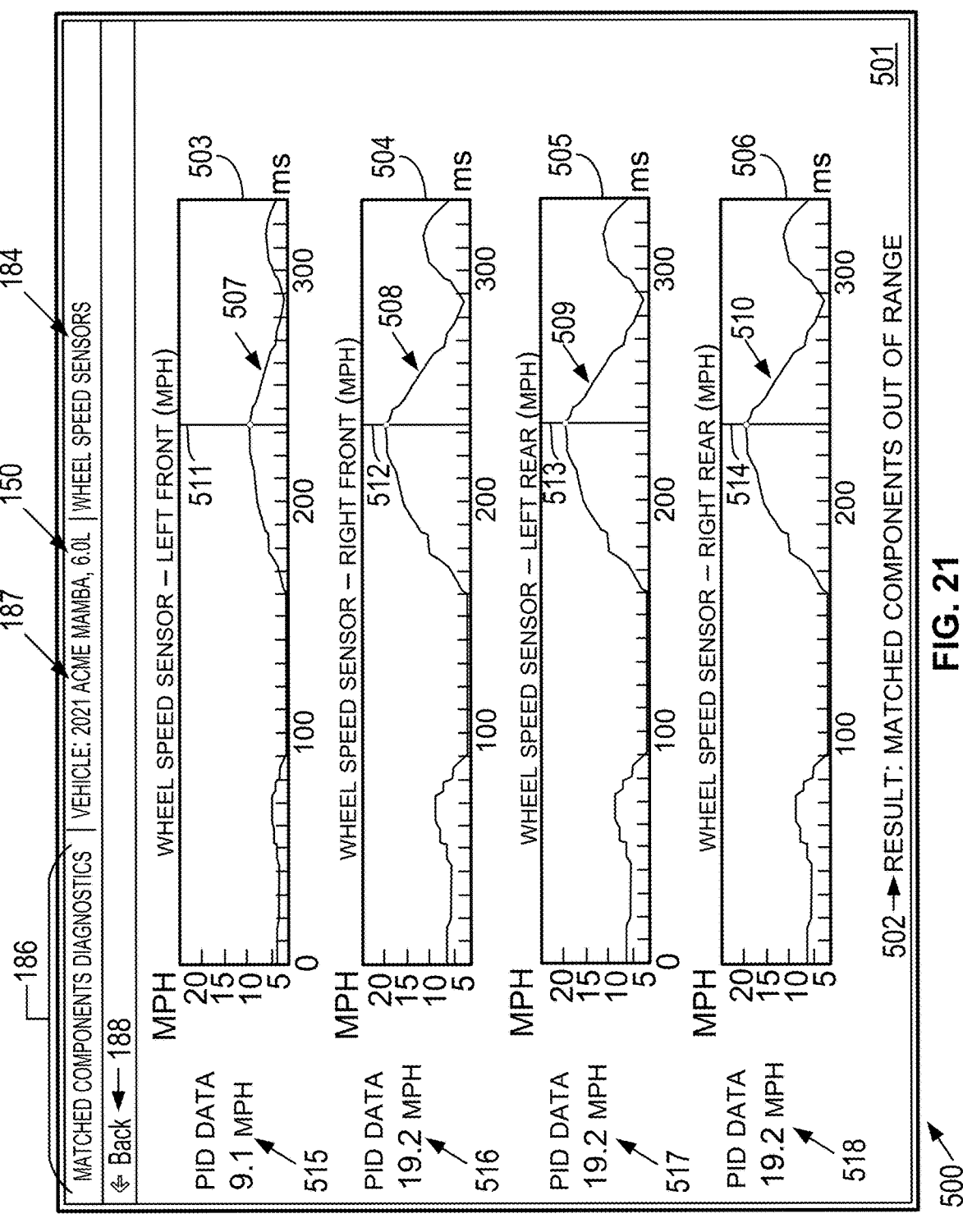

Next, FIG. 21 shows a screenshot 500 of a GUI 501. The mode identifier 186 in the GUI 501 indicates that the computing device 13 is operating in a matched components diagnostics mode. The GUI 501 includes a component identifier 184 that indicates matched wheel speed sensors have been selected. The GUI 501 includes a container 503, 504, 505, 506 including a graph 507, 508, 509, 510 respectively and a cursor 511, 512, 513, 514 respectively. The graph 507 is a representation of measurements of a speed by a left front wheel speed sensor in mph. Similarly, the graph 508 is a representation of measurements of a speed by a right front wheel speed sensor in mph. Likewise, the graph 509 is a representation of measurements of a speed by a left rear wheel speed sensor in mph, and the graph 510 is a representation of measurements of a speed by a right rear wheel speed sensor in mph. The GUI 501 includes a measurement 515, 516, 517, 518 indicative of measurements within the graph 507, 508, 509, 510, respectively, where the cursor 511, 512, 513, 514, respectively, is positioned.

In at least some implementations, the measurement 515, 516, 517, 518 is a measurement determined using the multimeter 808 or the oscilloscope 810, and the graph 507, 508, 509, 510 is a representation of measurements determined using the multimeter 808 or the oscilloscope 810. In at least some other implementations, the measurement 515, 516, 517, 518 is based on a datum in a vehicle data message including a parameter identifier corresponding to the left front wheel speed sensor, the right front wheel speed sensor, the left rear wheel speed sensor, and the right rear wheel speed sensor, respectively, and the graph 507, 508, 509, 510 is a representation of measurements based on datum in vehicle data messages including a parameter identifier corresponding to the left front wheel speed sensor, the right front wheel speed sensor, the left rear wheel speed sensor, and the right rear wheel speed sensor, respectively.

The GUI 501 also includes a notification 502 based on a determination the processor 800 makes by comparing a difference of the measurements shown in the graph 507, 508, 509, 510 to a measurement threshold. As shown in FIG. 21, the notification 502 indicates the matched components are out of range. In other words, a comparison of a difference in measurements exceeds the measurement threshold. For example, if the measurement threshold for the wheel speed sensors is 3.2 kilometers per hour (kph) (i.e., 1.99 mph), then the difference between the measurement of 9.1 mph in the graph 507 and the measurements of 19.2 mph in the graph 508, the graph 509, and the graph 510 exceeds the measurement threshold.

Figure 22:
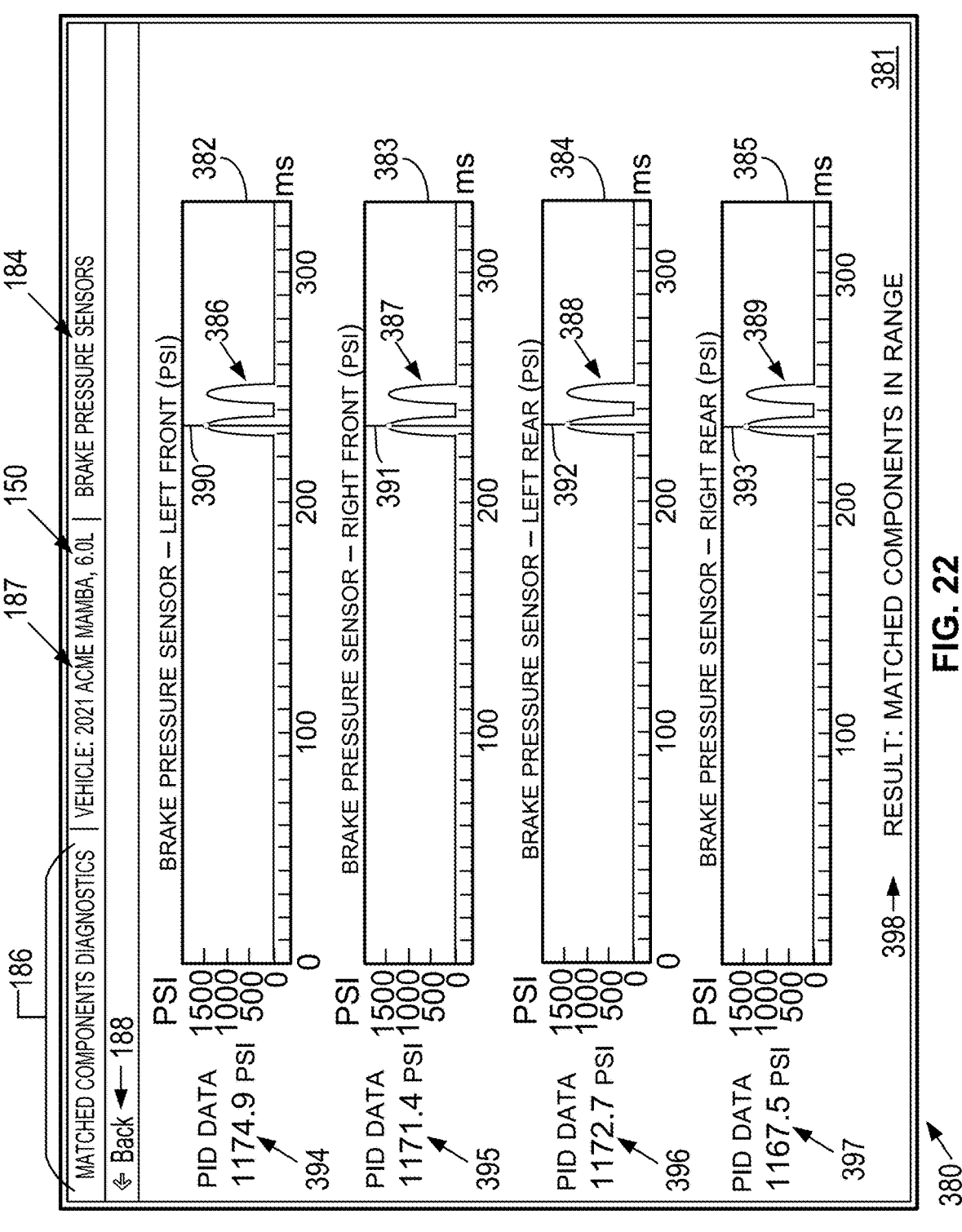

Next, FIG. 22 shows a screenshot 380 of a GUI 381. The mode identifier 186 in the GUI 381 indicates that the computing device 13 is operating in a matched components diagnostics mode. The GUI 381 includes a component identifier 184 that indicates matched brake pressure sensors have been selected. The GUI 381 includes a container 382, 383, 384, 385 including a graph 386, 387, 388, 389, respectively, and a cursor 390, 391, 392, 393, respectively. The graph 386 is a representation of measurements of a pressure of a left front brake pressure sensor in pounds per square inch (PSI). Similarly, the graph 387 is a representation of measurements of a pressure of a right front brake pressure sensor in PSI. Likewise, the graph 388 is a representation of measurements of a pressure of a left rear brake pressure sensor in PSI, and the graph 389 is a representation of measurements of a pressure of a right rear brake pressure sensor in PSI. The GUI 381 includes a measurement 394, 395, 396, 397 indicative of measurements within the graph 386, 387, 388, 389, respectively, where the cursor 390, 391, 392, 393, respectively, is positioned. The graph 386, 387, 388, 389 include two pulses (one of which is centered at the cursor 390, 391, 392, 393, respectively) representing a brake pedal in a vehicle twice.

In at least some implementations, the measurement 394, 395, 396, 397 is a measurement determined using the multimeter 808 or the oscilloscope 810, and the graph 386, 387, 388, 389 is a representation of measurements determined using the multimeter 808 or the oscilloscope 810. In at least some other implementations, the measurement 394, 395, 396, 397 is based on a datum in a vehicle data message including a parameter identifier corresponding to the left front brake pressure sensor, the right front brake pressure sensor, the left rear brake pressure sensor, and the right rear brake pressure sensor, respectively, and the graph 386, 387, 388, 389 is a representation of measurements based on datum in vehicle data messages including a parameter identifier corresponding to the left front brake pressure sensor, the right front brake pressure sensor, the left rear brake pressure sensor, and the right rear brake pressure sensor, respectively.

The GUI 381 also includes a notification 398 based on a determination the processor 800 makes by comparing a difference of the measurements shown in the graph 386, 387, 388, 389 to a measurement threshold. As shown in FIG. 22, the notification 398 indicates the matched components are in range. In other words, a comparison of a difference in measurements does not exceed the measurement threshold.

Figure 23:
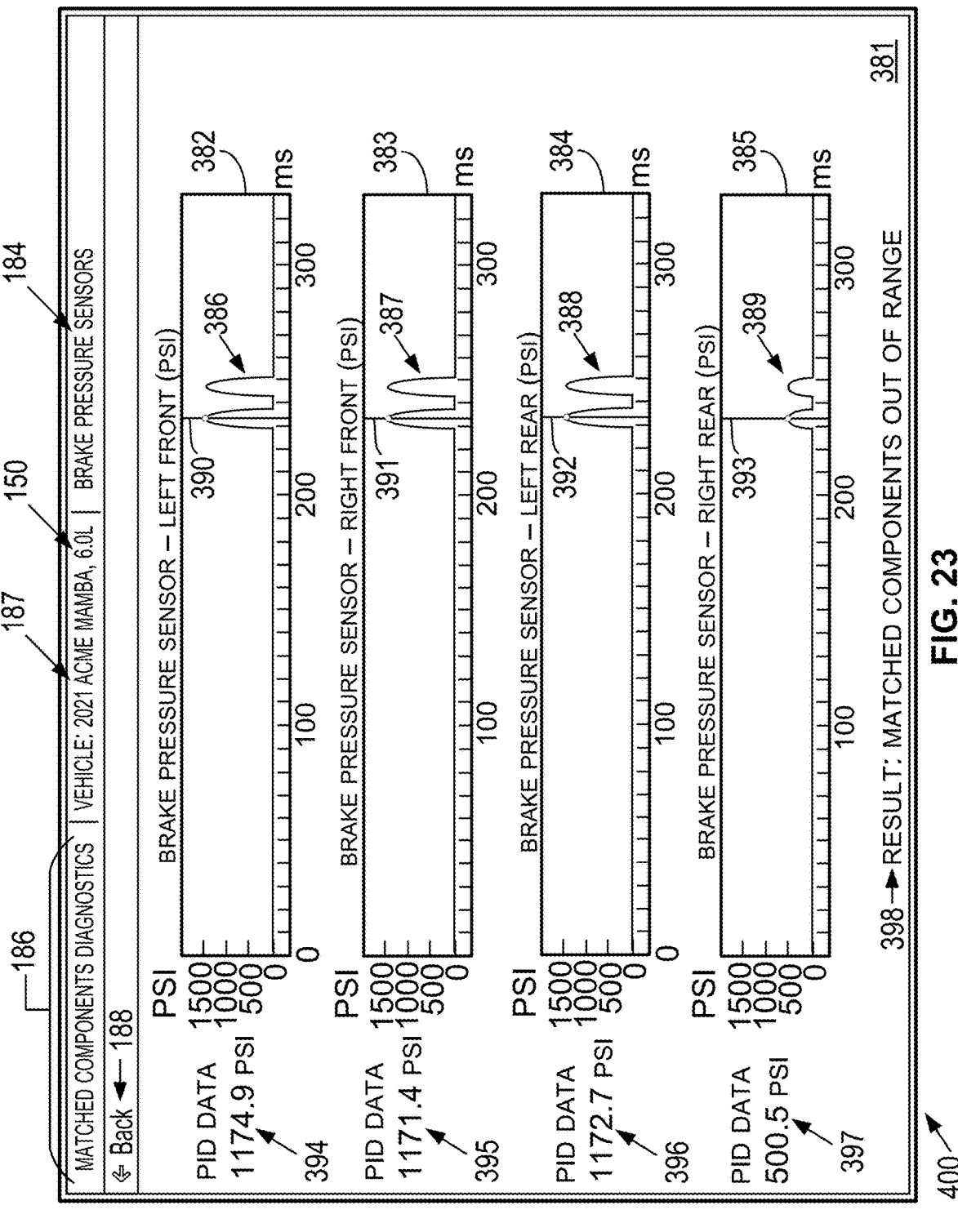

Next, FIG. 23 shows a screenshot 400. The screenshot 400 is an alternative view of the GUI 381 shown in the screenshot 380 in FIG. 22. The mode identifier 186, the vehicle identifier 187, and the component identifier 184 are identical in the screenshot 380 and the screenshot 400. Similar to the screenshot 380, the screenshot 400 shows that the GUI 381 includes the container 382, 383, 384, 385, the graph 386, 387, 388, 389, the cursor 390, 391, 392, 393, and the measurement 394, 395, 396, 397. The graph 386, 387, 388 in the screenshot 400 is identical to the graph 386, 387, 388 in the screenshot 380, respectively. The measurement 394, 395, 396 in the screenshot 400 is identical to the measurement 394, 395, 396 in the screenshot 380, respectively. The graph 389 in the screenshot 380 is different than the graph 389 in the screenshot 400. The measurement 397 in the screenshot 380 is different than the measurement 397 in the screenshot 400.

The notification 398 in the screenshot 400 is based on a determination the processor 800 makes by comparing a difference of the measurements shown in the graph 386, 387, 388, 389 (in the screenshot 400) to a measurement threshold. As shown in FIG. 23, the notification 398 indicates the matched components are out of range. In other words, a comparison of a difference in measurements breaches the measurement threshold.

Figure 24:
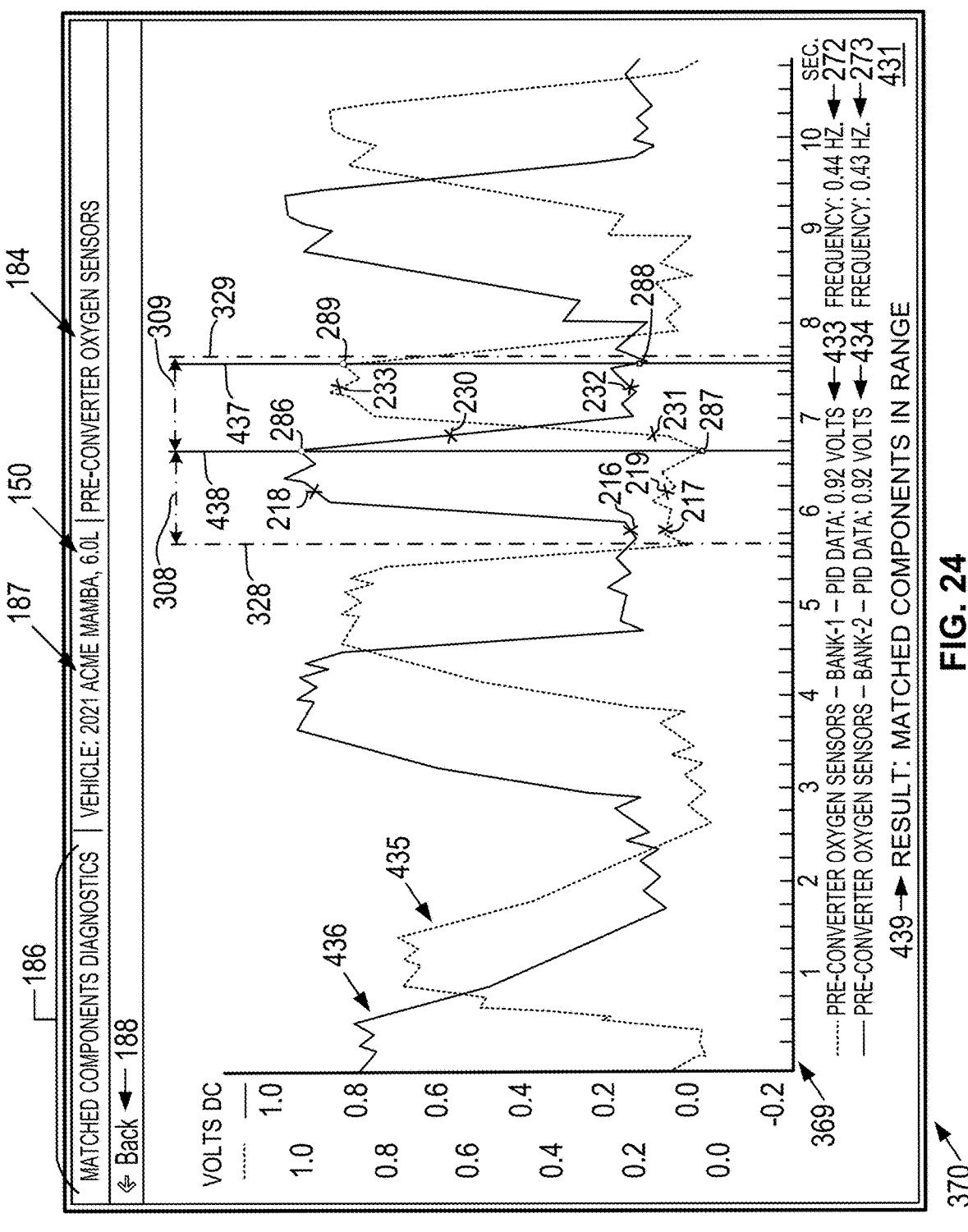

Next, FIG. 24 shows a screenshot 370 of a GUI 431. The mode identifier 186 in the GUI 431 indicates that the computing device 13 is operating in a matched components diagnostics mode. The GUI 431 includes a component identifier 184 that indicates matched pre-converter oxygen sensors have been selected. The GUI 431 includes a container 369 including a graph 435, 436 and a cursor 437, 438 respectively.

The graph 435 is a representation of measurements of a voltage output by a pre-converter oxygen sensor on a first bank of an ICE. Similarly, the graph 436 is a representation of measurements of a voltage output by a pre-converter oxygen sensor on a second bank of an ICE. As an example, the graph 435, 436 can represent measurements obtained while the ICE is operating at 2,500 RPM. The graph 435 and the graph 436 look similar in that the frequency of each graph changing from a low value to a peak value and back to a low value are substantially similar and the peak voltages are substantially similar. The graph 435 and the graph 436 are not, however, in sync temporally as the peak values for each cycle occur at times that differ by about one second.

The GUI 431 includes a measurement 433, 434 indicative of measurements within the graph 435, 436, respectively, where the cursor 437, 438, respectively, is positioned. The cursor 438 corresponds to a time of 6.65 seconds, and the cursor 437 corresponds to a time of 7:58 seconds. Accordingly, a time difference between the cursor 438 and the cursor 437 is 0.93 seconds.

For matching vehicle components that are known (at least occasionally) to operate out-of-sync, a time threshold used to determine whether to determine a difference between measurements corresponding to those matched vehicle components can be longer than for matching vehicle components are not configured to operate out-of-sync with one another. For purposes of this description, a "time threshold" can be referred to as a 'threshold amount of time," and vice versa. As an example, a time threshold for matching vehicle components that at least occasionally operate out-of-sync can be 1.0 seconds. As another example, for matching vehicle components that are not configured to operate out-of-sync, a time threshold to use for determining a difference between two measurements could be 100 milliseconds and/or a minimum interval time required between sending two consecutive VDM to request PID parameters representing measurements of the two vehicle components.

In at least some implementations, the measurement 433, 434 is a measurement determined using the multimeter 808 or the oscilloscope 810, and the graph 435, 436 is a representation of measurements determined using the multimeter 808 or the oscilloscope 810. In at least some other implementations, the measurement 433, 434 is based on a datum in a vehicle data message including a parameter identifier corresponding to a voltage output by a pre-converter oxygen sensor on a first bank of an ICE or a voltage output by a pre-converter oxygen sensor on a second bank of an ICE, respectively, and the graph 435, 436 is a representation of measurements based on datum in vehicle data messages including a parameter identifier corresponding to the voltage output by the pre-converter oxygen sensor on the first bank or the voltage output by the pre-converter oxygen sensor the second bank, respectively.

The GUI 431 also includes a notification 439 based on a determination the processor 800 makes by comparing a difference of the measurements shown in the graph 435, 436 to a measurement threshold. As shown in FIG. 24, the notification 439 indicates the matched components are in range. In other words, the comparisons of the difference in measurements does not exceed the measurement threshold.

FIG. 24 also shows a cursor 328, 329 and an arrow 308, 309. Those aspects are provided for describing one or more example implementations. In at least some implementations, one more of the cursor 328, the cursor 329, the arrow 308, or the arrow 309 is displayed as part of the GUI 431. In at least one or more other implementations, one more of the cursor 328, the cursor 329, the arrow 308, or the arrow 309 is not displayed as part of the GUI 431. The arrow 308 represents an amount of time equal to the time threshold that occurred before a time corresponding to the cursor 438. The cursor 328 corresponds to a time occurring the threshold amount of time prior to the time corresponding to the cursor 438. The arrow 309 represents an amount of time equal to the time threshold that occurred after the time corresponding to the cursor 438. The cursor 329 corresponds to a time occurring the threshold amount of time after the time corresponding to the cursor 438.

By way of example and with respect to the example implementations described in this description, the measurement 433 made at 6.65 seconds can be a first measurement made at a first time, and the measurement 434 made at 7:58 seconds can be a second measurement made at a second time as the second measurement was made within the threshold amount of time represented by the arrow 309. Even so, the second measurement could be any measurement along the graph 435 between the cursor 438 and the cursor 439 and still be a measurement made within the example threshold amount of time. Moreover, the second measurement could include multiple measurements represented by the graph between the cursor 328 and the cursor 438 or between the cursor 438 and the cursor 329. In at least some implementations, the second measurement can be a mean value of multiple measurements represented by the graph 435 during the threshold amount of time before or after the time corresponding to the cursor 438.

The GUI 431 shows a measurement icon 216, 217, 218, 219, 230, 231, 232, 233, 286, 287, 288, 289. Each of those measurement icons correspond to measurement represented on the graph 435 or the graph 436. Table B shows data regarding those measurements.

TABLE B

| Measurement Icon | Graph | Time (seconds) | Measurement (volts) |
|---|---|---|---|
| 216 | 436 | 5.77 | 0.15 |
| 217 | 435 | 5.77 | 0.14 |
| 218 | 436 | 6.17 | 0.90 |
| 219 | 435 | 6.17 | 0.16 |
| 230 | 436 | 6.85 | 0.57 |
| 231 | 435 | 6.85 | 0.18 |
| 232 | 436 | 7.37 | 0.15 |
| 233 | 435 | 7.37 | 0.94 |
| 286 | 436 | 6.65 | 0.92 |
| 287 | 435 | 6.65 | 0.03 |
| 288 | 436 | 7.58 | 0.10 |
| 289 | 435 | 7.58 | 0.92 |

Measurements represented by the graph 435 are made sequentially. As an example, a sequence of measurements represented by the graph 435 include a sequence of measurements including measurement at the measurement icon 217, the measurement icon 219, the measurement icon 287, the measurement icon 231, the measurement icon 233, and the measurement icon 289. Similarly, measurements represented by the graph 436 are made sequentially. As an example, a sequence of measurements represented by the graph 436 include a sequence of measurements including measurement at the measurement icon 216, the measurement icon 218, the measurement icon 286, the measurement icon 230, the measurement icon 232, and the measurement icon 288.

In at least some implementations, so long as the difference between the first measurement and one of the multiple second measurements (determined during the threshold amount of time before or after when the first measurement is made) is less than the first measurement threshold, then the matching vehicle components are determined to not include a vehicle component that is malfunctioning. In at least some other implementations, so long as the difference between the first measurement and one of the multiple second measurement(s) (determined during the threshold amount of time before or after when the first measurement is made) is greater than the first measurement threshold, then the matching vehicle components are determined to include at least one vehicle component that is malfunctioning.

As an example, the first measurement corresponds to the measurement icon 286 and the multiple second measurements correspond to the measurement icon 287, the measurement icon 231, the measurement icon 233, and the measurement icon 289. The absolute value of the respective difference between that first measurement and those multiple second measurements is 0.89 volts, 0.74 volts, 0.02 volts, and 0.00 volts. As another example, if the first measurement threshold is 1.0 volts, then the matching vehicle components are determined to not include a vehicle component that is malfunctioning. As yet another example, if the first measurement threshold is 0.5 volts, then the matching vehicle components are determined to include a vehicle component that is malfunctioning.

In at least some implementations, so long as the difference between the first measurement and two or more of the multiple second measurements (determined during the threshold amount of time before or after when the first measurement is made) is less than the first measurement threshold, then the matching vehicle components are determined to not include a vehicle component that is malfunctioning. In at least some other implementations, so long as the difference between the first measurement and two or more of the multiple second measurement(s) (determined during the threshold amount of time before or after when the first measurement is made) is greater than the first measurement threshold, then the matching vehicle components are determined to include at least one vehicle component that is malfunctioning. In at least some of the example implementations discussed in this paragraph, two or more of the multiple second measurements includes all of the multiple second measurements.

In at least some implementations, matching components are not operating in sync with one another. The GUI 431 shows an example of pre-converter oxygen sensors that are not operating in sync with one another. In at least some of those implementations, a processor can perform curve fitting to synchronize the graphs representing measurements corresponding to the matching components that are not operating in sync with one another. As an example, the curve fitting can include a linear least squares method as is known by those skilled in the art. Other example methods of curve fitting are also possible. Performing curve fitting for the graph 435 and the graph 436 can result in the graph 436 being slid leftward along the horizontal timeline in the container 369 by 0.93 seconds such that the cursor 437 and the cursor 438 are at the same positon in the container 369. After performing the curve fitting, a difference between the measurements corresponding to one or more of the follow pairs of measurement icons can be determined and compared to a measurement threshold: (i) the measurement icon 216 and the measurement icon 231, (ii) the measurement icon 218 and the measurement icon 232, or (iii) the measurement icon 286 and the measurement icon 289.

FIG. 24 also shows a measurement 272, 273 representative of a frequency of the measurement represented by the graph 435, 436, respectively. In at least some implementations, in addition to determining a difference between voltage measurements and comparing that difference to a first measurement threshold, a difference between measurements of frequencies of the same signals whose voltages are measured can be compared to a second measurement threshold (i.e., a frequency threshold). Accordingly, a determination whether at least one from among two matching vehicle components (e.g., the pre-converter oxygen sensors) can be based on comparing measurements of multiple different aspects (e.g., voltage and frequency) of signals output by the matching vehicle components to respective thresholds corresponding to those different aspects.

Figure 25:
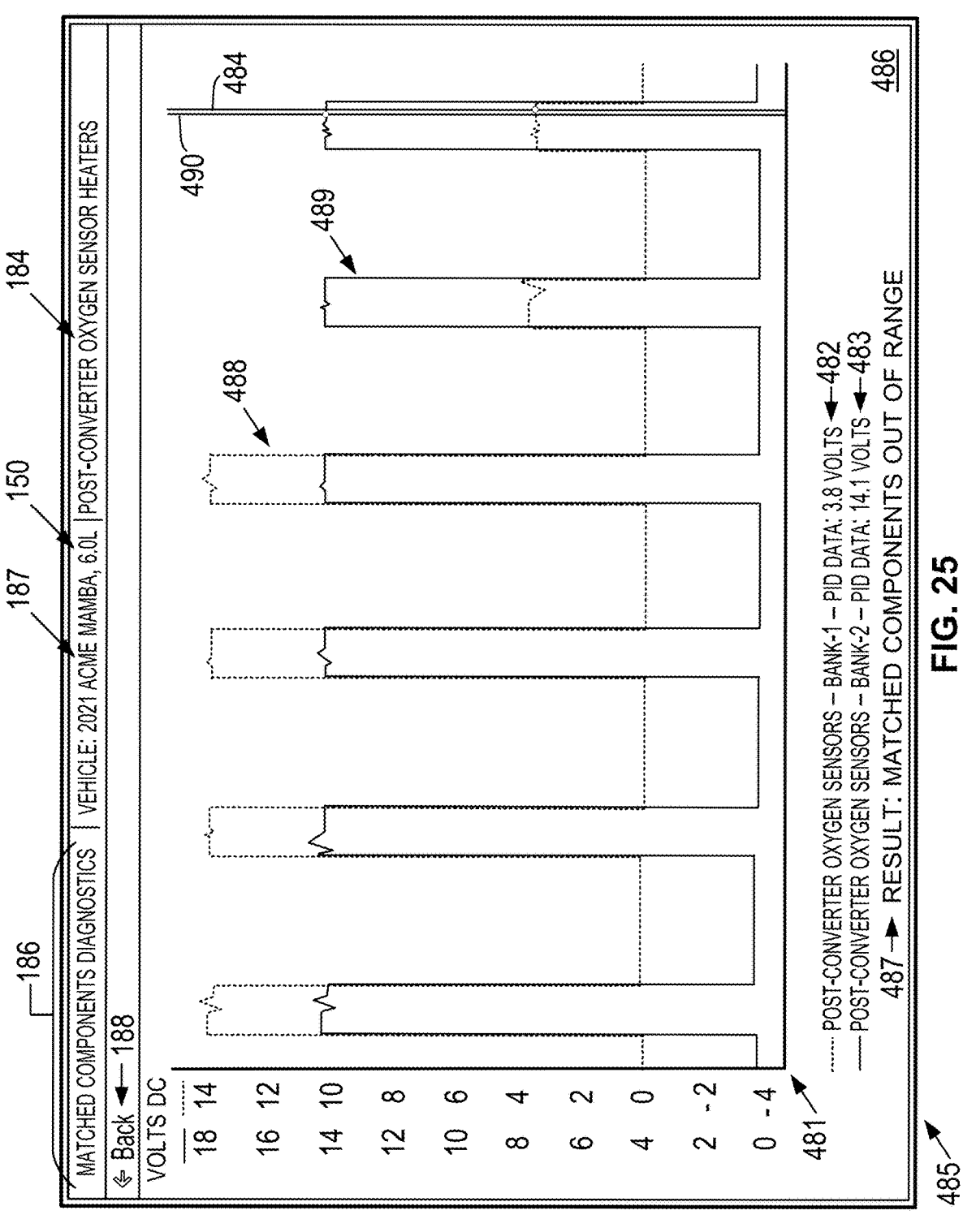

Next, FIG. 25 shows a screenshot 485 of a GUI 486. The mode identifier 186 in the GUI 486 indicates that the computing device 13 is operating in a matched components diagnostics mode. The GUI 486 includes a component identifier 184 that indicates matched post-converter oxygen sensor heaters have been selected. The GUI 486 includes a container 481 including a graph 488, 489 and a cursor 484, 490 respectively. The graph 488 is a representation of measurements of a voltage output by a post-converter oxygen sensor heater on a first bank of an ICE. Similarly, the graph 489 is a representation of measurements of a voltage output by a post-converter oxygen sensor heater on a second bank of an ICE. The GUI 486 includes a measurement 482, 483 indicative of measurements within the graph 488, 489, respectively, where the cursor 484, 490, respectively, is positioned.

In at least some implementations, the measurement 482, 483 is a measurement determined using the multimeter 808 or the oscilloscope 810, and the graph 488, 489 is a representation of measurements determined using the multimeter 808 or the oscilloscope 810. In at least some other implementations, the measurement 482, 483 is based on a datum in a vehicle data message including a parameter identifier corresponding to a voltage output by a post-converter oxygen sensor heater on a first bank of an ICE or a voltage output by a post-converter oxygen sensor heater on a second bank of an ICE, respectively, and the graph 488, 489 is a representation of measurements based on datum in vehicle data messages including a parameter identifier corresponding to the voltage output by the post-converter oxygen sensor heater on the first bank or the voltage output by the post-converter oxygen sensor heater the second bank, respectively.

The GUI 486 also includes a notification 487 based on a determination the processor 800 makes by comparing a difference of the measurements shown in the graph 488, 489 to a measurement threshold. As shown in FIG. 25, the notification 487 indicates the matched components are out of range. In other words, the comparisons of the difference in measurements exceeds the measurement threshold.

Figure 26:
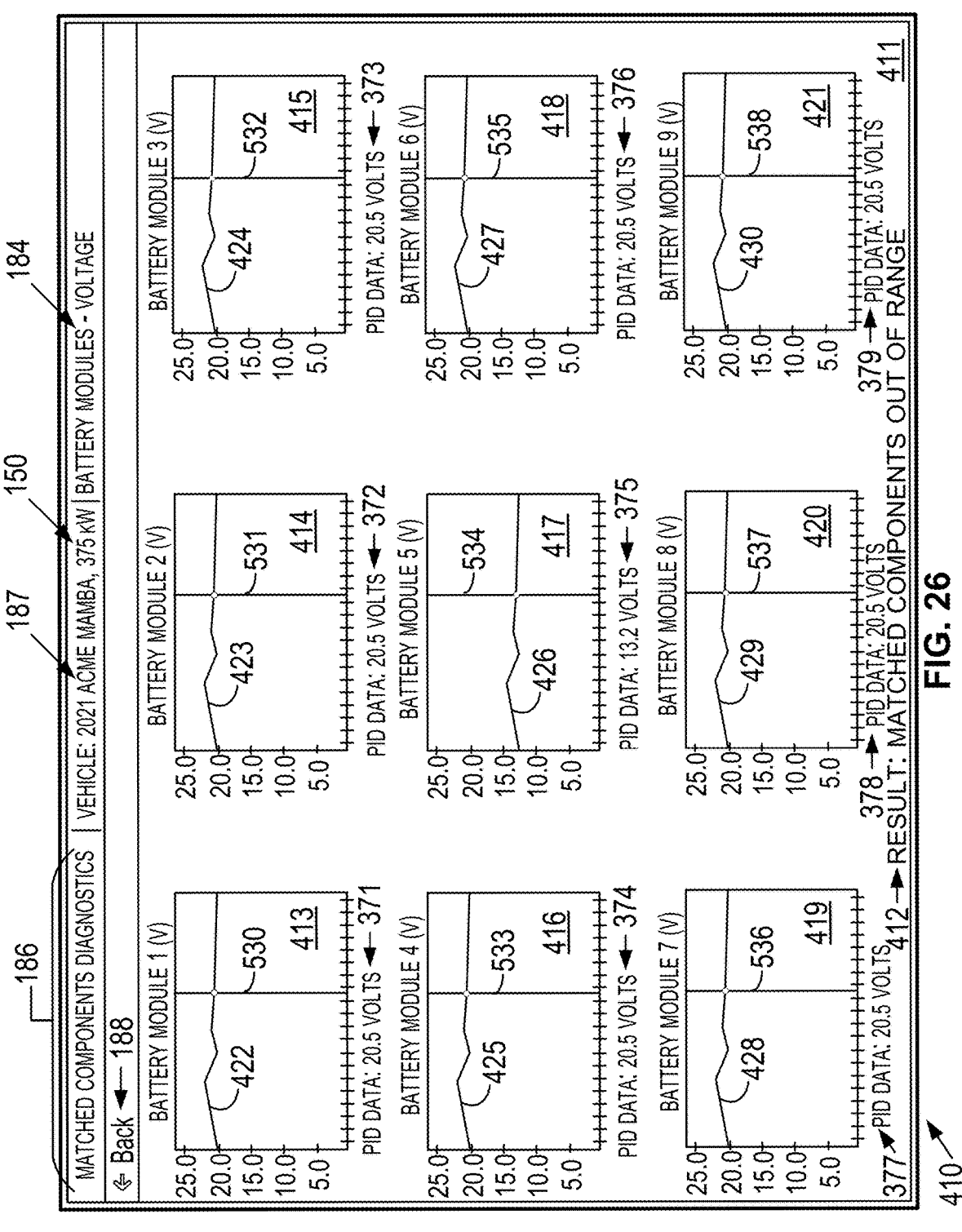
Figure 27:
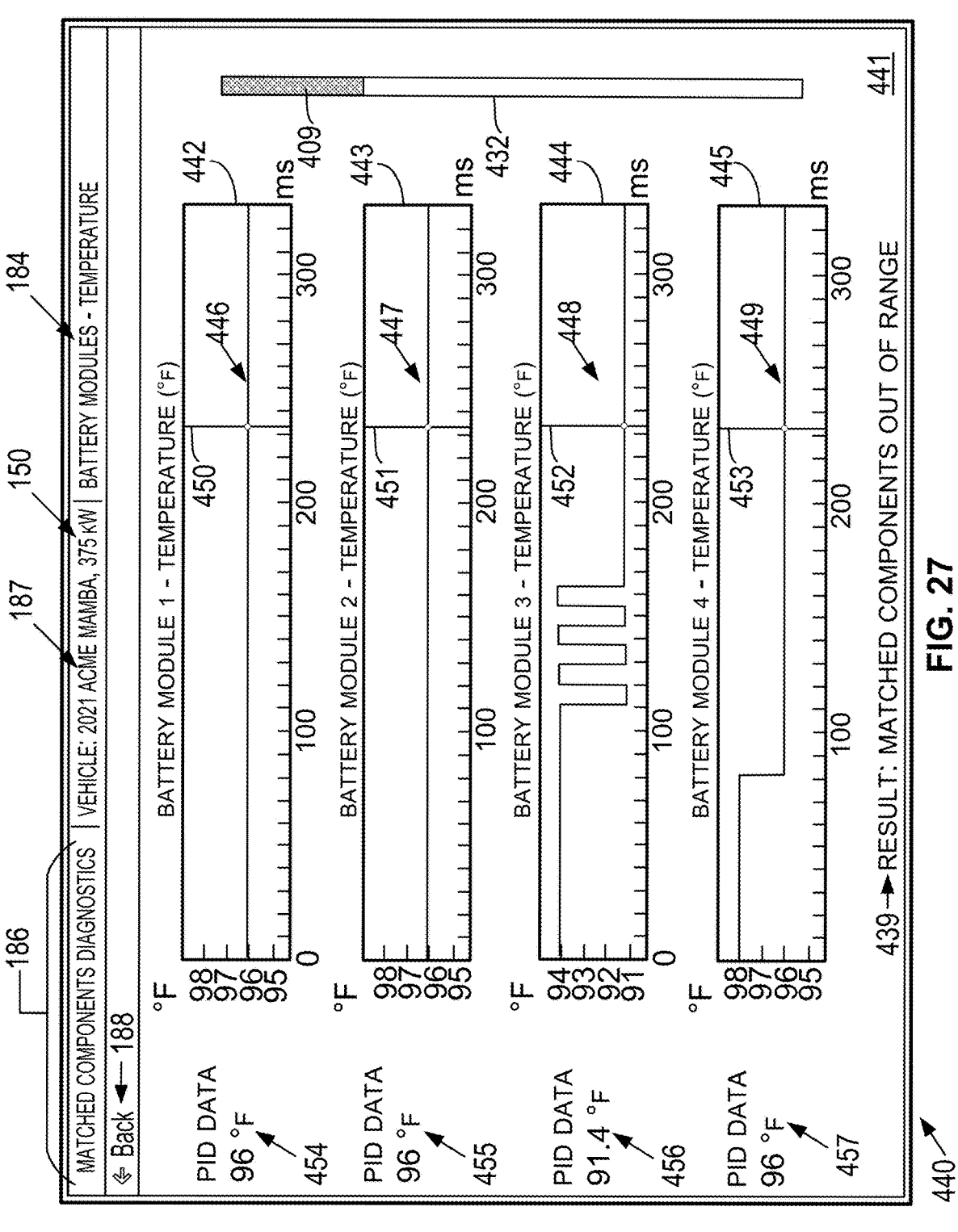
Figure 28:
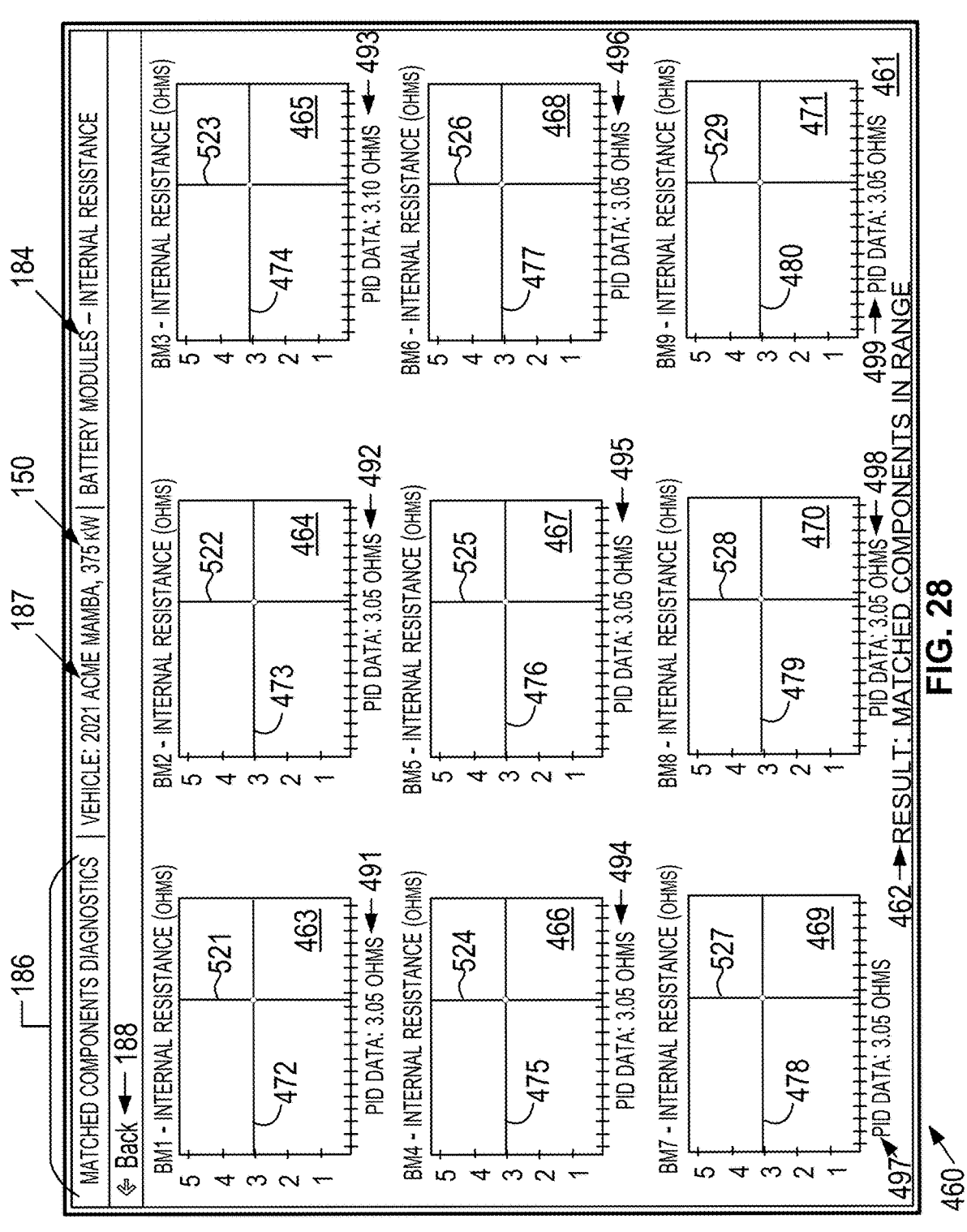

Before turning to FIG. 26, in FIG. 14 and FIG. 15, the powertrain identifier 150 is shown generic. In FIG. 16 to FIG. 25, however, the powertrain identifier 150 is shown specifically as "6.0 L," which represents a 6.0 L ICE. In contrast to those figures, the powertrain identifier 150 in FIG. 26 to FIG. 28 is "375 kW" to represent the set of electrical vehicle motor(s) rated at 375 kW. For purposes of describing FIG. 26 to FIG. 28, it will be assumed that the vehicle identifier 187 shown in those figures corresponds to the vehicle ID within the data 290 shown in FIG. 33 (i.e., vehicle ID VI6). The data 290 in FIG. 33 includes data regarding sets of matched components X, Y, Z. The sets of matched components X, Y, Z are associated with parameters for voltage, resistance, or temperature, respectively.

FIG. 26 shows a screenshot 410 of a GUI 411. The mode identifier 186 in the GUI 411 indicates that the computing device 13 is operating in a matched components diagnostics mode. The GUI 411 includes a component identifier 184 that indicates matched battery modules have been selected. The GUI 411 includes a container 413, 414, 415, 416, 417, 418, 419, 420, 421 including a graph 422, 423, 424, 425, 426, 427, 428, 429, 430, respectively, and a cursor 530, 531, 532, 533, 534, 535, 536, 537, 538, respectively. The graph 422, 423, 424, 425, 426, 427, 428, 429, 430 is a representation of measurements of a voltage of an individual battery module within the battery modules 67 in the vehicle 60. The GUI 411 includes a measurement 371, 372, 373, 374, 375, 376, 377, 378, 379 indicative of measurements within the graph 422, 423, 424, 425, 426, 427, 428, 429, 430, respectively, where the cursor 530, 531, 532, 533, 534, 535, 536, 537, 538, respectively, is positioned.

In at least some implementations, the measurement 371, 372, 373, 374, 375, 376, 377, 378, 379 is a measurement determined using the multimeter 808 or the oscilloscope 810, and the graph 422, 423, 424, 425, 426, 427, 428, 429, 430 is a representation of measurements determined using the multimeter 808 or the oscilloscope 810. In at least some other implementations, the measurement 371, 372, 373, 374, 375, 376, 377, 378, 379 is based on a datum in a vehicle data message including a parameter identifier corresponding to the BM1, BM2, BM3, BM4, BM5, BM6, BM7, BM8, BM9, respectively, and the graph 422, 423, 424, 425, 426, 427, 428, 429, 430 is a representation of measurements based on datum in vehicle data messages including a parameter identifier corresponding to the BM1, BM2, BM3, BM4, BM5, BM6, BM7, BM8, BM9, respectively.

The GUI 411 also includes a notification 412 based on a determination the processor 800 makes by comparing a difference of the measurements shown in the graph 422, 423, 424, 425, 426, 427, 428, 429, 430 to a measurement threshold. As shown in FIG. 26, the notification 412 indicates the matched components are out of range. In other words, a comparison of a difference in measurements exceeds the measurement threshold (e.g., the 2.0 Volts DC threshold shown in FIG. 33 for matched components X). For example, the difference between the voltage measurement of BM5 of 13.2 volts shown at the cursor 534 and the voltage measurement of BM1, BM2, BM3, BM4, BM6, BM7, BM8, or BM9 of 20.5 volts shown at the 530, 531, 532, 533, 535, 536, 537, 538, respectively exceeds the measurement threshold.

Next, FIG. 27 shows a screenshot 440 of a GUI 441. The mode identifier 186 in the GUI 441 indicates that the computing device 13 is operating in a matched components diagnostics mode. The GUI 441 includes a component identifier 184 that indicates matched battery modules have been selected. The GUI 441 includes a container 442, 443, 444, 445 including a graph 446, 447, 448, 449 respectively and a cursor 450, 451, 452, 453 respectively. The graph 446 is a representation of measurements of a temperature corresponding to a first battery module (e.g., BM1) in degrees Fahrenheit (i.e., ° F.). Similarly, the graph 447 is a representation of measurements of a temperature corresponding to a second battery module (e.g., BM2). Likewise, the graph 448 is a representation of measurements of a temperature corresponding to a third battery module (e.g., BM3), and the graph 449 is a representation of measurements of a temperature corresponding to a fourth battery module (e.g., BM4). As an example, a temperature corresponding to a battery module can include a temperature based on a signal output by a temperature sensor disposed amongst battery cells in a battery module. The GUI 441 includes a measurement 454, 455, 456, 457 indicative of measurements within the graph 446, 447, 448, 449, respectively, where the cursor 450, 451, 452, 453, respectively, is positioned.

The GUI 441 includes a scroll bar 432 having a scroll selector 409. The scroll selector 409 can be moved (e.g., downward) within the scroll bar 432 to a cause a different portion of the GUI 441 to be displayed. As an example, the different portion of the GUI 441 can include container(s) including a graph and cursor to represent measurements of a temperature corresponding to additional battery module(s) (such as the BM5, BM6, BM7, BM8 or BM9 indicated in FIG. 33).

In at least some implementations, the measurement 454, 455, 456, 457 is a measurement determined using the multimeter 808 or the oscilloscope 810, and the graph 446, 447, 448, 449 is a representation of measurements determined using the multimeter 808 or the oscilloscope 810. In those implementations, a test lead with a temperature probe can be connected to the multimeter 808 or the oscilloscope 810. In at least some other implementations, the measurement 454, 455, 456, 457 is based on a datum in a vehicle data message including a parameter identifier corresponding to the BM1, BM2, BM3, BM4, respectively, and the graph 446, 447, 448, 449 is a representation of measurements based on datum in vehicle data messages including a parameter identifier corresponding to the BM1, BM2, BM3, BM4, respectively.

The GUI 441 also includes a notification 439 based on a determination the processor 800 makes by comparing a difference of the measurements shown in the graph 446, 447, 448, 449 to a measurement threshold (e.g., 4° F., as shown in FIG. 33). As shown in FIG. 27, the notification 439 indicates the matched components are out of range. In other words, a comparison of a difference in measurements exceeds the measurement threshold. For example, if the measurement threshold for the temperatures corresponding to BM1 and BM3 is 4° F., then the difference between the measurement of 96° F. in the graph 446 exceeds the measurements of 91.4° F. in the graph 448 by the measurement threshold.

Next, FIG. 28 shows a screenshot 460 of a GUI 461. The mode identifier 186 in the GUI 461 indicates that the computing device 13 is operating in a matched components diagnostics mode. The GUI 461 includes a component identifier 184 that indicates matched battery modules have been selected. The GUI 461 includes a container 463, 464, 465, 466, 467, 468, 469, 470, 471 including a graph 472, 473, 474, 475, 476, 477, 478, 479, 480, respectively, and a cursor 521, 522, 523, 524, 525, 526, 527, 528, 529, respectively. The graph 472, 473, 474, 475, 476, 477, 478, 479, 480 is a representation of measurements of an internal resistance of an individual battery module within the battery modules 67 in the vehicle 60. The GUI 461 includes a measurement 491, 492, 493, 494, 495, 496, 497, 498, 499 indicative of measurements within the graph 472, 473, 474, 475, 476, 477, 478, 479, 480, respectively, where the cursor 521, 522, 523, 524, 525, 526, 527, 528, 529, respectively, is positioned.

In at least some implementations, the measurement 491, 492, 493, 494, 495, 496, 497, 498, 499 is a measurement determined using the multimeter 808 or the oscilloscope 810, and the graph 472, 473, 474, 475, 476, 477, 478, 479, 480 is a representation of measurements determined using the multimeter 808 or the oscilloscope 810. In at least some other implementations, the measurement 491, 492, 493, 494, 495, 496, 497, 498, 499 is based on a datum in a vehicle data message including a parameter identifier corresponding to the BM1, BM2, BM3, BM4, BM5, BM6, BM7, BM8, BM9, respectively, and the graph 472, 473, 474, 475, 476, 477, 478, 479, 480 is a representation of measurements based on datum in vehicle data messages including a parameter identifier corresponding to the BM1, BM2, BM3, BM4, BM5, BM6, BM7, BM8, BM9, respectively.

The GUI 461 also includes a notification 462 based on a determination the processor 800 makes by comparing a difference of the measurements shown in the graph 472, 473, 474, 475, 476, 477, 478, 479, 480 to a measurement threshold (e.g., the 0.5 ohms threshold shown in FIG. 33 for matched components Y). As shown in FIG. 28, the notification 462 indicates the matched components are in range. In other words, a comparison of a difference in measurements does not exceed the measurement threshold.

V. Example System Aspects

Next, FIG. 29 is a block diagram showing components of the computing device 13 in accordance with one or more example implementations. As shown in FIG. 29, the computing device 13 can include a processor 800, a vehicle communication transceiver 802, a display 804, a communication network transceiver 806, a multimeter 808, an oscilloscope 810, a user interface 812, a power supply 814, a memory 816, a housing 818, a communication link 820, and/or electrical power circuitry 822.

Two or more of the processor 800, the vehicle communication transceiver 802, the display 804, the communication network transceiver 806, the multimeter 808, the oscilloscope 810, the user interface 812, or the memory 816 can be operatively coupled to each other using the communication link 820. That operative coupling can allow for the operatively coupled devices to communicate with one another.

The electrical power circuitry 822 can electrically couple the power supply 814 to one or more of the processor 800, the vehicle communication transceiver 802, the display 804, the communication network transceiver 806, the multimeter 808, the oscilloscope 810, the user interface 812, or the memory 816 for providing electrical power to one or more of the processor 800, the vehicle communication transceiver 802, the display 804, the communication network transceiver 806, the multimeter 808, the oscilloscope 810, the user interface 812, or the memory 816.

1. Processor

A processor, such as the processor 800, can include one or more processors. A processor can thus be referred to as "at least one processor" and/or "one or more processors." Furthermore, a processor can include a general purpose processor (e.g., an INTEL® single core microprocessor or an INTEL® multicore microprocessor), and/or a special purpose processor (e.g., a digital signal processor, a graphics processor, an embedded processor, or an application specific integrated circuit (ASIC) processor). Furthermore still, a processor can include and/or be operatively connected to a memory controller that controls a flow of data going to and from a memory, such as the memory 816.

A processor can be operable to execute computer-readable program instructions (CRPI). The CRPI can, for example, include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a procedural programming language, such as the "C" programming language. A processor can be operable to execute hard-coded functionality in addition to or as an alternative to software-coded functionality (e.g., via CRPI).

A processor can include multiple registers for storing computer-readable data, such as a memory address within the memory 816. The processor can include a register for storing data that the processor will write into the memory 816 as well as a register for storing data the processor reads from an address within the memory 816.

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the embedded processor can include (a) an advanced RISC (reduced instruction set computer) machine (ARM) processor (e.g., an AT91SAM4E ARM processor provided by the Atmel Corporation, San Jose, California), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing. The processor 800 can include and/or be connected to one or more analog-to-digital converters. At least some of those analog-to-digital converters can be included within or attached to the multimeter 808 and/or the oscilloscope 810.

2. Memory

A memory, such as the memory 816, can include one or more memories. A memory can thus be referred to as "at least one memory" and/or "one or more memories." A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a tangible, volatile or non-volatile, storage component, such as an optical, magnetic, organic or other memory or disc storage component. Additionally or alternatively, a non-transitory memory can include or be operable as a random-access memory (RAM), a read-only memory (ROM), a programmable read-only memory (PROM), an erasable programmable read-only memory (EPROM), a flash memory, an electrically erasable programmable read-only memory (EEPROM), or a compact disk read-only memory (CD-ROM). The RAM can include static RAM or dynamic RAM. A non-transitory memory can be operable as a removable storage device, a non-removable storage device, or a combination thereof. A removable storage and/or a non-removable storage device can include a magnetic disk device such as a flexible disk drive or a hard-disk drive (HDD), an optical disk drive such as a compact disc (CD) drive and/or a digital versatile disk (DVD) drive, a solid state drive (SSD), or a tape drive.

A transitory memory can include, for example, CRPI provided over a communication link, such as the communication network 17 shown in FIG. 2.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable mediums." Any of those alternative terms can be preceded by the prefix "transitory" if the memory is transitory or "non-transitory" if the memory is non-transitory. For a memory including multiple memories, two or more of the multiple memories can be the same type of memory or different types of memories.

3. Transceiver

A transceiver, such as the vehicle communication transceiver 802 and/or the communication network transceiver 806, can include one or more transceivers. For example, the vehicle communication transceiver 802 can include one or more vehicle communication transceivers, each configured to communicate using one or more different vehicle data message (VDM) protocols. As another example, the communication network transceiver 806 can include a wireless transceiver and a wired transceiver.

Each transceiver includes one or more transmitters operable to transmit data onto a communication network and/or onto a communication bus within the device or system including the transceiver. Each transceiver includes one or more receivers operable to receive data or a communication carried over a communication network and/or over a communication bus within the device or system including the transceiver. Unless stated differently, any data described as being transmitted to a device or system is considered to be received by that device or system. Similarly, unless stated differently, any data described as being received from a device or system is considered to be transmitted by that device or system directly or indirectly to the receiving device or system. In some implementations, a transceiver can include a transmitter and a receiver in a single semiconductor chip. In at least some of those implementations, the semiconductor chip can include a processor.

For purposes of this description, a communication network can be operable as one or more from among a vehicle network, a non-vehicle network, or a multi-purpose network. In at least some implementations, a vehicle network is on-board the vehicle 11 and has an OBDC and one or more electronic controls units interconnected to the OBDC and/or to each other. The non-vehicle network is off-board of the vehicle 11 and includes one or more network nodes outside of the vehicle 11. The multi-purpose network is contained at least partly within the vehicle 11 and at least partly off-board the vehicle 11. The multi-purpose network can include a vehicle network and a non-vehicle network. The non-vehicle network can include the communication network 17.

In at least some of the example implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver." "RF" represents "radio frequency."

A radio signal transmitted or received by a radio transceiver can be arranged in accordance with one or more wireless communication standards or protocols such as an Institute of Electrical and Electronics Engineers (IEEE®) standard, such as (i) an IEEE® 802.11 standard for wireless local area networks (wireless LAN) (which is sometimes referred to as a WI-FI® standard) (e.g., 802.11a, 802.11b, 802.11g, 802.11n, 802.11ax, 802.11ay, 802.11ba, or 802.11be), (ii) an IEEE® 802.15 standard (e.g., 802.15.1, 802.15,3, 802.15.4 (ZIGBEE®), or 802.15.5) for wireless personal area networks (PANs), (iii) a BLUETOOTH® version 5.1, 5.2, or 5.3 standard developed by the Bluetooth Special Interest Group (SIG) of Kirkland, Washington, (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3:2010 standard for Near Field Communication (NFC) (i.e., an NFC standard), (xvi) the Sigfox communication standard, (xvii) the Neul communication standard, (xviii) the LoRaWAN communication standard, or (xix) a 5G new radio (5G NR) communication standard by the $3^{rd}$ Generation Partnership Project (3GPP) standards organization, such as the 5G NR, phase one or 5G NR, phase two communication standard. Other examples of the wireless communication standards or protocols are possible. The example standards can be referred to as protocols. Likewise the example protocols can be referred to as standards.

In at least some of the implementations, a transmitter, such as a transmitter within any transceiver described in this description, can be operable to transmit a signal (e.g., one or more signals or one or more electrical waves) carrying or representing data onto an electrical circuit (e.g., one or more electrical circuits). Similarly, a receiver, such as a receiver within any transceiver described in this description, can be operable to receive via an electrical circuit a signal carrying or representing data over the electrical circuit. The electrical circuit can be part of a non-vehicle network, a vehicle network, or a multi-purpose network. The signal carried over an electrical circuit can be arranged in accordance with a wired communication standard such as a Transmission Control Protocol/Internet Protocol (TCP/IP), an IEEE® 802.3 Ethernet communication standard for a LAN, a data over cable service interface specification (DOCSIS standard), such as DOCSIS 3.1, a universal serial bus (USB) specification (e.g., a USB 2.0, USB 3.x, or USB 4 specification), a vehicle data message (VDM) protocol, or some other wired communication standard or protocol. Examples of a VDM protocol are listed in Section VI of this description. An electrical circuit can include a wire, a printed circuit on a circuit board, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor". Transmission of data over the conductor can occur electrically and/or optically.

The vehicle communication transceiver 802 includes one or more vehicle communication transceivers configured for transmitting and receiving vehicle data messages. In at least some implementations, a vehicle communication transceiver (VCT) meets the physical lay requirements of a VDM protocol. As an example, for a CAN FD VDM protocol discussed in this description, a VCT can include the TCAN1162X-Q1 Automotive CAN FD system basis chip with sleep mode and LDO (low dropout) output VCT available from Texas Instruments of Dallas, Texas. As another example, for an SAE® J1850 VDM protocol discussed in this description, a VCT can include the 33390 Class B serial transceiver VCT available from NXP Semiconductors N.V., of Eindhoven, Netherlands. Other examples of a VCT for those two VDM protocols or for a different VDM protocol are also possible.

The data transmitted by the vehicle communication transceiver 802 can include a destination identifier or address of an ECU to which the data is to be transmitted. The data or communication transmitted by the vehicle communication transceiver 802 can include a source identifier or address of a dongle. The source identifier or address can be used to send a response to the dongle.

The communication network transceiver 806 can include a wireless transceiver. In at least some implementations, the wireless transceiver is configured to transmit communications to the communication network 17. As an example, those communications can be directed to the server 15. As another example, those communications can occur using a BLUETOOTH® 5.1, 5.2, or 5.3 standard or some other wireless communication standard. In at least some implementations, the wireless transceiver is configured to transmit communications to the communication network 17 and to receive communications from the communication network 17. As an example, those wireless communications may occur using a WI-FI® standard or some other wireless communication standard.

In at least some implementations, the communication network transceiver 806 includes a wired transceiver. In at least some implementations, that wired transceiver is configured to transmit communications to the communication network 17 and to receive communications from the communication network 17. As an example, those communications may occur using an IEEE® 802.3 Ethernet communication standard for a LAN or some other wired communication standard.

In at least some implementations, the communication network transceiver 806 includes a modem, a network interface card, a local area network (LAN) on motherboard (LOM), and/or a chip mountable on a circuit board. As an example, the chip can include a CC3100 Wi-Fi® network processor available from Texas Instruments, Dallas, Texas, a CC256MODx Bluetooth® Host Controller Interface (HCI) module available from Texas instruments, or a different chip for communicating via Wi-Fi®, Bluetooth® or another communication protocol.

A network node that is within and/or coupled to a non-vehicle network and/or that communicates via a non-vehicle network or a multi-purpose network using a packet-switched technology can be locally configured for a next 'hop' in the network (e.g., a device or address where to send data to, and where to expect data from). As an example, a device (e.g., a transceiver) operable for communicating using an IEEE® 802.11 standard can be configured with a network name, a network security type, and a password. Some devices auto-negotiate this information through a discovery mechanism (e.g., a cellular phone technology).

The communication network transceiver 806 can be arranged to transmit a request and/or receive a response using a transfer protocol, such a hypertext transfer protocol (i.e., HTTP), an HTTP over a secure socket link (SSL) or transport layer security (TLS) (i.e., HTTPS), a file transfer protocol (i.e., FTP), or a simple mail transfer protocol (SMTP). The communication network transceiver 806 can be arranged to transmit an SMS message using a short message peer-to-peer protocol or using some other protocol.

4. Power Components

A power supply, such as the power supply 814, can be arranged in any of a variety of configurations. As an example, a power supply can include circuitry and/or a connector to receive an alternating current (AC) current from an AC electrical supply (e.g., electrical circuits operatively connected to an electrical wall outlet) and be operable to convert the AC current to a direct current (DC) for supplying to one or more of the components connected to the power supply. As another example, a power supply can include circuitry and/or a connector to receive a DC from a DC electrical supply (e.g., a Universal Serial Bus (USB) connector and circuitry corresponding to a standard pinout for the USB connector). As an example, the USB connector can be a USB-C connector.

As yet another example, a power supply can include a battery and/or be battery operated. The battery can include a rechargeable battery. In at least some implementations, the rechargeable battery includes a nickel-metal hydride (NiMH) battery, a lithium-ion (Li-ion) battery, or a lithium-ion polymer (LiPo) battery. As yet another example, a power supply can include a solar cell and/or be solar operated.

Additionally, a power supply can include and/or connect to a power distribution circuit to distribute electrical current throughout the device or system including that power supply. As an example, the power distribution circuit includes electrical power circuitry 822 that connects the power supply 814 to one or more from among the processor 800, the vehicle communication transceiver 802, the display 804, the communication network transceiver 806, the multimeter 808, the oscilloscope 810, the user interface 812, and/or the memory 816.

5. Additional Components

The display 804 can include one or more displays. As an example, each display includes a capacitive touch screen display, a resistive touch screen display, a plasma display, a light emitting diode (LED) display, a cathode ray tube display, an organic light-emitting diode (OLED) display (such as an active-matrix OLED or a passive-matrix OLED), a liquid crystal display (LCD) (such as include a backlit, color LCD), a touch screen display with the LCD, a capacitive touch screen display, or a resistive touch screen display. The display 804 can include a different type of display as well or instead. The display 804 is configured to display one or more of the following: a GUI, a measurement of the multimeter, a measurement of the oscilloscope, or content of a vehicle data message that the vehicle communication transceiver 802 receives from the vehicle 11, 30.

The user interface 812 can include an input device. The input device is operable to generate signals representative of user inputs from a user of the computing device 13. In at least some implementations, the input device includes a keyboard or keypad including one or more keys configured to be pressed or otherwise manipulated by the user. In those or in other implementations, the input device includes a touchpad or trackpad of a laptop computer housing. In those or in still other implementations, the input device can include a computer mouse. In those or in still other implementations, the input device includes a microphone configured for receiving sound waves, such as sound waves produced by the user speaking words in a vocabulary of the computing device 13. The display 804 configured as a touch screen display can also receive user inputs from a user of the computing device 13. Accordingly, the input device of the user interface 812 can include the display 804 when configured as a touch screen display. The processor 800 determines the user inputs based on the signals generated by the input device. At least some of the user inputs are representative of a user-selectable control (USC) being selected from a GUI displayed on the display 804.

The user interface 812 can include an output device. The output device is operable to present content to a user of the computing device 13. As an example, the output device can present content visually, audibly, and/or haptically. To present content visually, the output device can include and/or operatively communicate with the display 804 to visually present content, such as the navigable menu or a GUI. To present content audibly, the output device can include an audio speaker and electrical circuitry to convert digital data representative of the content into an audio signal for driving the audio speaker. To present content haptically, the output device can include an eccentric rotating mass vibration motor and/or a linear resonant actuator to output the content haptically. As an example, the content presented haptically can include content that indicates a PID threshold has been breached.

The user interface 812 can include an auxiliary measurement device. In at least some implementations, the auxiliary measurement device includes a digital thermal imager. The digital thermal imager can transmit thermal measurements to the communication network transceiver 806 for subsequent storage in the measurements 826. The digital thermal imager can measure temperatures of vehicle components such as heated seats, cooled seals, exhaust manifolds, wheel bearings, ventilation grills, fuel lines, among others.

The multimeter 808 can include a digital multimeter to make electrical measurements such as DC voltage, AC voltage, resistance, and/or amperage. In at least some implementations, the measurement made by the multimeter 808 are displayed on the display 804. In at least some other implementations, the multimeter 808 includes a display separate from the display 804 for displaying the measurement made by the multimeter 808. In at least some implementations, the measurements made by the multimeter 808 can be displayed using a digital numerical format. In those and/or in other implementations, the measurements made by the multimeter 808 are plotted as a visual graphing line on a display.

The multimeter 808 includes multiple inputs to which test leads can be connected. In at least some implementations, the inputs of the multimeter 808 include a common input, an average input, and a voltage input. As an example, one end of a test lead can connect to an input of the multimeter 808 and another end of the test lead can include an alligator clip, hook clip, or probe. As another example, the test leads can include a transducer, such as a pressure or vacuum transducer. As yet another example, the test leads can include a temperature probe.

In at least some implementations, the multimeter 808 is and/or includes a vibration meter. In these implementations, the test lead can include a vibration sensor. In at least some of those implementations, the vibration sensor includes a magnetic mount for mounting the vibration sensor to a component of the vehicle 11. As an example, the vehicle component can include a suspension component such as wheel bearing housing or a control arm.

The multimeter 808 include multiple outputs, such as an output for each channel of the multimeter 808. In at least some implementations, each output of the multimeter 808 includes or is attached to an analog-to-digital converter. A digital signal representative of a measurement made by the multimeter 808 can be provided to the processor 800.

The oscilloscope 810 includes a test instrument configured for displaying signal voltages as on a two-dimensional plot as a function of time. The oscilloscope 810 includes multiple inputs. Each of the oscilloscope inputs includes and/or is removably connectable to a test lead. In at least some implementations, the signal voltages can be displayed on the display 804. In at least some other implementations, the oscilloscope 810 includes a display separate from the display 804 for displaying the signal voltages.

The oscilloscope 810 includes multiple inputs to which oscilloscope leads can be connected. The oscilloscope 810 include multiple outputs, such as an output for each channel of the oscilloscope 810. In at least some implementations, each output of the oscilloscope 810 includes or is attached to an analog-to-digital converter. A digital signal representative of a measurement made by the oscilloscope 810 can be provided to the processor 800.

The housing 818 surrounds at least a portion of one or more of the following: the processor 800, the vehicle communication transceiver 802, the display 804, the communication network transceiver 806, the multimeter 808, the oscilloscope 810, the user interface 812, the power supply 814, and/or the memory 816. The housing 818 can support a substrate. In at least some example implementations, at least a portion one or more of the following is mounted on and/or connected to the substrate: the processor 800, the vehicle communication transceiver 802, the display 804, the communication network transceiver 806, the multimeter 808, the oscilloscope 810, the user interface 812, the power supply 814, and/or the memory 816. The housing 818 can be made from various materials. For example, the housing 818 can be made from a plastic material (e.g., acrylonitrile butadiene styrene (ABS)). Other examples of a material that forms the housing 818 are also possible.

The vehicle communication transceiver 802 can include and/or be operatively coupled to a vehicle connector that includes a connector removably connectable to the vehicle 11. In particular, the vehicle connector is removably connectable to an OBDC within the vehicle 11. In at least some implementations, the vehicle connector and the OBDC in the vehicle 11 have complementary shapes that allow one of the vehicle connector or the OBDC in the vehicle to be inserted into the other. The vehicle connector may be arranged according to standard, such as (i) the Society of Automotive Engineers (SAE) J1962_199802 diagnostic standard dated Feb. 1, 1998 or an equivalent standard, (ii) a SAE J1939/13_201610 off-board diagnostic connector standard dated Oct. 25, 2016 or equivalent standard, or (iii) a 6-pin or 9-pin Deutsch truck connector for connecting to a compatible Deutsch truck connector with a similar number of pins, at least some of which are for carrying communications according to the SAE J1708 standard. In many cases, the vehicle connector includes multiple electrical connector terminals that mate to electrical connector terminals in an on-board diagnostic connector within the vehicle 11. Additional details regarding an OBDC are described in Section VI of this description.

6. Memory Content

The computing device 13 can determine, generate, store, transmit, receive, and/or otherwise use a variety of computer-readable data. At least some of the computer-readable data can be stored in the memory 816. The computer-readable data can include software and/or firmware. The software and/or firmware can include computer-readable program instructions (CRPI). The CRPI are executable by the processor 800. As an example, those CRPI can include program instructions that are executable to cause the computing device 13 to perform any function described as being performed by the computing device 13, the processor 800, some other component of the computing device 13.

The computer-readable data within the memory 816 can include data received from the vehicle 11, the measurement interface 12, the server 15, and/or the communication network 17. As an example, the data from the vehicle 11 can include a vehicle data message or the content of a vehicle data message. In particular, the vehicle data message or the content thereof can include an identifier of an ECU that transmitted the message, a parameter identifier (PID) and a corresponding PID parameter value. The PID can indicate what the PID parameter value represents, such as a diagnostic trouble code, a sensor value, a vehicle identification number, a status value, a calculated value, a timer value, a ratio, a count, a position, a fuel type, a commanded value, a calibration identifier, an ECU name, among others.

As an example, the memory 816 contains one or more from among: CRPI 824, measurements 826, delta thresholds 828, a GUI 830, connector descriptions 832, and matched components 834. The matched components 834 can include data that indicates which vehicle components in a vehicle are matched to each other. A GUI can include user-selectable controls (based on matched components indicated by the matched components 834) to select matched components that are to be tested for a malfunction.

The delta thresholds 828 can include threshold data the processor 800 can use to determine whether a measurement corresponding to a matched component indicates one or more of the matched components is malfunctioning. Table C shows examples of matched components and corresponding delta thresholds. The matched components are identified using a common letter and the number "1" in the Match column. The delta thresholds 828 can include threshold data for multiple vehicle types (e.g., vehicles with different YMM or different YMME). Accordingly, the delta thresholds 828 could include threshold data for all matched components in each of one or more different vehicle types. The matched components 834 can include data that indicates the matched components shown in Table C. The measurement thresholds can represent the maximum and minimum values in a +/–threshold range. For example, a threshold voltage range for matched components A1 can be +/–0.28 volts. In response to determining a difference in voltage signals output by the vehicle components A1 is greater than +0.28 volts or less than –0.28 volts can result in the processor 800 determining one or more of the matched components A1 is malfunctioning.

TABLE C

| Match | Vehicle component | Measurement | Threshold |
|---|---|---|---|
| A1 | Engine Coolant Temperature Sensor-1 | DC Volts | 0.28 volts DC |
| A1 | Engine Coolant Temperature Sensor-2 | DC Volts | 0.28 volts DC |
| A1 | Engine Coolant Temperature Sensor-1 | Degrees ° C. | 11.1° C. |
| A1 | Engine Coolant Temperature Sensor-2 | Degrees ° C. | 11.1° C. |
| B1 | Air Charge Temperature Sensor-Bank-1 | DC Volts | 0.28 volts DC |
| B1 | Air Charge Temperature Sensor-Bank-1 | DC Volts | 0.28 volts DC |
| B1 | Air Charge Temperature Sensor-Bank-1 | Degrees ° C. | 11.1° C. |
| B1 | Air Charge Temperature Sensor-Bank-1 | Degrees ° C. | 11.1° C. |
| C1 | Manifold Air Pressure Sensor-1 | DC Volts | 0.35 volts DC |
| C1 | Manifold Air Pressure Sensor-2 | DC Volts | 0.35 volts DC |
| D1 | Mass Air Flow Sensor-Bank-1 | DC Volts | 0.35 volts DC |
| D1 | Mass Air Flow Sensor-Bank-2 | DC Volts | 0.35 volts DC |
| E1 | Exhaust Temperature Sensor After Left Catalyst | Temp. ° C. | 41.2° C. |
| E1 | Exhaust Temperature Sensor After Right Catalyst | Temp. ° C. | 41.2° C. |
| F1 | Mass Air Flow (HFM) Sensor-1 | Kg/hour | 2.5 Kg/hour |

TABLE C-continued

| Match | Vehicle component | Measurement | Threshold |
|---|---|---|---|
| F1 | Mass Air Flow (HFM) Sensor-2 | Kg/hour | 2.5 Kg/hour |
| G1 | Mass Air Flow Sensor-1 | Frequency | 200 Hz |
| G1 | Mass Air Flow Sensor-2 | Frequency | 200 Hz |
| H1 | Rail Pressure Sensor-1 | Pressure | 125 PSI |
| H1 | Rail Pressure Sensor-2 | Pressure | 125 PSI |
| I1 | Actual Variable Valve Timing Position Sensor-Intake Bank-1 | Position | 20° |
| I1 | Actual Variable Valve Timing Position Sensor-Intake Bank-2 | Position | 20° |
| J1 | Actual Variable Valve Timing Position Sensor-Exhaust Bank-1 | Position | 20° |
| J1 | Actual Variable Valve Timing Position Sensor-Exhaust Bank-2 | Position | 20° |
| K1 | Intake Camshaft Position Sensor, Bank-1 | Position | 8° |
| K1 | Intake Camshaft Position Sensor, Bank-2 | Position | 8° |
| L1 | Exhaust Camshaft Position Sensor, Bank-1 | Position | 8° |
| L1 | Exhaust Camshaft Position Sensor, Bank-2 | Position | 8° |
| M1 | Boost Pressure Sensor-Bank-1 | Pressure | 2.5 Hg |
| M1 | Boost Pressure Sensor-Bank-2 | Pressure | 2.5 Hg |
| N1 | Manifold Pressure-Bank-1 | Pressure | 2.5 Hg |
| N1 | Manifold Pressure-Bank-2 | Pressure | 2.5 Hg |
| O1 | Intake Manifold Pressure Sensor-1 After Throttle Valve | Pressure | 2.5 Hg |
| O1 | Intake Manifold Pressure Sensor-2 After Throttle Valve | Pressure | 2.5 Hg |
| P1 | Intake Manifold Pressure Sensor-1 Before Throttle Valve | Pressure | 2.5 Hg |
| P1 | Intake Manifold Pressure Sensor-2 Before Throttle Valve | Pressure | 2.5 Hg |
| Q1 | Throttle Angle Sensor-1 | Position | 2.5° |
| Q1 | Throttle Angle Sensor-2 | Position | 2.5° |
| R1 | Ambient Temperature Sensor-Bank-1 | Temp. | 14° C. |
| R1 | Ambient Temperature Sensor-Bank-2 | Degrees ° C. | 14° C. |
| S1 | Air Charge Temperature Sensor-Bank-1 | Degrees ° C. | 27.8° C. |
| S1 | Air Charge Temperature Sensor-Bank-2 | Degrees ° C. | 27.8° C. |
| T1 | Intake Air Temperature Sensor-Bank-1 | DC Volts | 0.23 volts DC |
| T1 | Intake Air Temperature Sensor-Bank-2 | DC Volts | 0.23 volts DC |
| T1 | Intake Air Temperature Sensor-Bank-1 | Degrees ° C. | 8.3° C. |
| T1 | Intake Air Temperature Sensor-Bank-2 | Degrees ° C. | 8.3° C. |
| U1 | Intercooler Outlet Air Temperature Sensor-Bank-1 | Degrees ° C. | 14° C. |
| U1 | Intercooler Outlet Air Temperature Sensor-Bank-2 | Degrees ° C. | 14° C. |
| V1 | Engine Coolant Temperature Sensor-Bank-1 | Degrees ° C. | 14° C. |
| V1 | Engine Coolant Temperature Sensor-Bank-2 | Degrees ° C. | 14° C. |
| W1 | Oil Temperature Sensor-Bank-1 | Degrees ° C. | 22.2° C. |
| W1 | Oil Temperature Sensor-Bank-2 | Degrees ° C. | 22.2° C. |

FIG. 30, FIG. 31, and FIG. 32 show data 290 in accordance with the example implementations. The data 290 includes the data in a column 291, 292, 293, 294, 295, 296, 297, 298, 299. The data 290 can be stored in the memory 816. The delta thresholds 828 shown in FIG. 29 can include at least a portion of the data 290, such as the data in the column 292. Likewise, the matched components 834 shown in FIG. 29 can include at least a portion of the data 290, such as the data in the column 298.

The column 291 includes vehicle identifiers for different vehicle types. The identifiers VI1 to VI6 in the column 291 can represent different YMM or different YMME. The vehicle identifiers can be used to identify data in the column

292, 293, 294, 295, 296, 297, 298, 299 that corresponds to a vehicle corresponding the vehicle identifier in the column 291.

In at least some implementations, the vehicle identifier in the column 291 represents multiple different YMM, such as first and second YMMs in which the MMs are identical, but the Y in the first and second YMMs represent different model years (e.g., 2019 and 2020). In at least some other implementations, the vehicle identifier in the column 291 represents multiple different YMME, such as a first YMME and a second YMME in which the YMM portions of those YMME are identical and the E of the first YMME represents a first engine (e.g., a 5.3 L engine) and the E of the second YMME represents a second engine (e.g., a 6.5 L engine).

The column 292 includes matched vehicle components. The matched vehicle components are identified by a common prefix letter "A" to "H" and "J" to "V" to show which vehicle components are matched. The matched components 834 can include the data contained in the column 291, 292. Although the data 290 includes data for only two sets of matched vehicle components for vehicle ID VI1, one set of matched vehicle components for vehicle ID VI2, three sets of matched vehicle components for vehicle ID VI3, one set of matched vehicle components for vehicle ID VI4, and thirteen sets of matched vehicle components for vehicle ID VI5, a person having ordinary skill in the art will understand that each vehicle having matched vehicle components can include a different number of sets of matched vehicle components than shown in FIG. 30, FIG. 31, and FIG. 32.

The column 293 includes job data indicative of whether the computing device 13 has access to a job performable on a vehicle corresponding to the vehicle identifier in the same row as that job data. The null data in the column 293 represents that no job data exists for the corresponding matched component. On the other hand, a number in the column 293 represents a job identifier for a scanner job that can be performed using the computing device 13. As an example, the job J1 shown in FIG. 31 can be a wheel alignment scanner job that includes measuring tire pressures and ride heights of a vehicle whose wheels are being aligned. As another example, the job J3 shown in FIG. 31 can be a cooling system scanner job that includes measuring temperatures of engine coolant at different locations within an ICE. As yet another example, the job J7 shown in FIG. 31 can be an anti-lock brake system scanner job that includes measuring wheel speeds for four wheels of a vehicle. U.S. Patent Application Publication No. 2020/0242860 A1 entitled method and system for providing scanner jobs on diagnostic tool is incorporated herein by reference.

The column 294 includes a circuit identifier corresponding to a component in the same row of the data 290. A circuit identifier from within the column 294 can used to identify a circuit within a wiring harness or connector. A GUI can output a connector diagram and/or schematic diagram showing a connector diagram, such as the connector diagram 71 and a PIN identifier, a wire color, a signal function, and/or a circuit identifier shown in the connector description 70 to guide a user in connecting the multimeter 808 or the oscilloscope 810 to the vehicle 11 to be able make measurements of signals or conditions of matched vehicle components.

The column 295, 296, 297 includes an ECU identifier, a PID, and a protocol. The processor 800 can use the data in the column 295, 296, 297 to generate and transmit a VDM to request data corresponding to the PID. The protocol can identify which vehicle communication transceiver of the vehicle communication transceiver 802 is to be used to transmit the VDM. The ECU identifier can be used to indicate an identifier of an ECU that is a destination for the VDM.

The column 298 includes a delta threshold data for a matched component. Although the data 290 shows only a single delta threshold for each vehicle components, one or more sets of matched vehicle components can include multiple delta thresholds. Each respective delta threshold of the multiple delta thresholds can be used based on a circumstance existing when a signal or condition measurement is made, such as an RPM value of the ICE.

The column 299 includes an instruction that can be output on the display 14, 804 to guide a user when making measurements of signals and conditions corresponding to matched vehicle components. The instruction can be displayed in a GUI shown on the display.

The GUI 830 includes a GUI the processor 800 can output onto the display 804. The display 804 can display the GUI stored within the GUI 830. The GUI 830 can include one or more of the GUI 160, 185, 206, 221, 236, 246, 261, 276, 501, 381, 431, 486, 411, 441, 461 shown in FIG. 13 to FIG. 28.

The connector descriptions 832 include descriptions of connectors within a vehicle. The connectors are removably connectable to other connectors. The connectors can include pins connected to circuits, such as electrical or optical circuits. The connector descriptions can include textual descriptions and/or drawings or images of a connector. FIG. 8 shows a connector description 70 in accordance with the example implementations. The connector description 70 includes a connector diagram 71 and a signal function description 72. The connector descriptions 832 can include the connector description 70. The processor 800 can output on the display 804 at least a portion of the connector description 832. The connector description shown on the display can guide a user how to connect the multimeter 808 or the oscilloscope 810 for determining a measurement of a signal on a circuit connected to the connector described by the connector description. As an example, the connector description shown on the display 804 can indicate the circuit connector to Pin B to make a measurement of a signal indicative of a crankshaft position.

As an example, the CRPI 824 can includes software program instructions and data, and/or firmware program instructions and data.

As another example, the CRPI 824 can include program instructions executable by the processor 800 perform any function described in this description as being performed by the computing device 13 or any component(s) of the computing device 13.

As yet another example, the CRPI 824 can include program instructions executable by the processor 800 to perform the set of functions 300 shown in FIG. 12 and/or any function(s) described in this description as being performed in addition to the set of functions 300.

As yet another example, the CRPI 824 can include program instructions executable by the processor 800 to measure signals output by matching vehicle components or conditions of matching vehicle components, and compare a difference of the measured signals to a measurement threshold to determine whether any of those matching vehicle components is malfunctioning. In at least some implementations, the processor 800 executes those program instructions for a predetermined amount of time (e.g., one minute). In at least some other implementations, the processor 800 executes those program instructions indefinitely (e.g., until the processor 800 receives a user-selection indicating some other functionality is to be performed, or until power to the processor 800 is turned off, or until the multimeter 808 or the oscilloscope is disconnected from the vehicle 11, 30).

As yet another example, the CRPI 824 can include program instructions executable by the processor 800 to convert a PID parameter value within a vehicle data message to determine another value represented by the PID parameter value. For example, the PID parameter value can take a value between $00 and $FF to represent a percentage between 0% and 100%. In such case, the processor 800 can convert a hexadecimal value to a decimal value (e.g., $7F to 127) and multiple the decimal value by the value 100/255 to obtain the percentage (e.g., 49.8%).

VI. Example Data

Next, FIG. 34 shows data 310 in accordance with one or more of the example implementations. The data 310 includes data in a column 311, 312, 313, 314, 315, 316, 317, 318. In at least some implementations, the data 310 includes and/or is based on data received in vehicle data messages. In at least some other implementations, the data 310 includes and/or is based on data measured using the multimeter 808 or the oscilloscope 810. The column 311, 313 includes time stamps.

As an example, the time stamps in the column 311, 313 include time stamps that indicate when vehicle data messages including the data in the column 312, 314, respectively, are received at the processor 800 or the vehicle communication transceiver 802. In at least some implementations, the processor 800 converts a value in a vehicle data message using a conversion factor or formula corresponding to the vehicle data message so as to determine data that is to be compared to data for a matched vehicle component. Based on this example, the processor 800 and/or the vehicle communication transceiver 802 can transmit a first common vehicle data message every 2.0 seconds to request a vehicle data message that includes a parameter that indicates the data shown in the column 312, and transmit a second common vehicle data message every 2.0 to request a vehicle data message that includes a parameter that indicates the data shown in the column 314. The processor 800 and/or the vehicle communication transceiver 802 can transmit a second common vehicle data message 0.001 seconds after transmitting a first common vehicle data message to achieve the time stamps shown in FIG. 34.

As another example, the time stamps in the column 311, 313 include time stamps that indicate when the multimeter 808 or the oscilloscope 810 makes a measurement and/or provides to the processor 800 a measurement indicated by data in column 312, 314, respectively.

The processor 800 can use the time stamps in the column 311, 313 to determine which data to compare for determining whether matched components are malfunctioning. For example, the processor 800 may determine and compare measurement data regarding matched components (e.g., the data in the column 312, 314) that correspond to two time stamps closest in time to one another. As another example, the processor 800 may determine and compare measurement data regarding matched components that correspond to two time stamps that differ from a start time by an identical difference or closest difference (e.g., five seconds after a start time when a heated seat is powered on).

The column 315, 316 includes data that the processor 800 can determine based on the data in the column 312, 314. Each datum in a row of the column 315 indicates a difference between the datum in the same row of the column 312, 314. Each datum in a row of the column 316 indicates a percentage of the current difference shown in the same row of the column 315 with respect to the datum in the same row of column 314.

The column 317, 318 includes data that the processor 800 can determine based on the data in the column 312, 314. Each datum in a row of the column 317 (not including null data) indicates a difference in data in the same row of the column 312 with respect to data in the column 312 corresponding to a time four seconds earlier. Likewise, each datum in a row of the column 318 (not including null data) indicates a difference in data in the same row of the column 314 with respect to data in the column 314 corresponding to a time four seconds earlier. The processor 800 can compare the datum in a row of the column 317 to the datum in the same row of the column 318 to determine how measurements regarding matched vehicle components are changing over time. Such determination can be compared to a change threshold, such as a threshold in the delta threshold 828. If the change threshold is exceeded, the processor 800 can determine that one or both of the matched vehicle components is malfunctioning.

In accordance with at least some implementations, the data 310 is stored in the measurements 826. As an example, the data 310 can be stored in a database file. As another example, the data 310 can be stored in one or more buffers. For instance, the data in each column 311, 312, 313, 314, 315, 316, 317, 318 can be stored in a separate buffer. Other examples of storing the data 310 are also possible.

The data within the column 312, 314 is shown to have been determined every two seconds over a twenty-two second period for the left and right seats, respectively. A person having ordinary skill in the art will understand that the data used to make a determination regarding whether a vehicle component is malfunctioning can be determined over a period of time shorter than or longer than a twenty-two second period. That skilled person will also understand that an interval between sequential measurements for a vehicle component can occur at an interval other than two seconds. A shorter interval for determining measurements of signals or conditions can be used for vehicle components in which those signals or conditions change more quickly than for vehicle components in which the signals or conditions to be measured change more slowly.

Figure 35:
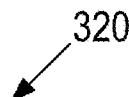

Next, FIG. 35 shows data 320 in accordance with one or more of the example implementations. The data 320 includes data in a column 321, 322, 323, 324, 325, 326, 327. In at least some implementations, the data 320 includes and/or is based on data received in vehicle data messages. In at least some other implementations, the data 310 includes and/or is based on data measured using the multimeter 808 or the oscilloscope 810. The column 321 includes time stamps. Since a single time stamp is associated with the datum in a single row of the column 322 and the column 323, the data messages including parameters used to determine the data in each row of the column 322, 323 may include a single vehicle data message with multiple parameters or multiple vehicle data messages.

The data in the column 322, 323, 324, 325, 326, 327 is identical to the data in the column, 312, 314, 315, 316, 317, 318, respectively. The data in the column 322, 323, 324, 325, 326, 327 is determined based on the common time stamps in the column 321 used for the matched vehicle components (e.g., a left and right seat) rather than based on respective time stamps in the column 311, 313 for the matched vehicle components referenced in the data 310.

Next, FIG. 36 shows data 330 in accordance with one or more of the example implementations. The data 330 includes data in a column 331, 332, 333. The data in the column 333 includes measurements and the data in the column 331 includes times when the measurements shown in the column 333 are made. The column 332 includes data indicating how the measurements can be made.

For example, the column 332 shows PIDs and PID descriptions for different sensors. The measurements made based on datum in a message including the PID can be determined by converting the datum to the measurement. As an example, the conversion can include converting a datum in hexadecimal form (e.g., $64) to decimal form (e.g., 100) and then subtracting 40 from the datum in decimal form (e.g., 100-40). In accordance with that example, the measurement is 60, such as 60 degrees C. when the measurement is a temperature measurement.

As another example, the column 332 shows channel identifiers. The channel identifiers can indicate channels of the multimeter 808 or the oscilloscope 810. In accordance with this example, the measurements in the column 332 can be the DC voltage measurements made by multimeter 808 or the oscilloscope 810. Additionally, the measurements in the column 332 can be the temperature measurements made using a temperature transducer connected to the multimeter 808.

As shown in Table C, a measurement threshold for the matching engine coolant temperature sensors is 0.35 volts DC. Assuming the threshold amount of time for comparing multiple measurements is 0.500 seconds, each group of rows 334, 335, 336, 337, 338, 339 includes measurements captured within the threshold amount of time of each other. In accordance with the implementations arranged as a method that includes performing the set of functions 300, the temperature sensor-1 can be the first vehicle component, the temperature sensor-2 can be the second vehicle component, and the temperature sensor-3 can be the additional vehicle component. The differences between the measurements for the temperature sensor-1 and the temperature sensor-2 in each group of rows 334, 335, 336, 337, 338, 339 is less than the measurement threshold. Based on those measurements, the processor 800 can determine that the temperature sensor-1 and the temperature sensor-2 are not malfunctioning.

Next, FIG. 37 shows data 340 in accordance with one or more of the example implementations. The data 340 includes data in a column 341, 342, 343. The data in the column 343 includes measurements and the data in the column 341 includes times when the measurements shown in the column 343 are made. The column 342 includes data indicating how the measurements can be made. The data in the column 342 is identical to the data in the column 332 shown in FIG. 36. The description of the column 332 is applicable to the column 342.

As shown in Table C, a measurement threshold for the matching engine coolant temperature sensors is 0.35 volts DC. Assuming the threshold amount of time for comparing multiple measurements is 0.500 seconds, each group of rows 344, 345, 346, 347, 348, 349 includes measurements captured within the threshold amount of time of each other. In accordance with the implementations arranged as a method that includes performing the set of functions 300, the temperature sensor-1 can be the first vehicle component, the temperature sensor-2 can be the second vehicle component, and the temperature sensor-3 can be the additional vehicle component. The differences between the measurements for the temperature sensor-1 and the temperature sensor-2 in each group of rows 344, 345, 346, 347, 348, 349 is greater than the measurement threshold. Based on those measurements, the processor 800 can determine that one or more of the temperature sensor-1 and the temperature sensor-2 is malfunctioning.

To be able to determine which of the temperature sensor-1 and the temperature sensor-2 is malfunctioning, the processor 800 can compare the differences between the measurements for the temperature sensor-1 and the temperature sensor-3 and the differences between the measurements for the temperature sensor-2 and the temperature sensor-3 in each group of rows 344, 345, 346, 347, 348, 349 to the measurement threshold. Based on those comparisons, the processor 800 can determine that the differences between the measurements for the temperature sensor-1 and the temperature sensor-3 do not exceed the measurement threshold, as well as that the differences between the measurements for the temperature sensor-2 and the temperature sensor-3 exceed the measurement threshold. Assuming that the temperature sensor-3 is not malfunctioning, determining that that the differences between the measurements for the temperature sensor-1 and the temperature sensor-3 do not exceed the measurement threshold, the processor 800 is configured to determine the temperature sensor-1 is not malfunctioning, and determining that that the differences between the measurements for the temperature sensor-2 and the temperature sensor-3 exceed the measurement threshold, the processor 800 is configured to determine the temperature sensor-2 is malfunctioning.

VII. Example Vehicle

A vehicle is a mobile machine that can be used to transport a person, people, and/or cargo. A vehicle can be driven and/or otherwise guided along a path (e.g., a paved road or otherwise) on land, in water, in the air, and/or outer space. A vehicle can be wheeled, tracked, railed, and/or skied. A vehicle can include an automobile, a motorcycle (e.g., a two or three wheel motorcycle), an all-terrain vehicle (ATV) defined by ANSI/SVIA-1-2007, a snowmobile, a watercraft (e.g., a JET SKI@ personal watercraft), a light-duty truck, a medium-duty truck, a heavy-duty truck, a semi-tractor, a drone, and/or a farm machine. A vehicle can include and/or use any appropriate voltage and/or current source, such as a battery, an alternator, a fuel cell, and the like, providing any appropriate current and/or voltage, such as about 12 volts, about 42 volts, about 400 volts, or about 800 volts, and the like. A vehicle can include and/or use any system and/or engine to provide its mobility. Those systems and/or engines can include vehicle components that use fossil fuels, such as gasoline, natural gas, propane, and the like, electricity, such as that generated by a battery, magneto, fuel cell, solar cell and the like, wind and hybrids and/or combinations thereof. A battery in a vehicle can include a lead-acid battery, a nickel metal hydride battery, a lithium-ion battery, a lithium iron phosphate battery, or some other type of battery. A vehicle can include an electronic control unit (ECU), an OBDC, and a vehicle network that connects the OBDC to the ECU. A vehicle can be configured to operate as an autonomous vehicle.

Some vehicles and types of vehicles can be identified by characteristics of the vehicle such as characteristics indicative of when the vehicle was built (e.g., a vehicle year), who built the vehicle (e.g., a vehicle make), marketing names associated with vehicle (e.g., a vehicle model name, or more simply "model"), and features of the vehicle (e.g., an engine type). This description uses an abbreviation YMME and/or Y/M/M/E, where each letter in the order shown represents a model year, vehicle make, vehicle model name, and engine type, respectively. This description uses an abbreviation YMM and/or Y/M/M, where each letter in the order shown represents a model year, vehicle make, and vehicle model name, respectively. An example Y/M/M/E is 2020/Toyota/ Camry/4Cyl, in which "2020" represents the model year the vehicle was built, "Toyota" represents the name of the vehicle manufacturer Toyota Motor Corporation, Aichi Japan, "Camry" represents a vehicle model built by that manufacturer, and "4Cyl" represents an engine type (i.e., a four cylinder ICE) within the vehicle. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan.

Some vehicles, such as automobiles, are associated with a unique VIN. Some VINs include seventeen alpha-numeric characters. For at least some seventeen character VINs, the last six characters represent a unique serial number associated with a particular type of vehicle represented by the first eleven alpha-numeric characters of those VINs. The first eleven alpha-numeric characters typically represent at least a YMME or a YMM. In some instances, a vehicle includes a one dimensional bar code indicative of a VIN associated with that vehicle.

A vehicle network, such as the vehicle network 43 (shown in FIG. 6A) can include one or more conductors (e.g., copper wire conductors) and/or can be wireless. As an example, a vehicle network can include one or two conductors for carrying vehicle data messages in accordance with a vehicle data message (VDM) protocol, such as a bi-directional VDM protocol. A bi-directional VDM protocol can include a SAE® J1850 (PWM or VPW) VDM protocol, an SAE® J1939 VDM protocol based on the SAE® J1939_201808 serial control and communications heavy duty vehicle network—top level document, and/or any other core J1939 standard, an ISO® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a CAN 2.0 VDM protocol, standardized in part using an ISO® 11898-1:2015 road vehicle—CAN—Part I: data link layer and physical signaling protocol, a CAN FD VDM protocol (i.e., CAN with flexible data rate VDM protocol), a MOST® Cooperation VDM protocol (such as the MOST Specification Rev. 3.0 E2, or the MOST® Dynamic Specification, Rev. 3.0.2), an Ethernet VDM protocol (e.g., an Ethernet 802.3 protocol using a BROADR-REACH® physical layer transceiver specification for Automotive Applications by Broadcom Inc., San Jose, California), or some other VDM protocol defined for performing communications with or within the vehicle 11, 30. Each and every VDM discussed in this description is arranged according to a VDM protocol.

Instead of being bidirectional, a VDM protocol can be a unidirectional. For example, a SENT VDM protocol (i.e., a single-edge nibble transmission VDM protocol) is a unidirectional VDM protocol. The SENT VDM protocol has been standardized as the SAE J2716 VDM protocol. A sensor in a vehicle can include a transmitter configured to communicate using the SENT VDM protocol (i.e., a SENT VDM transmitter). A vehicle communication bus can operatively connect the SENT VDM transmitter and an ECU within the vehicle. The vehicle communications transceiver 802 can include a SENT VDM receiver connectable to the vehicle communication bus operatively connected to the SENT VDM transmitter. The SENT VDM receiver can receive SENT VDM protocol messages representing sensor values output by the sensor with the SENT VDM transmitter.

An OBDC, such as the OBDC 36 (shown in FIG. 6A) can include an on-board diagnostic (OBD) connector, such as an OBD II connector. An OBD II connector can include slots for retaining up to sixteen connector terminals, but can include a different number of slots or no slots at all. As an example, an OBDC can include an OBD II connector that meets the SAE J1962 specification such as a connector 16M, part number 12110252, available from Aptiv LLC of Dublin, Ireland. An OBDC can include conductor terminals that connect to a conductor in a vehicle. For instance, an OBDC can include connector terminals that connect to conductors that respectively connect to positive and negative terminals of a battery or battery pack. An OBDC can include one or more conductor terminals that connect to a conductor of a vehicle communication bus such that the OBDC is operatively connected to one or more ECUs. A computing device, such as the computing device 13, 31, can operatively connect to an OBDC in order to receive VDM from the vehicle including that OBDC. A VDM can carry VDM data. The VDM data can, but need not necessarily, include a parameter identifier (PID) and data (PID data) parameters associated with the PID. The VDM data can, but need not necessarily, include a DTC.

An ECU can control various aspects of vehicle operation and/or components within a vehicle system. For example, an ECU can include a powertrain (PT) system ECU, an engine control module (ECM) ECU, a supplemental inflatable restraint (SIR) system (i.e., an air bag system) ECU, an entertainment system ECU, or some other ECU. An ECU can receive an electrical or optical input from an ECU-connected input device (e.g., a sensor input), control an ECU-connected output device (e.g., a solenoid) via an electrical or optical signal output by the ECU, generate a vehicle data message (VDM) (such as a VDM based on a received input or a controlled output), and set a diagnostic trouble code (DTC) to a state (such as active or history). An ECU can perform a functional test in response to receiving a VDM requesting performance of the functional test. The functional test can be used to test an ECU-connected output device.

VIII. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether. Furthermore, various functions described and/or shown in the drawings as being performed by one or more elements can be carried out by a processor executing computer-readable program instructions or by a combination of hardware, firmware, and/or software. For purposes of this description, execution of CRPI contained in a computer-readable medium to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing implementations only, and is not intended to be limiting.

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of," "at least one of the following," "one or more of," and "one or more of the following" immediately preceding a list of at least two components or functions is to cover each implementation including a listed component or function independently and each implementation including a combination of the listed components or functions. For example, an implementation described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and/or (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. The use of ordinal numbers such as "first," "second," "third" and so on is to distinguish respective elements rather than to denote an order of those elements unless the context of using those terms explicitly indicates otherwise. The use of the symbol "$" as prefix to a number indicates the number is a hexadecimal number.

Implementations of the present disclosure may thus relate to one of the enumerated example embodiments (EEEs) listed below.

EEE 1 is a method comprising: determining, by a processor, a first measurement at a first time and a second measurement at a second time, wherein: the first measurement includes a measurement of a signal output by a first vehicle component at a particular vehicle and the second measurement includes a measurement of a signal output by a second vehicle component at the particular vehicle, or the first measurement includes a measurement of a condition of the first vehicle component and the second measurement includes a measurement of a condition of the second vehicle component; determining, by the processor, a first determination, wherein: the first determination is based at least in part on a difference between the first measurement and the second measurement exceeding a first measurement threshold, and the first determination indicates that at least one from among the first vehicle component and the second vehicle component is malfunctioning; and outputting, by the processor, a first notification, wherein: the first notification indicates that at least one from among the first vehicle component and the second vehicle component is malfunctioning, the first vehicle component and the second vehicle component are matched with each other based on a first common characteristic with respect to the particular vehicle, and the first time and the second time are within a first threshold amount of time of each other.

EEE 2 is a method according to EEE 1, wherein the first vehicle component and the second vehicle component are matched with one or more additional vehicle components.

EEE 3 is a method according to EEE 2, wherein the first vehicle component, the second vehicle component, and the one or more additional vehicle components include a respective vehicle sensor.

EEE 4 is a method according to any one of EEE 1 to 3, wherein: the first measurement includes the measurement of the condition of the first vehicle component, the second measurement includes the measurement of the condition of the second vehicle component, the first measurement is based on an output signal of a first transducer disposed in proximity to the first vehicle component, and the second measurement is based on an output signal of a second transducer disposed in proximity to the second vehicle component.

EEE 5 is method according to EEE 1, wherein: determining the first measurement includes receiving a first datum representing a datum contained in a first message, determining the second measurement includes receiving a second datum representing a datum contained in a second message, the first message includes a first parameter identifier corresponding to the first vehicle component and is transmitted by an electronic control unit within the particular vehicle, and the second message includes a second parameter identifier corresponding to the second vehicle component and is transmitted by the electronic control unit.

EEE 6 is a method according to EEE 5, wherein receiving the first datum and receiving the second datum includes receiving the first datum and the second datum within one or more messages transmitted by a dongle removably connected to the particular vehicle.

EEE 7 is a method according to EEE 5 or 6, further comprising: determining, by the processor, service information based on at least one of first or second parameter identifiers; and outputting, by the processor, the service information onto a display.

EEE 8 is a method according to EEE 1, wherein: determining the first measurement includes receiving a digital representation of a first sample of the signal output by the first vehicle component and converting the digital representation of the first sample of the signal output by the first vehicle component based on a resolution of a first analog-to-digital converter and a measurement range, and determining the second measurement includes receiving a digital representation of a first sample of the signal output by the second vehicle component and converting the digital representation of the first sample of the signal output by the second vehicle component based on a resolution of a second analog-to-digital converter and the measurement range.

EEE 9 is a method according to EEE 1, wherein: determining the first measurement at the first time includes the processor receiving a first message transmitted by an electronic control unit within the particular vehicle and decoding a portion of the first message indicative of the first measurement; and determining the second measurement at the second time includes the processor receiving a second message transmitted by the electronic control unit and decoding a portion of the second message indicative of the second measurement.

EEE 10 is a method according to any one of EEE 1 to 9, further comprising: determining, by the processor, a third measurement at a third time, the third measurement including a measurement of a signal output by an additional vehicle component at the particular vehicle, wherein: determining the first determination includes the processor determining that the first vehicle component is malfunctioning, determining the first vehicle component is malfunctioning includes the processor determining that a difference between the first measurement and the third measurement exceeds a second measurement threshold, the additional vehicle component is used within the particular vehicle to sense an additional characteristic with respect to the particular vehicle, the additional characteristic is similar or identical to the first common characteristic, and the first time and the third time are within a second threshold amount of time of each other.

EEE 11 is a method according to EEE 10, wherein: the first common characteristic and the additional characteristic include or represent a temperature, a pressure, or a flow, and the temperature, the pressure, or the flow included or represented by the first common characteristic and the additional characteristic are temperatures, pressures or flows, respectively, of a common or different fluid.

EEE 12 is a method according to any one of EEE 1 to 11, wherein: the particular vehicle includes a vehicle power plant, the vehicle power plant includes a first bank and a second bank, the first vehicle component is associated with the first bank, the second vehicle component is associated with the second bank, and the vehicle power plant includes one or more from among: an internal combustion engine or an electric motor.

EEE 13 is a method according to EEE 12, further comprising: determining, by the processor, an operating status of the vehicle power plant; and determining, by the processor, the first measurement threshold based on the operating status of the vehicle power plant.

EEE 14 is a method according to any one of EEE 1 to 13, wherein the first time and the second time are identical.

EEE 15 is a method according to any one of EEE 1 to 14, wherein the first measurement threshold is selected based at least in part upon the first threshold amount of time.

EEE 16 is a method according to any one of EEE 1 to 15, wherein the first common characteristic includes or represents a temperature, a pressure, a flow, a speed, or a position.

EEE 17 is a method according to any one of EEE 1-9 further comprising: determining, by the processor, a third measurement at a third time, the third measurement including a measurement of a signal output by a first additional vehicle component at the particular vehicle; determining, by the processor, a fourth measurement at a fourth time, the fourth measurement including a measurement of a signal output by a second additional vehicle component at the particular vehicle; determining, by the processor, a second determination, wherein: the second determination is based at least in part on a difference between the third measurement and the fourth measurement not exceeding a second measurement threshold, the second determination indicates that the first additional vehicle component and the second additional vehicle component are not malfunctioning; and outputting, by the processor, a second notification, wherein the second notification indicates that at least one from among the first additional vehicle component and the second additional vehicle component is not malfunctioning, wherein: the first additional vehicle component and the second additional vehicle component are matched with each other at least in part to sense a second common characteristic with respect to the particular vehicle, and the third time and the fourth time are within a second threshold amount of time of each other.

EEE 18 is a method according to any one of EEE 1-9, further comprising: determining, by the processor, that a vehicle service tool containing the processor is operatively connected to a particular vehicle corresponding to a particular year, make, model, and engine combination; determining, by the processor, that a selection has been made using a user interface of the vehicle service tool, wherein the selection includes a request to diagnose one or more from among the first vehicle component or the second vehicle component; in response to determining that the vehicle service tool is operatively connected to the particular vehicle and that the selection has been made, determining, by the processor, one or more vehicle data messages to request data indicative of the first measurement and the second measurement; transmitting, by the processor to the particular vehicle, the one or more vehicle data messages; and receiving, by the processor in response to transmitting the one or more vehicle data messages, one or more additional vehicle data messages, wherein the one or more additional vehicle data messages include data indicative of the first measurement and data indicative of the second measurement, wherein determining the first measurement includes the processor determining the first measurement from the data indicative of the first measurement, and wherein determining the second measurement includes the processor determining the second measurement from the data indicative of the second measurement.

EEE 19 is a method according to any one of EEE 1 to 18, wherein: the first measurement is made on a first channel of an oscilloscope, and the second measurement is made on a second channel of the oscilloscope.

EEE 20 is a method according to EEE 19, further comprising: determining, by the processor, component identifiers corresponding to the first and second vehicle components; determining, by the processor, service information based on at least the component identifiers; and outputting, by the processor, the service information onto a display.

EEE 21 is a method according to any one of EEE 1 to 20, wherein the first measurement threshold is a percentage of a value within a normal operating range of the first vehicle component and the second vehicle component.

EEE 22 is method according to EEE 21, wherein the percentage is based on the first threshold amount of time.

EEE 23 is a method according to any one of EEE 1 to 22, further comprising: outputting, by the processor, a user-selectable control onto a display, wherein: the user-selectable control corresponds to the first vehicle component and program instructions executable by the processor to: initiate or perform a test of the first vehicle component, calibrate the first vehicle component via one or more vehicle data messages, or program the first vehicle component via one or more vehicle data messages; repairing a vehicle, wherein repairing the particular vehicle includes the processor executing the program instructions.

EEE 24 is a method according to any one of EEE 1 to 23, further comprising: outputting, by the processor, a graphical user interface on a display, wherein the graphical user interface includes a user-selectable control; and determining, by the processor based at least in part on a measurement selection entered via use of the user-selectable control, an order for performing measurements including the first measurement and the second measurement, wherein: the order includes measurements on multiple sets of matched vehicle components in the particular vehicle, or the order includes measurements for a single set of matched vehicle components comprising the first vehicle component and the second vehicle component.

EEE 25 is a method according to any one of EEE 1 to 24, wherein: the measurement of the condition of the first vehicle component includes a first calculated value, the measurement of the condition of the second vehicle component includes a second calculated value, the first calculated value represents an amount of time taken for a range of data values corresponding to a first parameter identifier to change by a first amount, and the second calculated value represents an amount of time taken for a range of data values corresponding to a second parameter identifier to change by a second amount.

EEE 26 is a method according to any one of EEE 1 to 24, wherein: the measurement of the condition of the first vehicle component includes a measurement of time taken for a temperature of the first vehicle component to change from a first temperature to a second temperature, and the measurement of the condition of the second vehicle component includes a measurement of time taken for a temperature of the second vehicle component to change from a third temperature to a fourth temperature.

EEE 27 is a method according to EEE 26, wherein the first temperature equals or is within a threshold number of degrees of the third temperature and the second temperature equals or is within the threshold number of degrees of the fourth temperature.

EEE 28 is a method according to any one of EEE 1 to 27, wherein the first measurement and the second measurement are measurements of amperage, angular displacement, frequency, pressure resistance, speed, temperature, or voltage.

EEE 29 is a method according to any one of EEE 1 to 27, wherein the first measurement and the second measurement are measurements represented by parameter identifier (PID) parameters corresponding to different PIDS within vehicle data messages output by the particular vehicle.

EEE 30 is a method according to any one of EEE 1 to 29, wherein the first determination is further based on a determination whether the first measurement breaches an upper or lower threshold corresponding to the first vehicle component and/or whether the second measurement breaches an upper or lower threshold corresponding to the second vehicle component.

EEE 31 is a method according to any one of EEE 1 to 30, wherein the difference between the first measurement and the second measurement is an absolute value of the difference between the first measurement and the second measurement.

EEE 32 is a method according to any one of EEE 1 to 31, wherein the second time is a time interval, wherein the second measurement includes multiple measurements of the signal output by the second vehicle component or of the condition of the second vehicle component, wherein the multiple measurements are made at different times during the time interval, and wherein the first determination is based at least in part on a respective difference between the first measurement and each measurement of two or more of the multiple measurements exceeding the first measurement threshold.

EEE 33 is a method according to EEE 32, wherein the multiple measurements are made during the first threshold amount of time, and the first threshold amount of time occurs immediately before the first time.

EEE 34 is a method according to EEE 32, wherein the multiple measurements are made during the first threshold amount of time, and the first threshold amount of time occurs immediately after the first time.

EEE 35 is a method according to EEE 32, wherein one or more of multiple measurements are made during a first amount of time occurring immediately before the first time and one or more of the multiple measurements are made during a second amount of time occurring immediately after the first time, and wherein a sum of the first amount of time and the second amount of time does not exceed the first threshold amount of time.

EEE 36 is a method according to EEE 32, wherein the second measurement is an average value of the multiple measurements.

EEE 37 is a method according to EEE 32, wherein the two or more of the multiple measurements includes all of the multiple measurements.

EEE 38 is a method according to any one of EEE 1 to 31, wherein determining the first determination includes determining whether at least one from among the first vehicle component and the second vehicle component is malfunctioning, and wherein the first determination indicates that at least one from among the first vehicle component and the second vehicle component is malfunctioning if the difference between the first measurement and the second measurement exceeds the first measurement threshold, or the first determination indicates that at least one from among the first vehicle component and the second vehicle component is not malfunctioning if the difference between the first measurement and the second measurement does not exceed the first measurement threshold.

EEE 39 is a method according to any one of EEE 1 to 31, wherein the second time is a time interval, wherein the second measurement includes multiple measurements of the signal output by the second vehicle component or of the condition of the second vehicle component, wherein the multiple measurements are made at different times during the time interval, wherein determining the first determination includes determining whether at least one from among the first vehicle component and the second vehicle component is malfunctioning, wherein the first determination indicates that at least one from among the first vehicle component and the second vehicle component is malfunctioning if the difference between the first measurement and the second measurement exceeds the first measurement threshold, or the first determination indicates that at least one from among the first vehicle component and the second vehicle component is not malfunctioning if the difference between the first measurement and the second measurement does not exceed the first measurement threshold, wherein the difference between the first measurement and the second measurement exceeds the first measurement threshold if a respective difference between the first measurement and each measurement of the multiple measurements exceeds the first measurement threshold, and wherein the difference between the first measurement and the second measurement does not exceed the first measurement threshold if a respective difference between the first measurement and each measurement of the multiple measurements does not exceed the first measurement threshold.

EEE 40 is a computing system comprising: a processor; a display screen; and a non-transitory computer-readable memory, wherein the non-transitory computer-readable memory contains executable instructions, and wherein execution of the executable instructions by the processor causes the computing system to perform functions comprising: determining, by the processor, a first measurement at a first time, the first measurement including a measurement of a signal output by or a condition of a first vehicle component at a particular vehicle; determining, by the processor, a second measurement at a second time, the second measurement including a measurement of a signal output by or a condition of a second vehicle component at the particular vehicle; determining, by the processor, a first determination, wherein: the first determination is based at least in part on a difference between the first measurement and the second measurement exceeding a first measurement threshold, and the first determination indicates that at least one from among the first vehicle component and the second vehicle component is malfunctioning; and outputting, by the processor, a first notification, wherein the first notification indicates that at least one from among the first vehicle component and the second vehicle component is malfunctioning, wherein: the first vehicle component and the second vehicle component are matched with each other based on a first common characteristic with respect to the particular vehicle, and the first time and the second time are within a first threshold amount of time of each other.

EEE 41 is a non-transitory computer-readable memory having stored therein instructions executable by a processor to cause a computing system having a display screen and the processor to perform functions comprising: determining, by the processor, a first measurement at a first time, the first measurement including a measurement of a signal output by or a condition of a first vehicle component at a particular vehicle; determining, by the processor, a second measurement at a second time, the second measurement including a measurement of a signal output by or a condition of a second vehicle component at the particular vehicle; determining, by the processor, a first determination, wherein: the first determination is based at least in part on a difference between the first measurement and the second measurement exceeding a first measurement threshold, and the first determination indicates that at least one from among the first vehicle component and the second vehicle component is malfunctioning; and outputting, by the processor, a first notification, wherein the first notification indicates that at least one from among the first vehicle component and the second vehicle component is malfunctioning, wherein: the first vehicle component and the second vehicle component are matched with each other based on a first common characteristic with respect to the particular vehicle, and the first time and the second time are within a first threshold amount of time of each other.

EEE 42 is a computing system comprising: a processor, and computer readable data storage storing executable instructions, wherein execution of the executable instructions by the processor causes the computing system to perform the method of any one of EEE 1 to EEE 39.

EEE 43 is a computing system comprising the means to perform the method of any one of EEE 1 to EEE 39.

EEE 44 is a non-transitory computer readable medium having stored therein instructions executable by a processor to cause a computing system to perform the method of any one of EEE 1 to EEE 39.

We claim:

1. A method comprising:
   determining, by a processor, a first measurement at a first time and a second measurement at a second time, wherein:
      the first measurement includes a measurement of a signal output by a first vehicle component at a particular vehicle and the second measurement includes a measurement of a signal output by a second vehicle component at the particular vehicle, or
   the first measurement includes a measurement of a condition of the first vehicle component and the second measurement includes a measurement of a condition of the second vehicle component;
   determining, by the processor, a first determination, wherein:
      the first determination is based at least in part on a difference between the first measurement and the second measurement not exceeding a first measurement threshold, and
      the first determination indicates that the first vehicle component is not malfunctioning, the second vehicle component is not malfunctioning, or both the first vehicle component and the second vehicle component are not malfunctioning; and
   outputting, by the processor, a first notification, wherein:
      the first notification indicates that the first vehicle component is not malfunctioning, the second vehicle component is not malfunctioning, or both the first vehicle component and the second vehicle component are not malfunctioning,
      the first vehicle component and the second vehicle component are matched with each other based on a first common characteristic with respect to the particular vehicle, and
      the first time and the second time are within a first threshold amount of time of each other.

2. The method of claim 1, wherein the first measurement and the second measurement are:
   measurements of amperage,
   measurements of angular displacement,
   measurements of frequency,
   measurements of pressure,
   measurements of resistance,
   measurements of speed,
   measurements of temperature,
   measurements of voltage, or
   measurements represented by parameter identifier (PID) parameters corresponding to different PIDS within vehicle data messages output by the particular vehicle.

3. The method of claim 1, wherein the first determination is further based on a determination that indicates whether the first measurement breaches an upper or lower threshold corresponding to the first vehicle component and/or whether the second measurement breaches an upper or lower threshold corresponding to the second vehicle component.

4. The method of claim 1, wherein the difference between the first measurement and the second measurement is an absolute value of the difference between the first measurement and the second measurement.

5. The method of claim 1, wherein:
   the second time is a time interval,
   the second measurement includes multiple measurements of the signal output by the second vehicle component or of the condition of the second vehicle component,
   the multiple measurements are made at different times during the time interval, and
   the first determination is based at least in part on a respective difference between the first measurement and each measurement of two or more of the multiple measurements exceeding the first measurement threshold.

6. The method of claim 5, wherein the multiple measurements are made during the first threshold amount of time, and the first threshold amount of time occurs immediately before or after the first time.

7. The method of claim 5, wherein:

one or more of multiple measurements are made during a first amount of time occurring immediately before the first time, one or more of the multiple measurements are made during a second amount of time occurring immediately after the first time, and a sum of the first amount of time and the second amount of time does not exceed the first threshold amount of time.

8. The method of claim 5, wherein the second measurement is an average value of the multiple measurements.

9. The method of claim 1, wherein the first vehicle component and the second vehicle component are matched with each other at least in part to sense the first common characteristic with respect to the particular vehicle or an additional characteristic with respect to the particular vehicle.

10. The method of claim 9, wherein:

the first common characteristic and the additional characteristic include or represent a temperature, a pressure, or a flow, and the temperature, the pressure, or the flow included or represented by the first common characteristic and the additional characteristic are temperatures, pressures or flows, respectively, of a common or different fluid.

11. The method of claim 1, wherein:

determining the first measurement includes receiving a first datum representing a datum contained in a first message, determining the second measurement includes receiving a second datum representing a datum contained in a second message, the first message includes a first parameter identifier corresponding to the first vehicle component and is transmitted by a first electronic control unit within the particular vehicle, and the second message includes a second parameter identifier corresponding to the second vehicle component and is transmitted by the first electronic control unit or a second electronic control unit.

12. The method of claim 1, wherein:

determining the first measurement includes receiving a digital representation of a first sample of the signal output by the first vehicle component and converting the digital representation of the first sample of the signal output by the first vehicle component based on a resolution of a first analog-to-digital converter and a measurement range, and determining the second measurement includes receiving a digital representation of a first sample of the signal output by the second vehicle component and converting the digital representation of the first sample of the signal output by the second vehicle component based on a resolution of a second analog-to-digital converter and the measurement range.

13. The method of claim 1, wherein:

the first measurement includes the measurement of the condition of the first vehicle component, the second measurement includes the measurement of the condition of the second vehicle component, the first measurement is based on an output signal of a first transducer disposed in proximity to the first vehicle component, and the second measurement is based on an output signal of a second transducer disposed in proximity to the second vehicle component.

14. The method of claim 1, wherein:

determining the first measurement at the first time includes the processor receiving a first message transmitted by a first electronic control unit within the particular vehicle and decoding a portion of the first message indicative of the first measurement; and determining the second measurement at the second time includes the processor receiving a second message transmitted by the first electronic control unit or a second electronic control unit and decoding a portion of the second message indicative of the second measurement.

15. The method of claim 1, wherein the first time and the second time are identical.

16. The method of claim 1, wherein:

the particular vehicle includes an internal combustion engine, the internal combustion engine includes a first bank and a second bank, the first vehicle component is associated with the first bank, and the second vehicle component is associated with the second bank.

17. The method of claim 16, wherein the first measurement and the second measurement are determined while the internal combustion engine is operating at an off-idle speed.

18. The method of claim 16, wherein the first measurement and the second measurement are determined while the internal combustion engine is operating at an idle speed.

19. The method of claim 16, wherein:

if the first measurement includes the measurement of the signal output by the first vehicle component at the particular vehicle and the second measurement includes the measurement of the signal output by the second vehicle component at the particular vehicle, then:

the measurement of the signal output by the first vehicle component comprises a particular measurement of the signal output by the first vehicle component determined from among multiple measurements of the signal output by the first vehicle component made at different times as an operating speed of the internal combustion engine changes, and the measurement of the signal output by the second vehicle component comprises a particular measurement of the signal output by the second vehicle component determined from among multiple measurements of the signal output by the second vehicle component made at the different times as the operating speed of the internal combustion engine changes, or if the first measurement includes the measurement of the condition of the first vehicle component and the second measurement includes the measurement of the condition of the second vehicle component, then:

the measurement of the condition of the first vehicle component comprises a particular measurement of the condition of the first vehicle component determined from among multiple measurements of the condition of the first vehicle component made at the different times as the operating speed of the internal combustion engine changes, and the measurement of the condition of the second vehicle component comprises a particular measurement of the condition of the second vehicle component determined from among multiple measurements of the condition of the second vehicle component made at different times as the operating speed of the internal combustion engine changes.

20. The method of claim 1, wherein the first measurement and the second measurement are determined while the particular vehicle is being driven.

21. The method of claim 1, wherein:

the particular vehicle is an electric vehicle including multiple battery modules and multiple cell monitoring units, the first vehicle component includes a first battery module of the multiple battery modules, the second vehicle component includes a second battery module of the multiple battery modules, and the first and second measurements are measurements of temperature, resistance or voltage of the first and second battery modules, respectively.

22. A computing system comprising:

a processor;

a display screen; and a non-transitory computer-readable memory, wherein the non-transitory computer-readable memory contains executable instructions, and wherein execution of the executable instructions by the processor causes the computing system to perform functions comprising:

determining a first measurement at a first time and a second measurement at a second time, wherein:

the first measurement includes a measurement of a signal output by a first vehicle component at a particular vehicle and the second measurement includes a measurement of a signal output by a second vehicle component at the particular vehicle, or the first measurement includes a measurement of a condition of the first vehicle component and the second measurement includes a measurement of a condition of the second vehicle component;

determining a first determination, wherein:

the first determination is based at least in part on a difference between the first measurement and the second measurement not exceeding a first measurement threshold, and the first determination indicates that the first vehicle component is not malfunctioning, the second vehicle component is not malfunctioning, or both the first vehicle component and the second vehicle component are not malfunctioning; and

outputting a first notification, wherein:

the first notification indicates that the first vehicle component is not malfunctioning, the second vehicle component is not malfunctioning, or both the first vehicle component and the second vehicle component are not malfunctioning, the first vehicle component and the second vehicle component are matched with each other based on a first common characteristic with respect to the particular vehicle, and the first time and the second time are within a first threshold amount of time of each other.

23. A non-transitory computer-readable memory having stored therein instructions executable by a processor to cause a computing system having a display screen and the processor to perform functions comprising:

determining a first measurement at a first time and a second measurement at a second time, wherein:

the first measurement includes a measurement of a signal output by a first vehicle component at a particular vehicle and the second measurement includes a measurement of a signal output by a second vehicle component at the particular vehicle, or the first measurement includes a measurement of a condition of the first vehicle component and the second measurement includes a measurement of a condition of the second vehicle component;

determining a first determination, wherein:

the first determination is based at least in part on a difference between the first measurement and the second measurement not exceeding a first measurement threshold, and the first determination indicates that the first vehicle component is not malfunctioning, the second vehicle component is not malfunctioning, or both the first vehicle component and the second vehicle component are not malfunctioning; and outputting a first notification, wherein:

the first notification indicates that the first vehicle component is not malfunctioning, the second vehicle component is not malfunctioning, or both the first vehicle component and the second vehicle component are not malfunctioning, the first vehicle component and the second vehicle component are matched with each other based on a first common characteristic with respect to the particular vehicle, and the first time and the second time are within a first threshold amount of time of each other.

* * * * *